(12) United States Patent
Kuriki et al.

(10) Patent No.: US 12,231,932 B2
(45) Date of Patent: Feb. 18, 2025

(54) COMMUNICATION CONTROL DEVICE AND COMMUNICATION CONTROL METHOD

(71) Applicant: Sony Group Corporation, Tokyo (JP)

(72) Inventors: Hiroto Kuriki, Tokyo (JP); Ryota Kimura, Tokyo (JP); Ryo Sawai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 343 days.

(21) Appl. No.: 17/785,050

(22) PCT Filed: Dec. 17, 2020

(86) PCT No.: PCT/JP2020/047105
§ 371 (c)(1),
(2) Date: Jun. 14, 2022

(87) PCT Pub. No.: WO2021/131999
PCT Pub. Date: Jul. 1, 2021

(65) Prior Publication Data
US 2023/0025104 A1 Jan. 26, 2023

(30) Foreign Application Priority Data

Dec. 24, 2019 (JP) ................................. 2019-232674
Aug. 7, 2020 (JP) ................................. 2020-135387

(51) Int. Cl.
*H04W 24/08* (2009.01)
*H04W 4/021* (2018.01)
*H04W 16/14* (2009.01)

(52) U.S. Cl.
CPC ........... *H04W 24/08* (2013.01); *H04W 4/021* (2013.01); *H04W 16/14* (2013.01)

(58) Field of Classification Search
CPC ..... H04W 24/08; H04W 4/021; H04W 16/14; H04W 64/003
See application file for complete search history.

(56) References Cited

U.S. PATENT DOCUMENTS 9,826,434 B2 * 11/2017 Chu ....................... H04W 28/20
2003/0046605 A1 * 3/2003 Qin ......................... G06F 9/454
714/13

(Continued)

FOREIGN PATENT DOCUMENTS

| CN | 101771465 A | 7/2010 |
| CN | 104618896 A | 5/2015 |

(Continued)

OTHER PUBLICATIONS

International Search Report and Written Opinion mailed on Feb. 9, 2021, received for PCT Application PCT/JP2020/047105, filed on Dec. 17, 2020, 9 pages including English Translation.

(Continued)

*Primary Examiner* — Christine Ng
(74) *Attorney, Agent, or Firm* — XSENSUS LLP

(57) ABSTRACT

A communication control device (40) includes a control unit (44) configured to select one protection method from a plurality of primary system protection methods including a dynamic or static protection method on the basis of a use form and use position information of a wireless station of a primary system and protect the wireless station of the primary system on the basis of the selected protection method.

19 Claims, 37 Drawing Sheets

(56) References Cited

U.S. PATENT DOCUMENTS

| | | | |
|---|---|---|---|
| 2007/0283124 A1* | 12/2007 | Menczak | G06F 12/109 |
| | | | 711/E12.068 |
| 2008/0289047 A1* | 11/2008 | Benea | H04L 63/1483 |
| | | | 726/27 |
| 2012/0129467 A1 | 5/2012 | Wang | |
| 2014/0221000 A1* | 8/2014 | Roberts | H04W 64/00 |
| | | | 455/454 |
| 2017/0188314 A1 | 6/2017 | Mueck | |
| 2018/0270668 A1* | 9/2018 | Nair | H04W 76/10 |
| 2018/0288019 A1* | 10/2018 | Dinia | H04L 63/083 |
| 2018/0365432 A1* | 12/2018 | Chhabra | H04L 63/107 |
| 2019/0357155 A1 | 11/2019 | Al-Mufti | |
| 2022/0039002 A1* | 2/2022 | Corston-Petrie | H04W 60/04 |

FOREIGN PATENT DOCUMENTS

| | | |
|---|---|---|
| CN | 104937970 A | 9/2015 |
| EP | 3462808 A1 | 4/2019 |
| JP | 2013-501445 A | 1/2013 |
| KR | 20050005848 A | 1/2005 |
| WO | WO-2018215974 A1 | 11/2018 |
| WO | WO-2019108277 A1 | 6/2019 |
| WO | 2019/130922 A1 | 7/2019 |
| WO | 2019/187507 A1 | 10/2019 |
| WO | 2019/230671 A1 | 12/2019 |
| WO | WO-2019230156 A1 | 12/2019 |

OTHER PUBLICATIONS

"Technical and operational requirements for the operation of white space devices under geo-location approach", CEPT ECC, ECC Report 186, Jan. 2013, pp. 1-181.

"White Space Database Provider (WSDB) Contract", Available Online at: https://www.ofcom.org.uk/_data/assets/pdf_file/0026/84077/white_space_database_contract_for_operational_use_of_wsds.pdf, 2015, pp. 1-125.

"Signaling Protocols and Procedures for Citizens Broadband Radio Service (CBRS): Spectrum AccessSystem (SAS)- Citizens Broadband Radio Service Device (CBSD) Interface Technical Specification", Wireless Innovation Forum, WINNF-TS-0016-V1.2.1, Jan. 3, 2018, pp. 1-52.

"Signaling Protocols and Procedures for Citizens Broadband Radio Service (CBRS): Spectrum Access System (SAS)-SAS Interface Technical Specification", Wireless Innovation Forum, WINNF-TS-0096-V1.2.0, Oct. 20, 2017, pp. 1-36.

"Requirements for Commercial Operation in the U.S.3550-3700 MHz Citizens Broadband Radio Service Band", Wireless Innovation Forum, WINNF-TS-0112-V1.4.1, Jan. 16, 2018, pp. 1-72.

"CBRS Certified Professional Installer Accreditation Technical Specification", Wireless Innovation Forum, WINNF-TS-0247-V1.0.0 , Oct. 16, 2017, pp. 1-14.

Kokkinen, Heikki et al., "Results of the Demonstration of Licensed Shared Access with Sensing of Secondary Signal", 2019 IEEE International Symposium on Dynamic Spectrum Acces Networks (DYSPAN), IEEE, Nov. 11, 2019 (Nov. 11, 2019), pp. 1-9, XP033676496.

Nguyen, Thao T., et al, "A Practical Approach to Placing Coastal Sensors for Spectrum Sharing in the 3.5 GHz Band", 2019 IEEE Wireless Communications and Networkiing Conference (WCNC), IEEE, Apr. 15, 2019 (Apr. 15, 2019), pp. 1-7, XP033652095.

The Software Defined Radio Forum Inc., "Requirements for Commercial Operation in the U.S. 3550-3700 MHz Citizens Broadband Radio Service Band", Spectrum Sharing Committee WG1, CBRS Operational and Functional Requirements, Terms, Conditions& Notices,r. Oct. 30, 2018 (Oct. 30, 2018), pp. 1-80, XP055956853.

* cited by examiner

FIG.2

|  | USE POSITION INFORMATION ||
| --- | --- | --- |
| USE FORM | PLANNED USE | UNPLANNED USE |
| PROTEC-TION METHOD | STATIC POINT PROTECTION / STATIC AREA PROTECTION | DYNAMIC POINT PROTECTION / DYNAMIC AREA PROTECTION |

COMMUNICATION CONTROL DEVICE AND COMMUNICATION CONTROL METHOD

CROSS-REFERENCE TO RELATED APPLICATIONS

The present application is based on PCT filing PCT/JP2020/047105, filed Dec. 17, 2020, which claims priority to Japanese Patent Application No. 2019-232674, filed Dec. 24, 2019, and Japanese Patent Application No. 2020-135387, filed Aug. 7, 2020, the entire contents of each are incorporated herein by reference.

FIELD

The present disclosure relates to a communication control device and a communication control method.

BACKGROUND

In the United States, a method of protecting a primary system such as a citizens broadband radio service (CBRS) utilizing a frequency sharing technology is formulated by a law, a standard, or the like.

In addition, in Japan, a field pickup unit (FPU) operated in the 2.3 GHz band is assumed to become a target of frequency sharing.

CITATION LIST

Non Patent Literature

Non Patent Literature 1: WINNF-TS-0247-V1.0.0 CBRS Certified Professional Installer Accreditation Technical Specification Non Patent Literature 2: WINNF-TS-0016-V1.2.1 Signaling Protocols and Procedures for Citizens Broadband Radio Service (CBRS): Spectrum Access System (SAS)—Citizens Broadband Radio Service Device (CBSD) Interface Technical Specification Non Patent Literature 3: ECC Report 186, Technical and operational requirements for the operation of white space devices under geo-location approach, CEPT ECC, 2013 January Non Patent Literature 4: White Space Database Provider (WSDB) Contract, available at https://www.ofcom.org.uk/_data/assets/pdf file/0026/84077/white_space_database_contract_for_operational_use_of_wsds.pdf Non Patent Literature 5: WINNF-TS-0096-V1.2.0 Signaling Protocols and Procedures for Citizens Broadband Radio Service (CBRS): Spectrum Access System (SAS)—SAS Interface Technical Specification Non Patent Literature 6: WINNF-TS-0112-V1.4.1 Requirements for Commercial Operation in the U.S. 3550-3700 MHz Citizens Broadband Radio Service Band Non Patent Literature 7: Information and Communications Council, (93th) Communication Technology Sectional Meeting, Broadcast System Committee Report

SUMMARY

Technical Problem

However, in a frequency band in which a wireless system of a field pickup unit (FPU) is a primary system, a primary system protection method to be used may be different even in the same primary system. For this reason, there is a possibility that the primary system protection method in related art as formulated in the United States cannot support sharing of a frequency band in Japan.

The present disclosure therefore proposes a communication control device and a communication control method capable of appropriately protecting a primary system from a secondary system.

Solution to Problem

To solve the above problem, a communication control device that provides a service that requires an identity verification process according to an embodiment of the present disclosure includes: a control unit configured to select one protection method from a plurality of primary system protection methods including a dynamic or static protection method on a basis of a use form and use position information of a wireless station of a primary system and protect the wireless station of the primary system on a basis of the selected protection method.

BRIEF DESCRIPTION OF DRAWINGS

FIG. 2 is a diagram illustrating outline of a primary system protection method according to the present embodiment.

DESCRIPTION OF EMBODIMENTS

Figure 1:
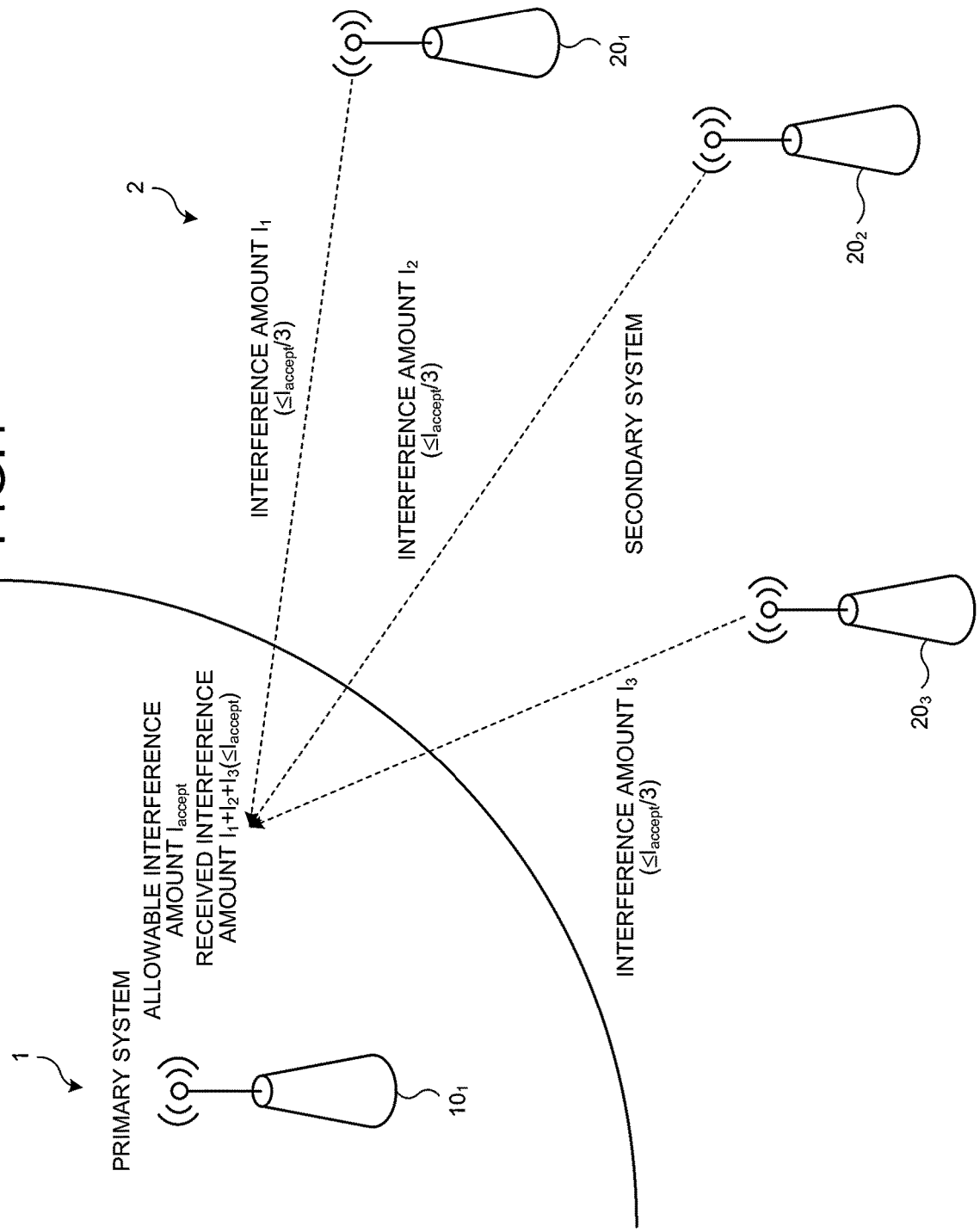
FIG. 1 is an explanatory diagram illustrating an example of allocation of interference margins to communication devices constituting a secondary system.

Embodiments of the present disclosure will be described below in detail with reference to the drawings. In each of the following embodiments, the same parts are denoted by the same reference symbols, and a repetitive description thereof may be omitted.

Further, in the present specification and the drawings, a plurality of components having substantially the same functional configuration is distinguished by attaching different numbers after the same reference numeral in some cases. In one example, a plurality of components having substantially the same functional configuration is distinguished, like communication control devices $40_1$, and $40_2$, as necessary. Unless, however, it is necessary to particularly distinguish each of the plurality of components having substantially the same functional configuration, it is only to attach the same reference numeral. In one example, communication control devices $40_1$ and $40_2$ are simply referred to as communication control devices 40 unless it is not particularly necessary to distinguish them.

Further, the present disclosure will be described in accordance with the order of items indicated below.

1. Introduction
   1-1. Control of wireless system for achieving frequency sharing
   1-2. Outline of the present embodiment
   1-3. Terms of frequency and sharing
2. Configuration of communication system
   2-1. Overall configuration of communication system
   2-2. Configuration of base station device
   2-3. Configuration of terminal device
   2-4. Configuration of communication control device
   2-5. Configuration of proxy device
3. Interference model
4. Primary system protection method
   4-1. Interference margin simultaneous allocation type
   4-2. Interference margin iterative allocation type
5. Description of various procedures
   5-1. Registration procedure
   5-2. Available spectrum query procedure
   5-3. Frequency use permission procedure
   5-4. Frequency use notification
   5-5. Supplement to various procedures
   5-6. Various procedures for terminal device
   5-7. Procedure occurring between communication control devices
6. Primary system protection
   6-1. Protection model of assumed primary system
   6-2. Information regarding primary wireless station
   6-3. Primary system protection
   6-4. Point/area protection in consideration of antenna rotation range
7. Modifications
   7-1. Modification regarding system configuration
   7-2. Other modifications
8. Conclusion 1. Introduction In recent years, due to increase and diversification of a content amount via a wireless environment in which various wireless systems are mixed, a problem that radio resources (frequencies) that can be allocated to wireless systems are depleted has emerged. However, all radio bands are already used by existing wireless systems, and thus, it has been found that it is difficult to allocate new radio resources. It has therefore started to be desired to utilize temporally and spatially vacant radio waves (white space) (dynamic frequency sharing (dynamic spectrum access (DSA)) of an existing wireless system by utilizing a cognitive radio technology in order to generate necessary radio resources.

In recent years, in the United States, with the aim of opening a federal use band (3.55-3.70 GHz) to the general public, legalization and standardization of a citizens broadband radio service (CBRS) utilizing a frequency sharing technology are accelerated. The federal use band (3.55-3.70 GHz) overlaps with a frequency band that is regarded as 3GPP bands 42 and 43 worldwide. In addition, the cognitive radio technology contributes not only to dynamic frequency sharing but also to improvement of frequency utilization efficiency by a wireless system. For example, in ETSI EN 303 387 and IEEE 802.19.1-2014, an inter-wireless system coexistence technology utilizing a database is specified.

In addition, in Japan, the frequency restructuring action in 2019 includes promotion of dynamic frequency sharing for the 2.3 GHz band, the 26 GHz band, and the like. In these bands, broadcasting operation, public operation, a fixed wireless access system, an airport surface detection radar, a low power data communication system, and the like, are already operated, and there is a possibility that these systems become targets of frequency sharing.

1-1. Control of Wireless System for Achieving Frequency Sharing

In general, in frequency sharing, the National Regulatory Authority (NRA) of each country/region is required to protect a wireless system (primary system) of a primary user who is licensed or authorized for use of the frequency band. Typically, an allowable interference reference value of the primary system is provided by the NRA, and a wireless system (secondary system) of a secondary user is required to cause interference generated by sharing to fall below the allowable interference reference value.

In order to achieve frequency sharing, for example, a communication control device (for example, a frequency management database) controls communication of the secondary system so as not to give fatal interference to the primary system. The communication control device is a device that manages communication, and the like, of a communication device. For example, the communication control device is a device (system) for managing radio resources (for example, frequencies) such as a geo-location database (GLDB) and a spectrum access system (SAS). In a case of the present embodiment, the communication control device corresponds to a communication control device 40 which will be described later. The communication control device 40 will be described in detail later.

Here, the primary system is, for example, a system (for example, an existing system) that preferentially uses a radio wave in a predetermined frequency band over other systems such as the secondary system. In the 2.3 GHz band, the primary system corresponds to an FPU used by a broadcaster and a wireless system used in public operation. The primary system is not required to avoid or prevent interference to the secondary system. In addition, the primary system is protected from interference by the secondary system. In other words, the primary system can use a frequency band without considering presence of the secondary system.

The secondary system is, for example, a system that secondarily uses (for example, dynamic frequency sharing) a radio wave in a frequency band used by the primary system. The secondary system is required to avoid or prevent interference to the primary system having higher priority. The secondary system includes not only a wireless system operated by a business operator who holds a license but also a wireless system that can be freely used by a user without a license.

Each of the primary system and the secondary system may include a plurality of communication devices or may include one communication device. The communication control device allocates an interference allowable amount to one or a plurality of communication devices so that aggregation of interference (interference aggregation) of one or a plurality of communication devices constituting the secondary system to the primary system does not exceed an interference allowable amount (also referred to as an interference margin) of the primary system. In this event, the interference allowable amount may be an interference amount determined in advance by an operator of the primary system, a public organization that manages radio waves, or the like. In the following description, the interference margin refers to an interference allowable amount. Further, interference aggregation may be referred to as aggregated interference power.

FIG. 1 is an explanatory diagram illustrating an example of allocation of interference margins to communication devices constituting a secondary system. In the example of FIG. 1, the communication system 1 is a primary system, and the communication system 2 is a secondary system. The communication system 1 includes a wireless communication device $10_1$, and the like. Further, the communication system 2 includes base station devices $20_1$, $20_2$, $20_3$, and the like. Note that while in the example of FIG. 1, the communication system 1 includes only one wireless communication device 10, but the communication system 1 may include a plurality of wireless communication devices 10. Further, while in the example of FIG. 1, the communication system 2 includes three base station devices 20, but the number of base station devices 20 included in the communication system 2 may be less than or more than three. In addition, the wireless communication device included in the communication system 2 does not necessarily have to be a base station device. While only one primary system (the communication system 1 in the example of FIG. 1) and one secondary system (the communication system 2 in the example of FIG. 1) are illustrated in the example of FIG. 1, a plurality of primary systems and a plurality of secondary systems may be provided.

The wireless communication device $10_1$ and the base station devices $20_1$, $20_2$, and $20_3$ can transmit and receive radio waves. The amount of interference allowed by the wireless communication device $10_1$ is $I_{accept}$. In addition, amounts of interference given to predetermined protection points of the communication system 1 (primary system) by the base station devices $20_1$, $20_2$, and $20_3$ are interference amounts $I_1$, $I_2$, and $I_3$, respectively. Here, the protection point is an interference calculation reference point for protecting the communication system 1.

The communication control device allocates the interference margin $I_{accept}$ to the plurality of base station devices 20 such that aggregation of interference to a predetermined protection point of the communication system 1 (the received interference amount $I_1+I_2+I_3$ illustrated in FIG. 1) does not exceed the interference margin $I_{accept}$. For example, the communication control device allocates the interference margin $I_{accept}$ to each base station device 20 such that each of the interference amounts $I_1$, $I_2$, and $I_3$ becomes $I_{accept}/3$. Alternatively, the communication control device allocates the interference margin $I_{accept}$ to each base station device 20 such that each of the interference amounts $I_1$, $I_2$, and $I_3$ becomes $I_{accept}/3$ or less. Note that the method of allocating the interference margin is not limited to this example.

The communication control device calculates a maximum transmission power (hereinafter, referred to as maximum allowable transmission power) allowed for each base station device 20 on the basis of the allocated interference amount (hereinafter, referred to as an allocated interference amount). For example, the communication control device calculates the maximum allowable transmission power of each base station device 20 by calculating back from the allocated interference amount on the basis of a propagation loss, an antenna gain, and the like. Then, the communication control device notifies each base station device 20 of information on the calculated maximum allowable transmission power.

1-2. Outline of the Present Embodiment

In primary system protection in related art such as CBRS of the United States, a primary system protection method to be used for each primary system is defined by a law, a standard, or the like.

On the other hand, while it is assumed in Japan that a wireless system such as an FPU is a target of frequency sharing, in such a band, even in the same primary system, presence or absence of a plan for movement and use varies depending on a use scene and a type of a wireless station. Thus, the primary system protection method to be used is different for each use scene and each type of wireless station. Primary system protection in related art does not have a criterion for selecting a primary system protection method, and thus, cannot support frequency sharing in Japan.

Further, the primary system protection in related art assumes only limited cases. For example, a case where a parameter related to an antenna rotation range of a protection target wireless station is given as a value, a case where the primary system needs to be protected even if an antenna is directed in any direction for the federal incumbent, and the like, are assumed.

In such cases, in the primary system such as the FPU, it is assumed that the antenna rotates during the planned use, and the parameter fluctuates or the parameter related to rotation of the antenna changes each time the wireless station is used for unplanned use. It is therefore necessary to achieve protection of the primary system in consideration of the antenna rotation range during use and consideration of the antenna direction at the time of emergency use, but the primary protection system in related art does not take these into consideration.

Therefore, the communication control device of the present disclosure selects one protection method from a plurality of primary system protection methods including a dynamic or static protection method on the basis of a use form and use position information of a wireless station of a primary system. Then, the communication control device of the present disclosure protects a wireless station of the primary system on the basis of the selected protection method. FIG. 2 is a diagram illustrating outline of a primary system protection method according to the present embodiment.

As illustrated in FIG. 2, the communication control device of the present disclosure considers whether a use form is planned use or unplanned use along with use position information of the wireless station of the primary system. Then, in a case where the use form is planned use, the communication control device of the present disclosure selects either static point protection or static area protection, which is a static protection method, as a protection method of the wireless station of the primary system. Then, the communication control device of the present disclosure protects the primary system on the basis of the selected static point protection or static area protection. On the other hand, in a case where the use form is unplanned use, the communication control device of the present disclosure selects either dynamic point protection or dynamic area protection, which is a dynamic protection method, as a method of protecting the wireless station of the primary system. Then, the communication control device of the present disclosure protects the primary system on the basis of the selected dynamic point protection or dynamic area protection.

In this manner, the communication control device of the present disclosure enables the primary system to be appropriately protected from the secondary system.

1-3. Terms of Frequency and Sharing

Note that in the present embodiment, it is assumed that the primary system (communication system 1) and the secondary system (communication system 2) are in a dynamic frequency sharing environment. Hereinafter, the present embodiment will be described by taking the CBRS as an example which is legally prepared by the Federal Communications Commission (FCC) of the United States. Note that the communication system 1 and the communication system 2 of the present embodiment are not limited to the CBRS.

Figure 3:
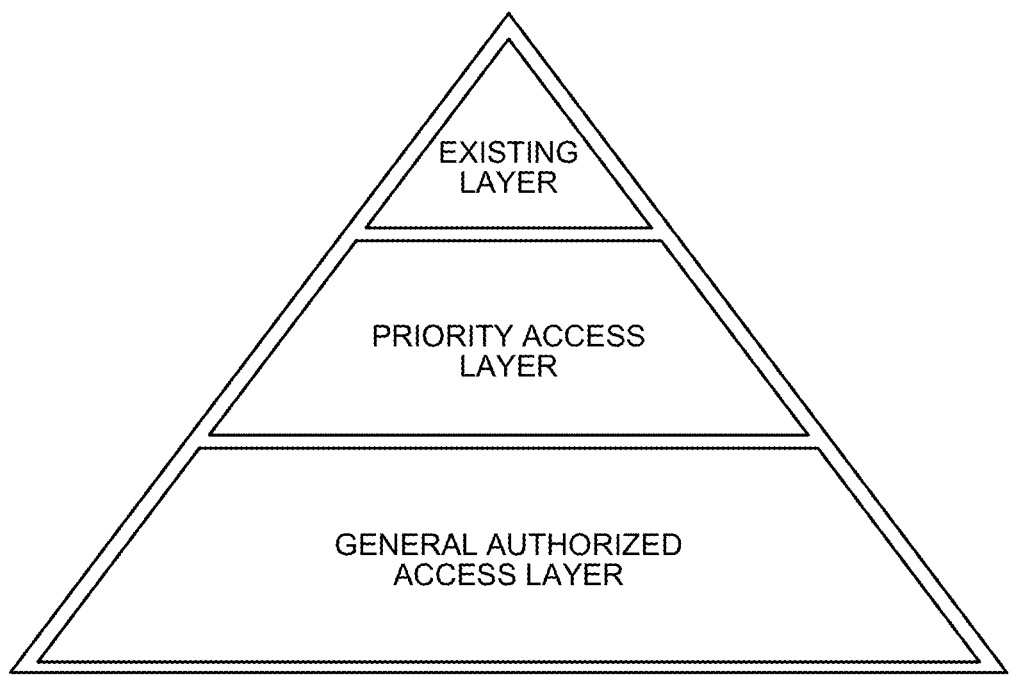
FIG. 3 is an explanatory diagram illustrating a hierarchical structure in CBRS.

FIG. 3 is an explanatory diagram illustrating a hierarchical structure in CBRS. As illustrated in FIG. 3, each of the users of the frequency band is classified into one of three groups. Each group is referred to as a "tier". In each of these three groups, a hierarchical structure including an existing layer (incumbent tier), a priority access layer (priority access tier), and a general authorized access layer (general authorized access tier) is defined. In this hierarchical structure, the priority access layer (priority access tier) is located above the general authorized access layer (general authorized access tier), and the existing layer (incumbent tier) is located above the priority access layer. In the CBRS as an example, a system (existing system) located in the existing layer is a primary system, and a system located in the general authorized access layer and a system located in the priority access layer are secondary systems.

The existing layer (incumbent tier) is a group of existing users of the shared frequency band. In the CBRS, a department of defense (DOD), a fixed satellite operator, and a new condition application exclusion radio broadband licensee (grandfathered wireless broadband licenses (GWBL) are determined as existing users. The "incumbent tier" is not required to avoid or prevent interference to the "priority access tier" and the "general authorized access (GAA) tier" with lower priority. Further, the "incumbent tier" is protected from interference by the "priority access tier" and the "GAA tier". In other words, the user of the "incumbent tier" can use the frequency band without considering existence of other groups.

The priority access layer (priority access tier) is a group of users having a license called priority access license (PAL). While it is required to avoid or prevent interference to the "incumbent tier" having higher priority than priority of the "priority access tier", it is not required to avoid or prevent interference to the "GAA tier" having lower priority. Also, while the "priority access tier" is not protected from interference by the "incumbent tier" with higher priority, the "priority access tier" is protected from interference by the "GAA tier" with lower priority. The general authorized access layer (GAA tier) is a group of all other users not belonging to the above "incumbent tier" and "priority access tier". It is required to avoid or prevent interference to the "incumbent tier" and the "priority access tier" with higher priority. Also, the "GAA tier" is not protected from interference by the "incumbent tier" and the "priority access tier" with higher priority. In other words, the "GAA tier" is a "tier" for which opportunistic frequency utilization is required in the law.

Note that the hierarchical structure is not limited to these definitions. While the CBRS is generally called a three-tier structure, the CBRS may have a two-tier structure. A typical example is a two-tier structure such as licensed shared access (LSA) and TV band white space (TVWS). In the LSA, a structure equivalent to the combination of the "incumbent tier" and the "priority access tier" is adopted. Further, in the TVWS, a structure equivalent to the combination of the "incumbent tier" and the "GAA tier" is adopted. In addition, there may be four or more tiers. Specifically, for example, an intermediate layer corresponding to the "priority access tier" may be further prioritized. In addition, for example, priority may be set to the "GAA Tier" in a similar manner.

Figure 4:
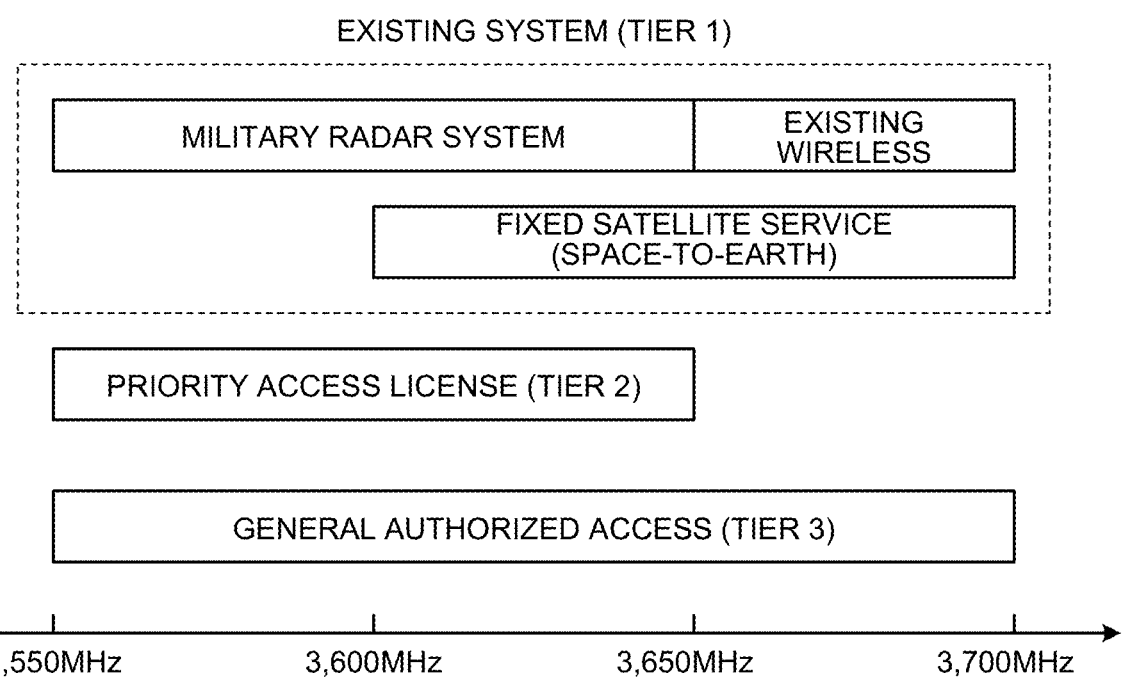
FIG. 4 is an explanatory diagram illustrating a band of the CBRS.

FIG. 4 is an explanatory diagram illustrating a band of the CBRS. Taking the CBRS described above as an example, the primary system is a military radar system, an existing wireless system (grandfathered wireless system), or a fixed satellite service (space-to-earth). Here, the military radar system is typically an on-board radar. Further, the secondary system is a wireless network system including base stations and terminals called a citizens broadband radio service device (CBSD) and an end user device (EUD). A priority further exists in the secondary system, and a priority access license (PAL) for which a shared band can be licensed and a general authorized access (GAA) equivalent to unlicensed are defined. A layer 1 (tier 1) illustrated in FIG. 4 corresponds to the existing layer illustrated in FIG. 3. Further, a layer 2 (tier 2) illustrated in FIG. 4 corresponds to the priority access layer illustrated in FIG. 3. Further, a layer 3 (tier 3) illustrated in FIG. 4 corresponds to the general authorized access layer illustrated in FIG. 3.

Note that the primary system (communication system 1) of the present embodiment is not limited to the example illustrated in FIG. 4. Another type of the wireless system may be used as the primary system (communication system 1). For example, another wireless system may be set as the primary system according to the country, region, and a frequency band to be applied. For example, the primary system may be a television broadcasting system such as a digital video broadcasting-terrestrial (DVB-T) system. Further, the primary system may be a wireless system called a fixed system (FS). Still further, frequency sharing may be performed in other frequency bands. For example, typical examples of the primary system include LSA and TV band white space (TVWS). Further, the primary system may be a cellular communication system such as long term evolution (LTE) and new radio (NR). Still further, the primary system may be an aeronautical wireless system such as an aeronautical radio navigation service (ARNS). Of course, the primary system is not limited to the above wireless system and may be other types of the wireless system.

Further, a vacant radio wave (white space) to be used by the communication system 2 is not limited to the frequency band of the federal use band (3.55-3.70 GHz). The communication system 2 may secondarily use a frequency band different from the federal use band (3.55-3.70 GHz). For example, if the primary system (communication system 1) is a television broadcasting system, the communication system 2 may be a system that secondarily uses the TV white space. Here, the TV white space refers to a frequency band that is not used by the television broadcasting system among frequency channels allocated to the television broadcasting system (primary system). In this event, the TV white space may be a channel that is not used according to the region.

Further, a relationship between the communication system 1 and the communication system 2 is not limited to a frequency sharing relationship in which the communication system 1 is a primary system and the communication system 2 is a secondary system. The relationship between the communication system 1 and the communication system 2 may be a network coexistence relationship between the same or different wireless systems using the same frequency.

In general, in frequency sharing, an existing system using a target band is referred to as a primary system, and a system of a secondary user is referred to as a secondary system. However, in a case where the present embodiment is applied to an environment other than the frequency sharing environment, these (the primary system and the secondary system) may be replaced with a system having another term. For example, a macro cell in HetNet may be a primary system, and a small cell or a relay station may be a secondary system. In addition, the base station may be a primary system, and relay UE or vehicle UE that implements D2D or V2X existing in its coverage may be a secondary system. The base station is not limited to a fixed type and may be a portable/mobile type. In such a case, for example, the communication control device provided by the present invention may be provided in a base station, a relay station, relay UE, or the like.

The term "frequency" appearing in the following description may be replaced with another term. For example, the term "frequency" may be replaced with terms such as "resource", "resource block", "resource element", "channel", "component carrier", "carrier", and "subcarrier" or terms having similar meanings. Note that the frequency is a type of radio resources. The "radio resource" can also be referred to as a "frequency resource".

2. Configuration of Communication System

The communication system 2 according to the present embodiment will be described below. The communication system 2 is a wireless communication system that performs wireless communication by secondarily using a frequency band to be used by the communication system 1 (first wireless system). For example, the communication system 2 is a wireless communication system that dynamically shares part or all of frequency bands allocated to the communication system 1. The communication system 2 provides a wireless service to a user or a device owned by the user by using a predetermined radio access technology.

Here, the communication system 2 may be a cellular communication system such as wideband code division multiple access (W-CDMA), code division multiple access 2000 (cdma 2000), LTE, and NR. It is assumed in the following description that "LTE" includes LTE-Advanced (LTE-A), LTE-Advanced Pro (LTE-A Pro), and evolved universal terrestrial radio access (EUTRA). In addition, "NR" includes a new radio access technology (NRAT) and further EUTRA (FEUTRA). Note that the communication system 2 is not limited to the cellular communication system. For example, the communication system 2 may be other wireless communication systems such as a wireless local area network (LAN) system, a television broadcasting system, an aviation wireless system, or a space wireless communication system.

In the present embodiment, the communication system 1 is a primary system, and the communication system 2 is a secondary system. As described above, a plurality of communication systems 1 and a plurality of communication systems 2 may be provided. Note that, while in the example of FIG. 1, the communication system 1 includes one wireless communication device 10 (the wireless communication device $10_1$ illustrated in FIG. 1), but the communication system 1 may include a plurality of wireless communication devices 10. The configuration of the wireless communication device 10 may be the same as the configuration of the base station device 20 or the terminal device 30 which will be described later.

2-1. Overall Configuration of Communication System

The communication system 2 typically includes the following entities.
   Communication device (for example, a base station device or a proxy device)
   Terminal device
   Communication control device Note that while in the following description, the entity serving as the communication device is assumed to be the base station device 20 and/or a proxy device 50, but the entity serving as the communication device is not limited to the base station device 20 and the proxy device 50 and may be other communication devices (for example, the terminal device 30 and the communication control device 40).

Figure 5:
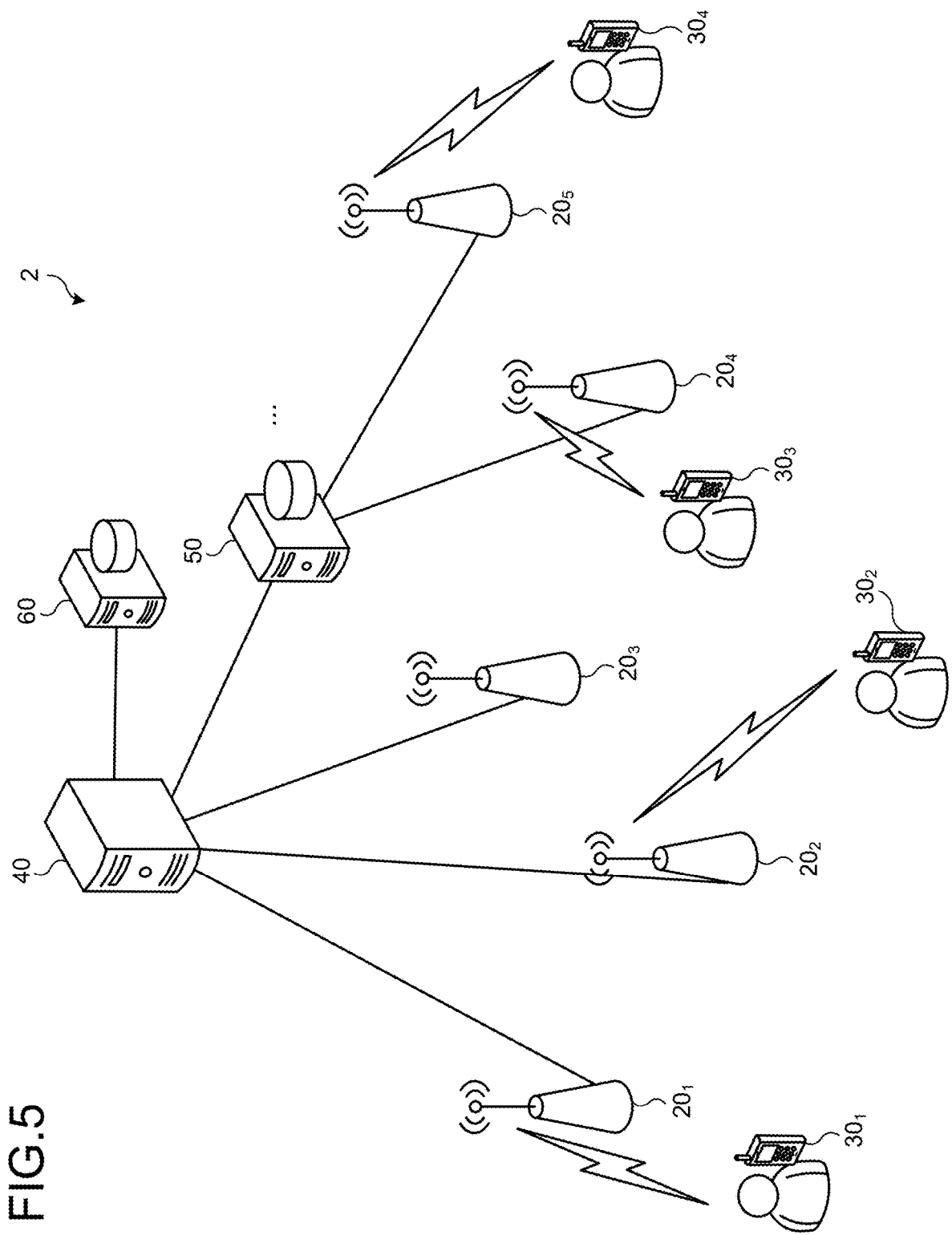
FIG. 5 is a diagram illustrating a configuration example of a communication system according to the embodiment of the present disclosure.

FIG. 5 is a diagram illustrating a configuration example of a communication system 2 according to the embodiment of the present disclosure. The communication system 2 includes a base station device 20, a terminal device 30, a communication control device 40, and a proxy device 50. The communication system 2 provides a wireless service to a user or a device owned by the user by each device (for example, a communication device such as a wireless communication device) constituting the communication system 2 operating in cooperation. The wireless communication device is a device having a wireless communication function and corresponds to the base station devices 20 and the terminal device 30 in the example of FIG. 5.

Note that the communication control device 40 and the proxy device 50 may have a wireless communication function. In this case, the communication control device 40 and the proxy device 50 can also be regarded as wireless communication devices. In the following description, the wireless communication device may be simply referred to as a communication device. Note that the communication device is not limited to a wireless communication device, and for example, a device which does not have a wireless communication function and which can only perform wired communication can also be regarded as a communication device.

The communication system 2 may include a plurality of base station devices 20, a plurality of terminal devices 30, a plurality of communication control devices 40, and a plurality of proxy devices 50. In the example of FIG. 5, the communication system 1 includes base station devices $20_1$, $20_2$, $20_3$, $20_4$, $20_5$, and the like, as the base station device 20. Further, the communication system 2 includes terminal devices $30_1$, $30_2$, $30_3$, $30_4$, and the like, as the terminal device 30. Still further, the communication system 1 includes communication control devices $40_1$ and $40_2$ as the communication control device 40.

Note that in the following description, a wireless communication device may be referred to as a wireless system. For example, each of the wireless communication device 10 and the base station device $20_1$ to $20_5$ is one wireless system. In addition, each of the terminal devices $30_1$ to $30_4$ is one wireless system. Note that while in the following description, the communication system 1 is referred to as a first wireless system, each of one or a plurality of wireless communication devices 10 included in the communication system 1 may be regarded as the first wireless system. Further, while in the following description, each of one or a plurality of base station devices 20 included in the communication system 2 is referred to as a second wireless system, the communication system 2 itself may be regarded as a second wireless system, or each of one or a plurality of terminal devices 30 included in the communication system 2 may be regarded as the second wireless system. If the communication control device 40 and the proxy device 50 have a wireless communication function, each of the communication control devices 40 or each of the proxy devices 50 may be regarded as the second wireless system.

Note that the wireless system may be one system including a plurality of communication devices including at least one wireless communication device. For example, a system including one or a plurality of base station devices 20 and one or a plurality of terminal devices 30 under the base station devices may be regarded as one wireless system. Further, each of the communication system 1 and the communication system 2 can be regarded as one wireless system. In the following description, a communication system including a plurality of communication devices including at least one wireless communication device may be referred to as a wireless communication system or may be simply referred to as a communication system. Note that one system including a plurality of communication devices including one wireless communication device may be regarded as the first wireless system or the second wireless system.

[Base Station Device]

The base station device 20 (second wireless system) is a wireless communication device that wirelessly communicates with the terminal device 30 or other communication devices (other base station devices 20 and other proxy devices 50). The base station device 20 is a type of the communication device. The base station device 20 is, for example, a device corresponding to a wireless base station (base station, node B, eNB, gNB, etc.) or a radio access point. The base station device 20 may be a wireless relay station. The base station device 20 may be an on-road base station device such as a road side unit (RSU). Further, the base station device 20 may be an optical fiber system called a remote radio head (RRH). Further, the base station device 20 may be a receiving station of a field pickup unit (FPU). In the present embodiment, a base station of a wireless communication system may be referred to as a base station device. Note that the radio access technology used by the base station device 20 may be a cellular communication technology or a wireless LAN technology. Further, the radio access technology used by the base station device 20 is not limited to these and may be another radio access technology.

The base station device 20 does not necessarily have to be fixed and may be installed in a moving object such as an automobile. Further, the base station device 20 does not necessarily have to exist on the ground, and a communication device function may be provided for an object existing in the air or space, such as an aircraft, a drone, a helicopter, or a satellite, or an object existing on the sea or under the sea, such as a ship or a submarine. In such a case, the base station device 20 can perform wireless communication with another fixedly installed communication device.

The base station device 20 may have large coverage such as a macro cell or small coverage such as a pico cell. Of course, the base station device 20 may have extremely small coverage such as a femto cell. Further, in a case where the base station device 20 has a beamforming capability, a cell or a service area may be formed for each beam.

The base station device 20 may be utilized, operated, and/or managed by various entities. For example, the base station device 20 may be assumed to be a mobile network operator (MNO), a mobile virtual network operator (MVNO), a mobile virtual network enabler (MVNE), a neutral host network (NHN) operator, a broadcaster, an enterprise, an educational institution (such as educational institutions and boards of local governments), a real estate (such as a building and an apartment) administrator, an individual, or the like. Of course, the subject that uses, operates, and/or manages the base station device 20 is not limited thereto.

The base station device 20 may be installed and/or operated by one business operator or may be installed and/or operated by one individual. Of course, the subject that installs and operates the base station device 20 is not limited thereto. For example, the base station device 20 may be installed and operated by a plurality of business operators or a plurality of individuals in cooperation. Further, the base station device 20 may be a shared facility used by a plurality of business operators or a plurality of individuals. In this case, the facility may be installed and/or operated by a third party different from the user.

The base station device 20 operated by the business operator is typically connected to the Internet via a core network. Further, the base station device 20 performs operation management and maintenance by a function called operation, administration & maintenance (OA & M). Note that, in the communication system 2, for example, there may be a network manager that integrally controls the base station device 20 in the network.

Note that the concept of the base station includes an access point and a wireless relay station (It is also referred to as a relay device). In addition, the concept of the base station includes not only a structure equipped with functions of the base station but also a device installed in the structure. The structure is, for example, buildings such as office buildings, houses, steel towers, railway station facilities, airport facilities, harbor facilities, and stadiums. Moreover, the concept of a structure includes not only buildings but also non-building structures such as tunnels, bridges, dams, fences, and steel columns, or also includes facilities such as cranes, gates, and windmills. In addition, the concept of a structure includes not only structures on the ground (land in the narrow sense) or under the ground, but also structures on the water such as piers and mega-floats (very large floating structures) or structures underwater such as ocean observation facilities.

Further, the base station may be a base station (mobile station) configured to be movable. At this time, the base station (mobile station) may be a wireless communication device installed in a moving body or may be a moving body itself. In addition, the moving body may be a moving body that moves on the ground (land in the narrow sense) (e.g., a vehicle such as automobiles, buses, trucks, trains, and linear motor cars), or a moving body that moves under (e.g., in a tunnel) the ground (e.g., a subway). Of course, the moving body may be a mobile terminal such as a smartphone. In addition, the moving body may be a moving object that moves on water (e.g., a ship such as passenger ships, cargo ships, and hovercrafts), or a moving body that moves underwater (e.g., a submersible ship such as submersible vessels, submarines, and unmanned submarines). In addition, the moving body may be a moving object that moves in the atmosphere (e.g., an aircraft such as airplanes, airships, and drones), or a space moving body that moves outside the atmosphere (e.g., artificial celestial bodies such as artificial satellites, spacecraft, space stations, and space probes).

[Terminal Device]

The terminal device 30 is communication equipment having a communication function. The terminal device 30 is typically communication equipment such as a smartphone. The terminal device 30 may be a user terminal such as a mobile phone, a smart device (smartphone or tablet), a wearable terminal, a personal digital assistant (PDA), and a personal computer. Further, the terminal device 30 may be a motorcycle, a mobile relay vehicle, or the like, on which communication equipment such as an FPU is mounted. The terminal device 30 may be referred to as user equipment, a user terminal, a user station, a mobile terminal, a mobile station, or the like.

Note that the terminal device 30 does not have to be one used by a person. The terminal device 30 may be a sensor installed in a machine or a building of a factory like so-called machine type communication (MTC). Further, the terminal device 30 may be a machine to machine (M2M) device or an Internet of things (IoT) device. Further, the terminal device 30 may be a device having a relay communication function as represented by device to device (D2D) and vehicle to everything (V2X). Further, the terminal device 30 may be equipment called client premises equipment (CPE) used for wireless backhaul, or the like. Still further, the terminal device 30 may be a wireless communication device installed in a moving body or may be a moving body itself.

Further, the terminal device 30 does not necessarily have to exist on the ground, and may be an object existing in the air or space, such as an aircraft, a drone, a helicopter, or a satellite, or an object existing on the sea or under the sea, such as a ship or a submarine.

[Communication Control Device]

The communication control device 40 is a device that manages the base station device 20. For example, the communication control device 40 is a device that controls wireless communication of the base station device 20. For example, the communication control device 40 determines communication parameters (also referred to as operation parameters) to be used by the base station device 20 and gives permission or an instruction to the base station device 20. In this event, the communication control device 40 may be a network manager that integrally controls wireless devices in the network. Taking ETSI EN 303 387 or IEEE 802.19.1-2014 as an example, the communication control device 40 may be a control device such as a spectrum manager/coexistence manager that controls radio wave interference between wireless equipment. Further, for example, a registered location secure server (RLSS) defined in IEEE 802.11-2016 can also serve as the communication control device 40. Still further, in a frequency sharing environment, a database (database server, device, system) such as a geolocation database (GLDB) and a spectrum access system (SAS) can also serve as the communication control device 40. Basically, a control target of the communication control device 40 is the base station device, but the communication control device 40 may control the terminal device 30 under the control of the base station device 20.

Figure 6:
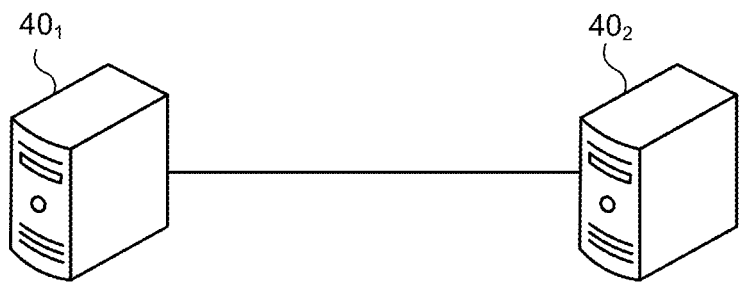
FIG. 6 is a diagram illustrating a model in which communication control devices are arranged in a distributed manner.

Note that a plurality of communication control devices 40 may exist in one communication system 2. FIG. 6 is a diagram illustrating a model in which communication control devices 40 are arranged in a distributed manner. In this case, the plurality of communication control devices 40 (in a case of the example of FIG. 6, a communication control device 40$_1$ and a communication control device 40$_2$) exchanges information on the base station devices 20 that are managed with each other and allocates necessary frequencies or performs calculation for interference control.

Figure 7:
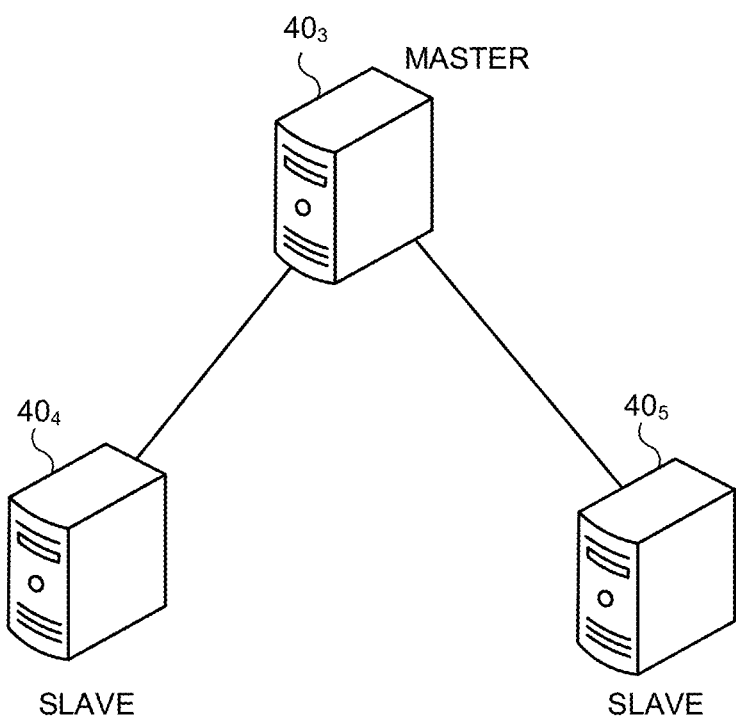
FIG. 7 is a diagram illustrating a model in which one communication control device centrally controls a plurality of communication control devices.

Further, the communication control device 40 may be a master-slave device. FIG. 7 is a diagram illustrating a model (so-called master-slave model) in which one communication control device centrally controls a plurality of communication control devices. In the example of FIG. 7, a communication control device 40$_3$ is a master communication control device, and communication control devices 40$_4$ and 40$_5$ are slave communication control devices. In such a system, the master communication control device can control a plurality of slave communication control devices to intensively make a decision. In addition, the master communication control device can also perform delegation, discarding, and the like, of the decision-making authority to each slave communication control device for the purpose of load distribution (load balancing), and the like.

Note that the communication control device 40 can also acquire necessary information from entities other than the base station device 20, the terminal device 30, and the proxy device 50 for its role. Specifically, the communication control device 40 can acquire information necessary for protection, such as position information of the primary system, from, for example, a database (regulatory database) managed and operated by a national or regional radio administration agency. An example of the regulatory database is a universal licensing system (ULS) operated by the United States Federal Communications Commission. Other examples of the information necessary for protection may include, for example, out-of-band emission limit (OOBE), adjacent channel leakage ratio (ACLR), adjacent channel selectivity, a fading margin and/or a protection ratio (PR), and the like. For these examples, it is preferable to use numerical values in a case where these numerical values are fixedly given by a law.

In addition, the communication control device 40 can acquire detailed specifications and use schedule information of the wireless station (primary wireless station) of the primary system from a wireless station specification database and a wireless station use schedule database. There is a possibility that the wireless station specification database to which the specification of the primary wireless station is input and the wireless station use schedule database to which the use schedule information is input are managed and operated by a broadcaster, a public service organization, or the like, which is an operator of the primary system. In addition, the wireless station specification database and the wireless station use schedule database may be managed and operated by an operator of the communication control device, an administrative agency, a third party organization, or the like, in addition to a broadcaster, a public service organization, or the like, which is an operator of the primary system. The primary system operator stores various types of information of the primary wireless station before actually using the wireless station. Further, this database can be operated as one database. Still further, it is not always necessary to obtain various types of information via the database, and for example, the operator of the primary system can directly input information to the communication control device 40 using an HTTP request/response, or the like.

Further, as another example, it can be assumed that the communication control device 40 acquires radio wave sensing information from a radio wave sensing system installed and operated for the purpose of radio wave detection in the primary system. As a specific example, the communication control device 40 can acquire radio wave detection information of the primary system from a radio wave sensing system such as an environmental sensing capability (ESC) in the CBRS of the United States. Further, in a case where the communication device or the terminal has a sensing function, the communication control device 40 may acquire radio wave detection information of the primary system from the communication device or the terminal.

Still further, the operator of the primary system may directly notify the communication control device 40 of use of the wireless station without performing radio wave sensing. In this event, the operator of the primary system can give a notification of the use by writing information such as use time and a place in a database such as the wireless station use schedule database. Further, it can also be assumed that the operator of the primary system directly performs input to the communication control device 40 using an HTTP request/response, or the like.

[Proxy Device]

The proxy device 50 (proxy system) is a device that communicates with the communication control device 40 as a proxy (representative) of one or a plurality of communication devices (for example, the base station device 20). The proxy device 50 is also a type of the communication device. The proxy device 50 may be a domain proxy (DP) defined in Non Patent Literature 2, or the like. Here, the DP refers to an entity that communicates with the SAS instead of each of a plurality of CBSDs or a network including a plurality of CBSDs. Note that the proxy device 50 is not limited to the DP defined in Non Patent Literature 2 as long as it has a function of communicating with the communication control device 40 as a proxy (representative) of one or a plurality of communication devices. A network manager that integrally controls the base station device 20 in the network may be regarded as the proxy device 50.

An interface between the entities may be wired or wireless. For example, not only a wired line but also a wireless interface that does not depend on frequency sharing can be used as an interface between the communication control device and the communication device. In this event, the wireless interface may be, for example, a wireless interface provided by a mobile communication carrier via a licensed band, a wireless interface (for example, a wireless interface using Wi-Fi communication) using an existing license-exempt band, or the like. Hereinafter, the configuration of each device that constitutes the communication system 2 is described in detail.

2-2. Configuration of Base Station Device

Figure 8:
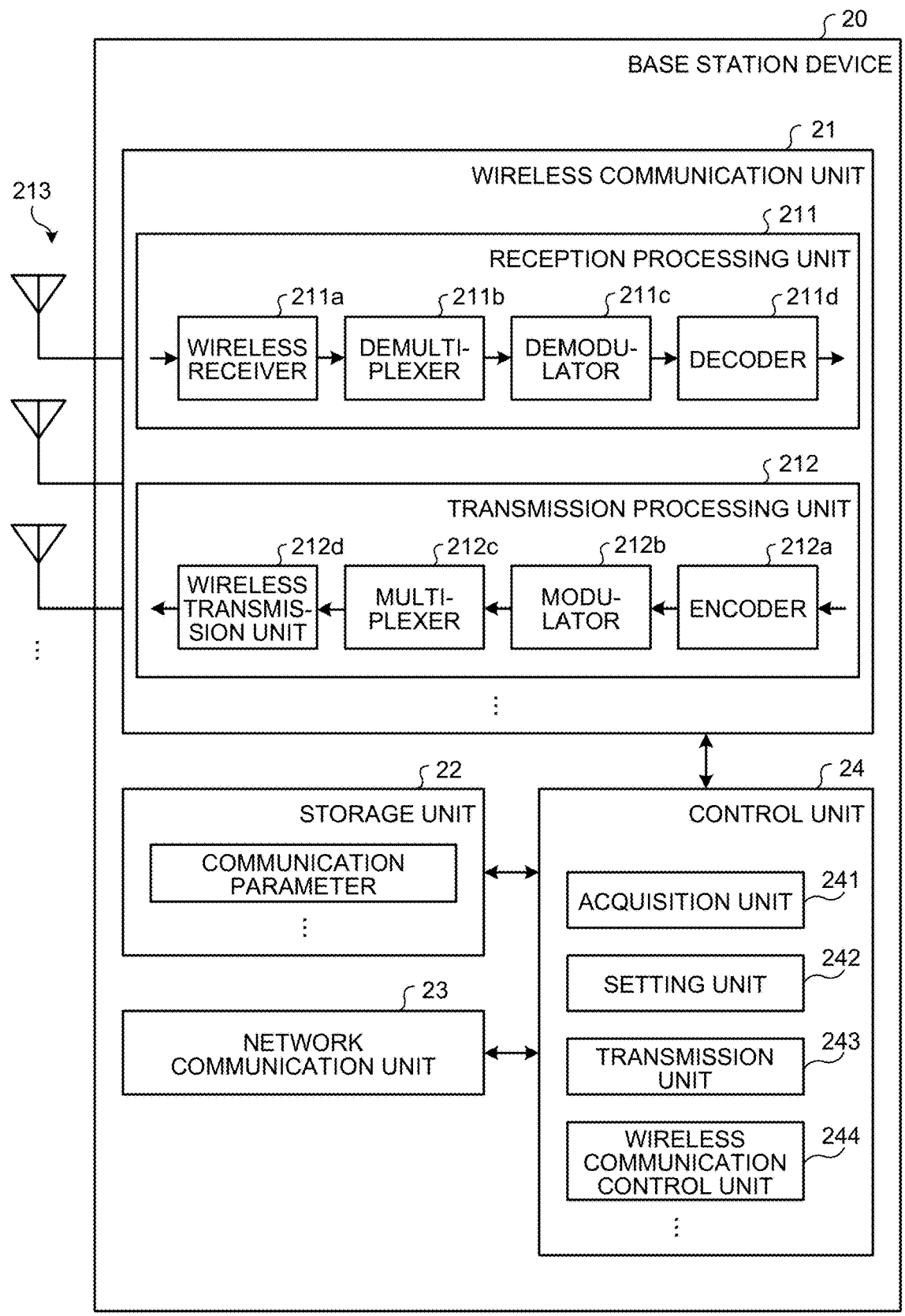
FIG. 8 is a diagram illustrating a configuration example of a base station device according to the embodiment of the present disclosure.

First, a configuration of the base station device 20 will be described. FIG. 8 is a diagram illustrating a configuration example of the base station device 20 according to the embodiment of the present disclosure. The base station device 20 is a wireless communication device (wireless system) that wirelessly communicates with the terminal device 30 under the control of the communication control device 40. For example, the base station device 20 is a base station device (ground station device) located on the ground. In this event, the base station device 20 may be a base station device arranged in a structure on the ground or may be a base station device installed in a moving body moving on the ground. More specifically, the base station device 20 may be an antenna installed in a structure such as a building and a signal processing device connected to the antenna. Of course, the base station device 20 may be a structure or a moving body itself. The term "ground" refers to not only the ground (land in the narrow sense), but also the ground in the broad sense including underground, over-water, and underwater. The base station device 20 is a type of the communication device.

Note that the base station device 20 is not limited to the ground station device. For example, the base station device 20 may be a base station device (non-ground station device) that moves or floats in the air or space. In this event, the base station device 20 may be an aircraft station device or a satellite station device.

The aircraft station may be a device mounted on an aircraft or the like, or may be the aircraft itself. The concept of the aircraft includes not only a heavy aircraft such as an airplane and a glider, but also a light aircraft such as a balloon and an airship. Further, the concept of the aircraft also includes a rotary-wing airplane such as a helicopter and an autogyroscope. Note that the aircraft station device (or an aircraft on which the aircraft station device is mounted) may be a manned aircraft or an unmanned aircraft such as a drone.

The satellite station device may be a device mounted on a space moving body such as artificial satellites or the space moving body itself. The satellite acting as the satellite station device may be any of low earth orbiting (LEO) satellites, medium earth orbiting (MEO) satellites, geostationary earth orbiting (GEO) satellites, and highly elliptical orbiting (HEO) satellites. The satellite station device can understandably be a device mounted on the low-earth orbit satellite, medium-earth orbit satellite, geostationary earth orbit satellite, or highly elliptical orbit satellite.

Further, the base station device 20 may be a relay station device. The relay station device is, in one example, an aircraft station or an earth station. The relay station device can be regarded as a type of the above-described relay device. An aircraft station is a wireless station installed on the ground or on a moving body that moves on the ground to communicate with an aircraft station device. In addition, the earth station is a wireless station located on the earth (including the air) to communicate with a satellite station device. The earth station may be a large earth station or a small earth station such as a very small aperture terminal (VSAT). Moreover, the earth station may be a VSAT control earth station (also referred to as a master station or HUB station) or a VSAT earth station (also referred to as a slave station). In addition, the earth station may be a wireless station installed in a moving body that moves on the ground. In one example, an example of the earth station mounted on a ship includes earth stations on board vessels (ESV). In addition, the earth station can include an aircraft earth station, which is installed in an aircraft (including helicopters) and communicates with a satellite station. In addition, the earth station can include an aviation earth station, which is installed in a moving body that moves on the ground and communicates with an aircraft earth station via a satellite station. Moreover, the relay station device may be a portable mobile station that communicates with a satellite station or an aircraft station.

The base station device 20 includes a wireless communication unit 21, a storage unit 22, a network communication unit 23, and a control unit 24. Moreover, the configuration illustrated in FIG. 8 is a functional configuration and its hardware configuration may be different from that being illustrated. Further, functions of the base station device 20 may be distributed and implemented in a plurality of physically separated devices.

The wireless communication unit 21 is a wireless communication interface that wirelessly communicates with other communication devices (for example, the terminal device 30, the communication control device 40, the proxy device 50, and other base station devices 20). The wireless communication unit 21 operates under the control of the control unit 24. The wireless communication unit 21 may support a plurality of radio access schemes. For example, the wireless communication unit 21 may support both NR and LTE. The wireless communication unit 21 may support other cellular communication schemes such as W-CDMA and cdma 2000. Further, the wireless communication unit 21 may support a wireless LAN communication scheme in addition to the cellular communication scheme. Of course, the wireless communication unit 21 may support only one radio access scheme.

The wireless communication unit 21 includes a reception processing unit 211, a transmission processing unit 212, and an antenna 213. The wireless communication unit 21 can include a plurality of reception processing units 211, a plurality of transmission processing units 212, and a plurality of antennas 213. Moreover, in the case where the wireless communication unit 21 supports a plurality of radio access schemes, each component of the wireless communication unit 21 may be configured to support individually for each radio access scheme. For example, if the base station device 20 is compatible with NR and LTE, the reception processing unit 211 and the transmission processing unit 212 may be configured separately for NR and LTE.

The reception processing unit 211 processes the uplink signal received via the antenna 213. The reception processing unit 211 includes a wireless receiver 211a, a demultiplexer 211b, a demodulator 211c, and a decoder 211d.

The wireless receiver 211a down-converts an uplink signal, removes an unnecessary frequency component, controls an amplification level, performs orthogonal demodulation, performs conversion to a digital signal, removes a guard interval, extracts a frequency domain signal using fast Fourier transform, or the like. For example, it is assumed that the radio access scheme of the base station device 20 is a cellular communication scheme such as LTE. At this time, the demultiplexer 211b separates the signal output from the wireless receiver 211a into an uplink channel, such as physical uplink shared channel (PUSCH) or physical uplink control channel (PUCCH), and an uplink reference signal. The demodulator 211c demodulates the received signal using a modulation scheme such as binary phase shift keying (BPSK) and quadrature phase shift keying (QPSK) for the modulation symbol of the uplink channel. The modulation scheme used by the demodulator 211c may be 16 quadrature amplitude modulation (QAM), 64QAM, or 256QAM. The decoder 211d performs decoding processing on the demodulated coded bits of the uplink channel. The decoded uplink data and uplink control information are output to the control unit 24.

The transmission processing unit 212 performs transmission processing of downlink control information and downlink data. The transmission processing unit 212 includes an encoder 212a, a modulator 212b, a multiplexer 212c, and a wireless transmission unit 212d.

The encoder 212a encodes the downlink control information and downlink data input from the control unit 24 using an encoding scheme such as block encoding, convolutional encoding, and turbo encoding. The modulator 212b modulates the coded bits output from the encoder 212a using a predetermined modulation scheme such as BPSK, QPSK, 16QAM, 64QAM, and 256QAM. The multiplexer 212c multiplexes the modulation symbol of each channel and the downlink reference signal and arranges the result in a predetermined resource element. The wireless transmission unit 212d performs various types of signal processing on the signal from the multiplexer 212c. In one example, the wireless transmission unit 212d performs conversion into the time domain by fast Fourier transform, addition of a guard interval, generation of a baseband digital signal, conversion into an analog signal, quadrature modulation, up-conversion, removal of extra frequency components, and processing of power amplification or the like. The signal generated by the transmission processing unit 212 is transmitted through the antenna 213.

The storage unit 22 is a data readable/writable storage device such as DRAM, SRAM, flash memory, and hard disk. The storage unit 22 functions as a storage means of the base station device 20. The storage unit 22 stores desired transmission power information, an operation parameter, holding resource information, and the like.

The desired transmission power information is information on transmission power that the base station device 20 requests to the communication control device 40 as information of transmission power necessary for transmitting radio waves.

The operation parameter is information (for example, setting information) related to the radio wave transmission operation of the base station device 20. For example, the operation parameter is information on a maximum value (maximum allowable transmission power) of the transmission power allowed for the base station device 20. Of course, the operation parameter is not limited to the information on the maximum allowable transmission power.

Further, the holding resource information is information related to holding of radio resources of the base station device 20. For example, the holding resource information is information on radio resources that can be currently used by the base station device 20. For example, the holding resource information is information on a holding amount of an interference margin allocated from the communication control device 40 to the base station device 20. The information on the holding amount may be information on a resource block basis which will be described later. In other words, the holding resource information may be information (for example, a resource block holding amount) regarding a resource block held by the base station device 20.

The network communication unit 23 is a communication interface for communicating with other devices (for example, the communication control device 40, the proxy device 50, and other base station devices 20). For example, the network communication unit 23 is a local area network (LAN) interface such as a network interface card (NIC). The network communication unit 23 may be a universal serial bus (USB) interface including a USB host controller, a USB port, and the like. Further, the network communication unit 23 may be a wired interface or may be a wireless interface. The network communication unit 23 functions as a network communication means of the base station device 20. The network communication unit 23 communicates with other devices under the control of the control unit 24.

The control unit 24 is a controller that controls each component of the base station device 20. The control unit 24 is configured by including a processor such as central processing units (CPUs) and micro processing units (MPUs). In one example, the control unit 24 performs its function by the processor executing various programs stored in the storage device inside the base station device 20 using a random access memory (RAM) or the like as a work area. Moreover, the control unit 24 may be configured as an integrated circuit such as application specific integrated circuits (ASICs) and field programmable gate arrays (FPGAs). Each of CPU, MPU, ASIC, and FPGA may be regarded as a controller.

The control unit 24 includes, as illustrated in FIG. 8, an acquisition unit 241, a setting unit 242, a transmission unit 243, and a wireless communication control unit 244. The respective blocks (the acquisition unit 241 to the wireless communication control unit 244) constituting the control unit 24 is a functional block indicating a function of the control unit 24. These functional blocks may be software blocks or hardware blocks. For example, each of the functional blocks described above may be one software module realized by software (including a microprogram), or may be one circuit block on a semiconductor chip (die). Of course, each functional block may be one processor or one integrated circuit. A configuration method of the functional block is arbitrary. Note that the control unit 24 may be configured by a functional unit different from the above-described functional block.

The respective blocks (the acquisition unit 241 to the wireless communication control unit 244) constituting the control unit 24 may operate as follows, for example.

For example, the transmission unit 243 requests a grant and transmits information regarding a usage mode of the grant to the communication control device 40 including an acquisition unit that acquires information regarding a usage mode of the grant for a communication device using a radio wave in a frequency band used by the first wireless system to use the radio wave and a processing unit that performs processing regarding the grant on the basis of the information regarding the usage mode of the grant. Then, the wireless communication control unit 244 controls the wireless communication unit 21 on the basis of the grant given from the communication control device 40 on the basis of the request for the grant.

Operation of the respective blocks (the acquisition unit 241 to the wireless communication control unit 244) constituting the control unit 24 will be described later.

2-3. Configuration of Terminal Device

Figure 9:
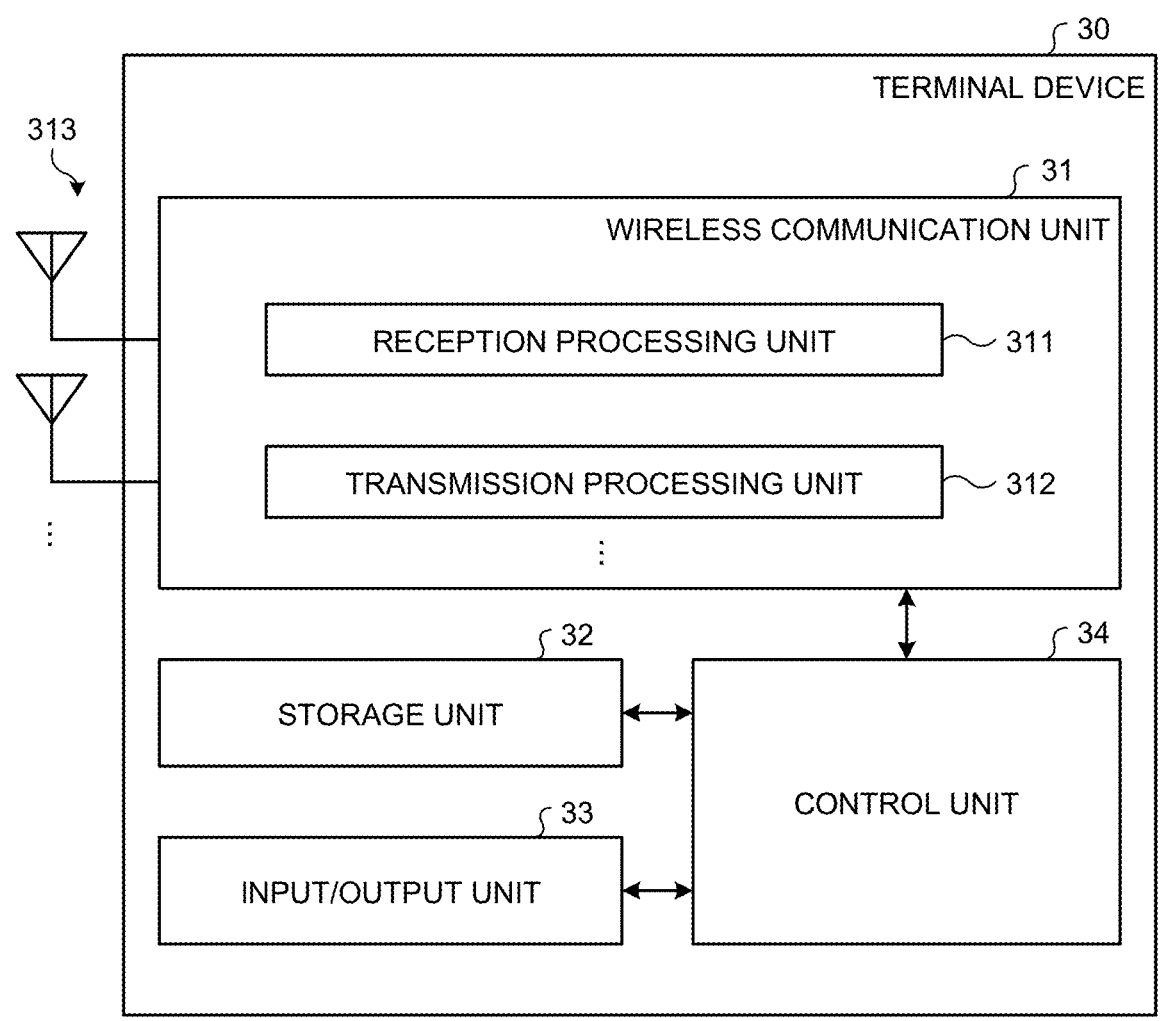
FIG. 9 is a diagram illustrating a configuration example of a terminal device according to the embodiment of the present disclosure.

Next, a configuration of the terminal device 30 will be described. FIG. 9 is a diagram illustrating a configuration example of the terminal device 30 according to the embodiment of the present disclosure. The terminal device 30 is a communication device that wirelessly communicates with the base station device 20 and/or the communication control device 40. Note that in the present embodiment, the concept of the communication device (or the wireless communication device) includes not only the base station device and the proxy device but also the terminal device. The communication device (or the wireless communication device) can be rephrased as a wireless system.

The terminal device 30 includes a wireless communication unit 31, a storage unit 32, an input/output unit 33, and a control unit 34. Moreover, the configuration illustrated in FIG. 9 is a functional configuration and its hardware configuration may be different from that being illustrated. Further, functions of the terminal device 30 may be distributed and implemented in a plurality of physically separated components.

The wireless communication unit 31 is a wireless communication interface that wirelessly communicates with other communication devices (for example, the base station device 20 and other terminal devices 30). The wireless communication unit 31 operates under the control of the control unit 34. The wireless communication unit 31 supports one or a plurality of radio access schemes. For example, the wireless communication unit 31 supports both NR and LTE. The wireless communication unit 31 may support other radio access schemes such as W-CDMA and cdma 2000.

The wireless communication unit 31 includes a reception processing unit 311, a transmission processing unit 312, and an antenna 313. The wireless communication unit 31 can include a plurality of reception processing units 311, a plurality of transmission processing units 312, and a plurality of antennas 313. Moreover, in the case where the wireless communication unit 31 supports a plurality of radio access schemes, each component of the wireless communication unit 31 may be configured to support individually for each radio access scheme. For example, the reception processing unit 311 and the transmission processing unit 312 may be individually configured by LTE and NR. The configurations of the reception processing unit 311 and the transmission processing unit 312 are similar to those of the reception processing unit 211 and the transmission processing unit 212 of the base station device 20.

The storage unit 32 is a data readable/writable storage device such as DRAM, SRAM, flash memory, and hard disk. The storage unit 32 functions as a storage means of the terminal device 30.

The input/output unit 33 is a user interface for exchanging information with the user. In one example, the input/output unit 33 is an operation device, such as keyboards, mice, operation keys, and touch panels, for the user to perform various operations. In addition, the input/output unit 33 is a display device such as a liquid crystal display (LCD) and an organic electroluminescence (EL) display. The input/output unit 33 may be an acoustic device such as loudspeakers and buzzers. In addition, the input/output unit 33 may be a lighting device such as a light emitting diode (LED) lamp. The input/output unit 33 functions as an input/output means (input means, output means, operation means, or notification means) of the terminal device 30.

The control unit 34 is a controller that controls each component of the terminal device 30. The control unit 34 is configured by including a processor such as CPUs and MPUs. In one example, the control unit 34 performs its function by the processor executing various programs stored in the storage device inside the terminal device 30 using a RAM or the like as a work area. Moreover, the control unit 34 may be configured as an integrated circuit such as ASICs and FPGAs. Each of CPU, MPU, ASIC, and FPGA may be regarded as a controller.

2-4. Configuration of Communication Control Device

The communication control device 40 is a device that controls wireless communication of the base station device 20. The communication control device 40 may directly control wireless communication of the terminal device 30 or via the base station device 20. The communication control device 40 may be a network manager that integrally controls wireless devices in a network. For example, the communication control device 40 may be a spectrum manager/coexistence manager. Further, the communication control device 40 may be a database server such as a geolocation database (GLDB) or a spectrum access system (SAS).

Note that if the communication system 2 is a cellular communication system, the communication control device 40 may be a device constituting a core network. The core network CN is, for example, an evolved packet core (EPC) or a 5G core network (5GC). If the core network is EPC, the communication control device 40 may be, for example, a device having a function as a mobility management entity (MME). In addition, if the core network is 5GC, the communication control device 40 may be, for example, a device having a function as an access and mobility management function (AMF). Note that even in a case where the communication system 2 is a cellular communication system, the communication control device 40 does not necessarily have to be a device constituting a core network. For example, the communication control device 40 may be a device having a function as a radio network controller (RNC).

Moreover, the communication control device 40 can have a function of a gateway. In one example, if the core network is EPC, the communication control device 40 may be a device having a function as a serving gateway (S-GW) or a packet data network gateway (P-GW). In addition, if the core network is 5GC, the communication control device 40 may be a device having a function as a user plane function (UPF). Moreover, the communication control device 40 is not necessarily a device that constitutes the core network. For example, it is assumed that the core network is a core network of W-CDMA or cdma 2000. At this time, the communication control device 40 may be a device that functions as a radio network controller (RNC).

Further, the communication control device 40 may be a system that controls a plurality of secondary systems. In this case, the communication system 2 can be regarded as a system including a plurality of secondary systems.

Figure 10:
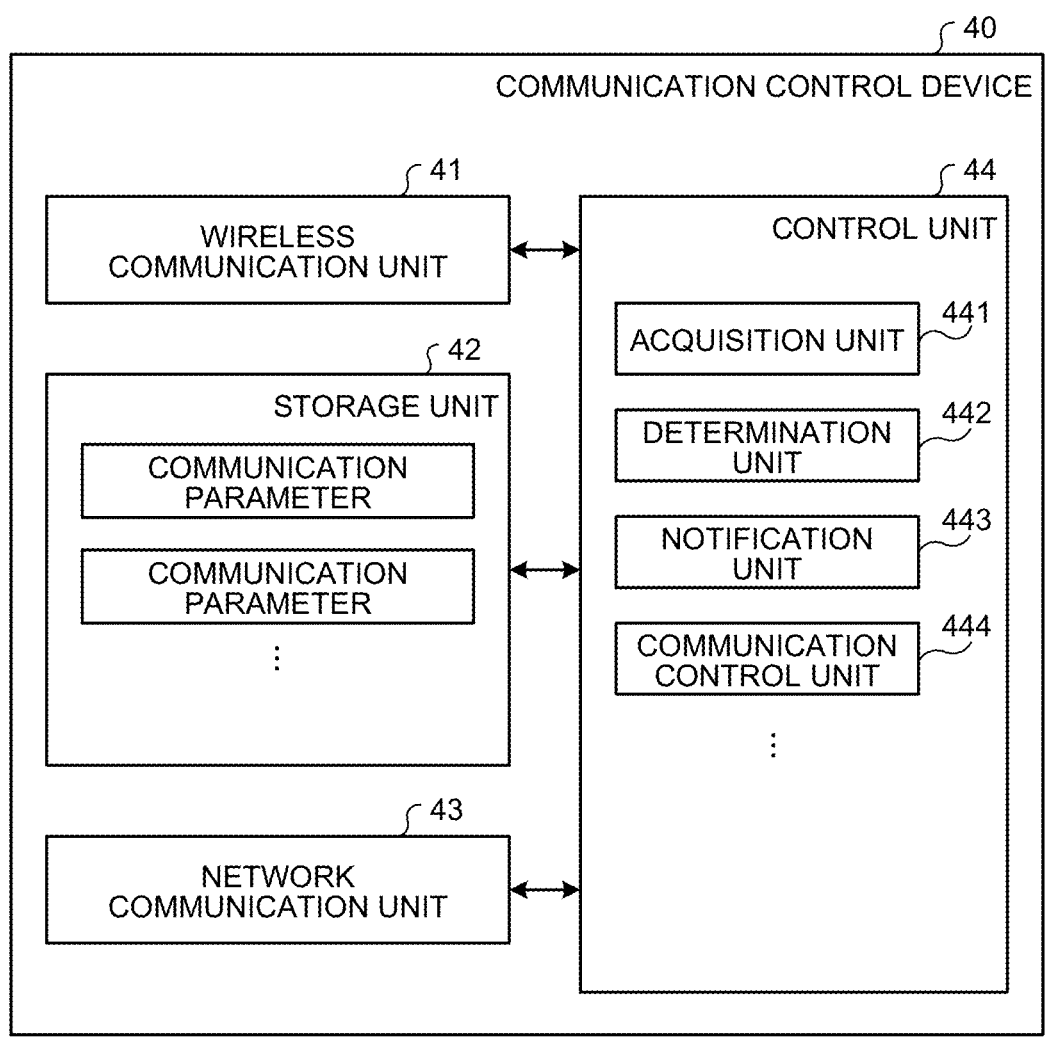
FIG. 10 is a diagram illustrating a configuration example of a communication control device according to the embodiment of the present disclosure.

FIG. 10 is a diagram illustrating a configuration example of a communication control device 40 according to the embodiment of the present disclosure. The communication control device 40 includes a wireless communication unit 41, a storage unit 42, a network communication unit 43, and a control unit 44. Moreover, the configuration illustrated in FIG. 10 is a functional configuration and its hardware configuration may be different from that being illustrated. Further, functions of the communication control device 40 may be distributed and implemented in a plurality of physically separated components. In one example, the communication control device 40 may be constituted by a plurality of server devices.

The wireless communication unit 41 is a wireless communication interface that wirelessly communicates with other communication devices (for example, the base station device 20, the terminal device 30, the proxy device 50, and other communication control devices 40). The wireless communication unit 41 operates under the control of the control unit 44. The wireless communication unit 31 supports one or a plurality of radio access schemes. For example, the wireless communication unit 31 supports both NR and LTE. The wireless communication unit 31 may support other radio access schemes such as W-CDMA and cdma 2000. The configuration of the wireless communication unit 41 is similar to that of the wireless communication unit 21 of the base station device 20.

The storage unit 42 is a data readable/writable storage device such as DRAM, SRAM, flash memory, and hard disk. The storage unit 22 functions as a storage means of the base station device 20. The storage unit 22 stores operation parameters of each of the plurality of base station devices 20 constituting the communication system 2. Note that the storage unit 22 may store the holding resource information of each of the plurality of base station devices 20 constituting the communication system 2. As described above, the holding resource information is information regarding holding of the radio resource of the base station device 20. Note that the communication control device 40 may store information in a file server 60.

The network communication unit 43 is a communication interface for communicating with other devices (for example, the base station device 20, the proxy device 50, and other communication control device 40). The network communication unit 43 may be a network interface or a device connection interface. For example, the network communication unit 43 may be a local area network (LAN) interface such as a network interface card (NIC). In addition, the network communication unit 43 may be a universal serial bus (USB) interface including a USB host controller, a USB port, and the like. Further, the network communication unit 43 may be a wired interface or may be a wireless interface. The network communication unit 43 functions as a communication means of the communication control device 40. The network communication unit 43 communicates with the base station device 20, the terminal device 30, and the proxy device 50 under the control of the control unit 44.

The control unit 44 is a controller that controls each component of the communication control device 40. The control unit 44 is configured by including a processor such as CPUs and MPUs. In one example, the control unit 44 performs its function by the processor executing various programs stored in the storage device inside the communication control device 40 using a RAM or the like as a work area. Moreover, the control unit 44 may be configured as an integrated circuit such as ASICs and FPGAs. Each of CPU, MPU, ASIC, and FPGA may be regarded as a controller. For example, the control unit 44 controls operation related to the grant by communicating with the base station device 20, the terminal device 30, and the proxy device 50 via the network communication unit 43.

The control unit 44 includes, as illustrated in FIG. 10, an acquisition unit 441, a determination unit 442, a notification unit 443, and a communication control unit 444. The respective blocks (the acquisition unit 441 to the communication control unit 444) constituting the control unit 44 is a functional block indicating a function of the control unit 44. These functional blocks may be software blocks or hardware blocks. For example, each of the functional blocks described above may be one software module realized by software (including a microprogram), or may be one circuit block on a semiconductor chip (die). Of course, each functional block may be one processor or one integrated circuit. A configuration method of the functional block is arbitrary. Note that the control unit 44 may be configured by a functional unit different from the above-described functional block.

The respective blocks (the acquisition unit 441 to the communication control unit 444) constituting the control unit 44 may operate as follows, for example.

The acquisition unit 441 is a processing unit that acquires various types of information in the operation related to the grant, for example, by communicating with the base station device 20, the terminal device 30, and the proxy device 50. For example, the acquisition unit 441 acquires information regarding the usage mode of the grant for the second wireless system that secondarily uses the frequency band used by the first wireless system to secondarily use the frequency band.

As an example, the acquisition unit 441 acquires position information of the terminal device 30. In addition, the acquisition unit 441 acquires area information (movement prediction range information) indicating a predicted movement area 301 in which the terminal device 30 is predicted to move.

The determination unit 442 is a processing unit that performs frequency use permission processing and area determination processing in response to a request (such as a frequency use permission and a frequency use notification) from the second wireless system that secondarily uses the frequency band used by the first wireless system and determines whether or not the secondary wireless system can secondarily use the frequency band (details will be described later). For example, the determination unit 442 determines whether or not the terminal device 30 can secondarily use (hereinafter, referred to as "secondary use of the primary system") the frequency band used by the primary system on the basis of the area information and the position information acquired by the acquisition unit 441 for the terminal device 30.

The notification unit 443 is a processing unit that makes a notification of a response according to a determination result of the determination unit 442 to a request (such as a frequency use permission and a frequency use notification) from the second wireless system that secondarily uses a frequency band used by the first wireless system (details will be described later). For example, the notification unit 443 notifies the terminal device 30 of whether or not the terminal device 30 can perform secondary use of the primary system determined by the determination unit 442 as a response.

The communication control unit 444 is a processing unit that controls communication with the base station device 20, the terminal device 30, and the proxy device 50. For example, the communication control unit 444 controls an interval of frequency use notifications, and the like (details will be described later).

Operation of the respective blocks (the acquisition unit 441 to the communication control unit 444) constituting the control unit 44 will be described later.

Further, the control unit 44 functions as a processing unit configured to select one protection method from a plurality of primary system protection methods including a dynamic or static protection method on the basis of a use form and use position information of a wireless station of a primary system and protect the wireless station of the primary system on the basis of the selected protection method.

For example, the control unit 44 selects one static protection method and performs the static protection method in a case where the wireless station is used for planned use and selects one dynamic protection method and performs the dynamic protection method in a case where the wireless station is used for unplanned use.

For example, the control unit 44 selects point protection and performs point protection on the basis of a protection target point of the wireless station determined on the basis of the use position information of the wireless station, and selects area protection and performs area protection on the basis of a protection target area of the wireless station determined on the basis of the use position information of the wireless station.

In addition, in a case where the protection target point and the protection target area are not included in the use schedule of the wireless station and in a case the protection target point and the protection target area are newly set, the control unit 44 functions as a processing unit that predicts the protection target point and the protection target area.

For example, the control unit 44 predicts the protection target point and the protection target area on the basis of the use position information of the second wireless station different from the first wireless station that is a wireless station of the primary system.

For example, the control unit 44 calculates communication quality when the second wireless station receives a signal of the first wireless station on the basis of the use position information of the second wireless station and predicts the protection target point and the protection target area on the basis of the calculated communication quality.

For example, the control unit 44 predicts the protection target point and the protection target area on the basis of antenna information of an antenna to be used at the second wireless station.

For example, the control unit 44 predicts the protection target point and the protection target area on the basis of use position information of a third wireless station of a wireless system different from the primary system.

For example, the control unit 44 calculates communication quality when the first wireless station that is a wireless station of the primary system receives a signal of the third wireless station on the basis of the use position information of the third wireless station. The control unit 44 predicts the use position information of the third wireless station on the basis of the calculated communication quality, and uses the predicted position information as the protection target point or the protection target area.

For example, the control unit 44 calculates communication quality when the fourth wireless station receives a signal of the fifth wireless station that is a wireless station of the primary system using the use position information of the third wireless station as the use position information of the fourth wireless station that is a wireless station of the primary system. The control unit 44 predicts the protection target point and the protection target point of the fifth wireless station on the basis of the calculated communication quality.

For example, the control unit 44 predicts the use position information of the wireless station of the primary system on the basis of the antenna information of the antenna to be used at the third wireless station.

In addition, the control unit 44 functions as a processing unit configured to determine a plurality of areas obtained by dividing the protection target area in accordance with a certain criterion as dynamic protection target areas.

For example, the control unit 44 determines the dynamic protection target areas obtained by dividing the protection target area into a plurality of areas using a parameter set on the basis of detection accuracy of use of the wireless station.

For example, the control unit 44 determines the dynamic protection target areas obtained by dividing the protection target area into a plurality of areas using a parameter set on the basis of detection accuracy of the primary system and accuracy of position information of the primary system.

For example, the control unit 44 determines the dynamic protection target areas obtained by dividing the protection target area into a plurality of areas using a parameter set on the basis of variation of the accuracy of the position information due to a surrounding environment.

For example, the control unit 44 determines the dynamic protection target area obtained by dividing the protection target area into a plurality of areas using a parameter set on the basis of arrangement information of detection units that detect the primary system.

For example, the control unit 44 determines the dynamic protection target areas having different sizes in the same area.

For example, the control unit 44 determines the dynamic protection target areas obtained by dividing the protection target area into a plurality of areas using a parameter set on the basis of accuracy of a positioning function of a wireless system different from the primary system.

For example, the control unit 44 divides an entire movement area of the wireless station into a plurality of regions and determines protection target areas set for wireless stations that are communication targets in the divided regions as the dynamic protection target areas.

Further, the control unit 44 functions as a processing unit that determines a protection target point or a protection target area by setting a protection target antenna direction at regular intervals within a rotation range of an antenna that is being used at the wireless station.

For example, the control unit 44 sets the protection target antenna direction in two dimensions by dividing a range in a horizontal direction in which an antenna rotates during use at a certain angle.

For example, the control unit 44 sets the protection target antenna direction in three dimensions by dividing the range in the horizontal direction and a range of a tilt angle in which the antenna rotates during use at a certain angle.

For example, the control unit 44 predicts a rotation range of an antenna that is being used using a protection target area or a protection target point of a wireless station that becomes a communication partner.

For example, the control unit 44 sets an angle formed by two tangents drawn from the wireless station to a protection target area of the wireless station that is the communication partner as a range in a horizontal direction in which an antenna that is being used rotates.

For example, the control unit 44 projects a protection target area of the wireless station that is the communication partner on a sphere centered on the wireless station of the primary system and sets a projected region on a spherical surface as a range in a horizontal direction and a range of a tilt angle that can be taken by the antenna during use.

For example, the control unit 44 changes an interval when the protection target antenna direction is set in accordance with calculation capability of the communication control device.

In addition, the control unit 44 functions as a processing unit configured to select dynamic point protection or dynamic area protection using dynamic antenna rotation ranges obtained by dividing a rotation range of an antenna that can be taken by the antenna of the wireless station in accordance with a certain criterion.

For example, the control unit 44 sets a plurality of protection target antenna directions inside the dynamic antenna rotation range.

For example, the control unit 44 sets the dynamic antenna rotation range in two dimensions by dividing a range in the horizontal direction that may be used at a certain angle.

For example, the control unit 44 sets the dynamic antenna rotation range in three dimensions by dividing the range in the horizontal direction and the range of the tilt angle in which the antenna rotates during use at a certain angle.

For example, the control unit 44 sets the dynamic antenna rotation range using an antenna rotation range that may be used, predicted from information of other wireless stations that may become communication partners.

For example, the control unit 44 sets the dynamic antenna rotation range using a parameter set on the basis of detection accuracy of an antenna direction during use of the wireless station.

For example, the control unit 44 sets the dynamic antenna rotation range using a parameter set on the basis of detection accuracy of an antenna direction by a detection unit that detects the antenna direction.

For example, the control unit 44 sets two or more dynamic antenna rotation ranges having different division sizes as antenna rotation ranges that may be used.

2-5. Configuration of Proxy Device

Figure 11:
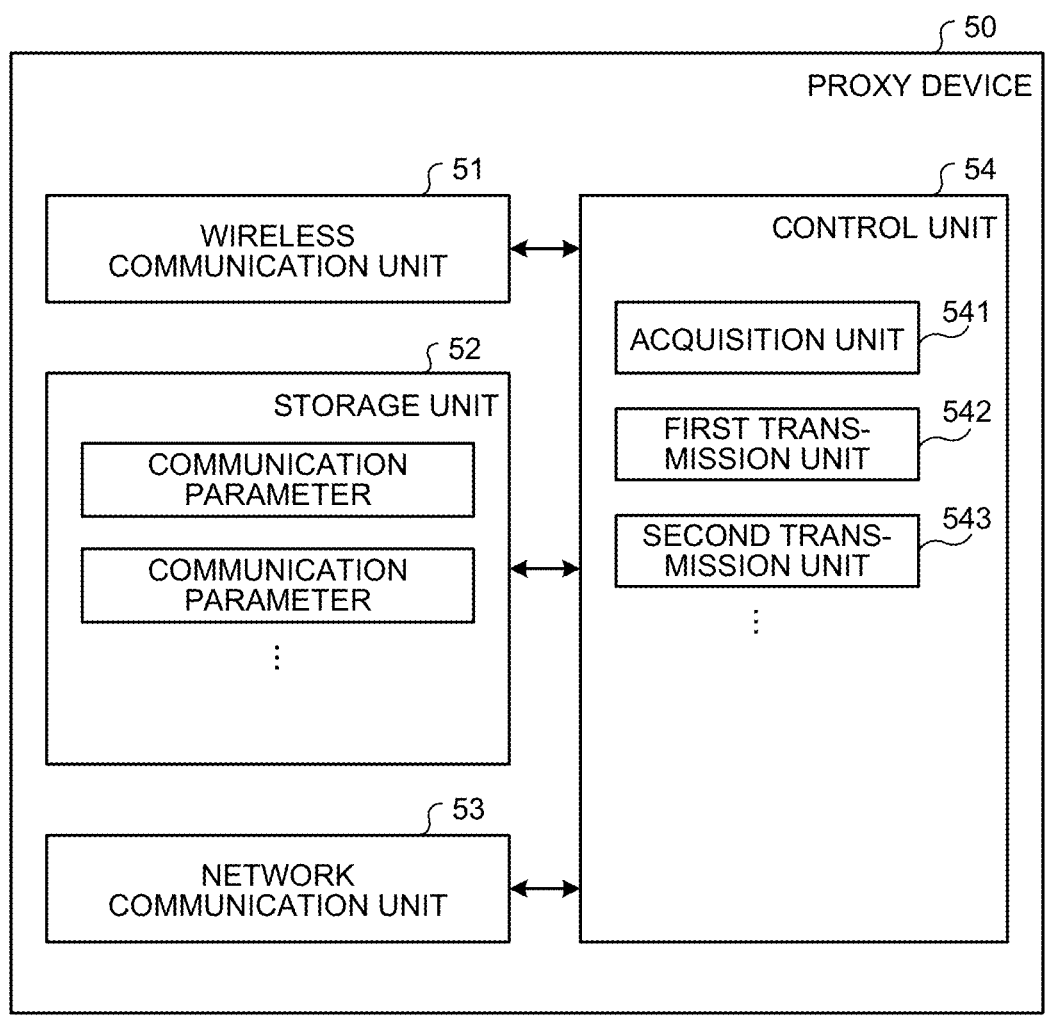
FIG. 11 is a diagram illustrating a configuration example of a proxy device according to the embodiment of the present disclosure.

Next, a configuration of the proxy device 50 will be described. FIG. 11 is a diagram illustrating a configuration example of the proxy device 50 according to the embodiment of the present disclosure. The proxy device 50 is a communication device that communicates with the base station device 20 and the communication control device 40. The proxy device 50 is a proxy system that communicates with the communication control device 40 as a proxy (representative) of one or a plurality of base station devices 20. For example, the proxy device 50 is a domain proxy (DP) that substitutes (represents) a plurality of CBSDs.

Note that the proxy system may include one device or a plurality of devices. Communication between the proxy device 50 and the base station device 20 may be wired communication or wireless communication. In a similar manner, communication between the proxy device 50 and the communication control device 40 may be wired communication or wireless communication.

Note that the communication device that the proxy device 50 substitutes (represents) is not limited to the base station device 20, and may be, for example, the terminal device 30. In the following description, one or a plurality of communication devices (for example, one or a plurality of base station devices 20) that the proxy device 50 substitutes (represents) may be referred to as subordinate communication devices (for example, the subordinate base station devices 20).

The proxy device 50 includes a wireless communication unit 51, a storage unit 52, a network communication unit 53, and a control unit 54. Moreover, the configuration illustrated in FIG. 10 is a functional configuration and its hardware configuration may be different from that being illustrated. Further, functions of the proxy device 50 may be distributed and implemented in a plurality of physically separated components.

The wireless communication unit 51 is a wireless communication interface that wirelessly communicates with other communication devices (for example, the base station device 20, the terminal device 30, the communication control device 40 and other proxy devices 50). The wireless communication unit 51 operates under the control of the control unit 54. The wireless communication unit 51 supports one or a plurality of radio access schemes. For example, the wireless communication unit 31 supports both NR and LTE. The wireless communication unit 51 may support other radio access schemes such as W-CDMA and cdma 2000.

The storage unit 52 is a data readable/writable storage device such as DRAM, SRAM, flash memory, and hard disk. The storage unit 52 functions as a storage means of the proxy device 50. The storage unit 22 may store desired transmission power information, operation parameters, holding resource information, and the like, of each of the subordinate base station devices 20.

The network communication unit 53 is a communication interface for communicating with other devices (for example, the base station device 20, the communication control device 40, and other proxy devices 50). In one example, the network communication unit 53 is a LAN interface such as NIC. The network communication unit 53 may be a USB interface including a USB host controller, a USB port, and the like. Further, the network communication unit 53 may be a wired interface or may be a wireless interface. The network communication unit 53 functions as network communication means of the proxy device 50. The network communication unit 53 communicates with other devices under the control of the control unit 54.

The control unit 54 is a controller that controls each component of the proxy device 50. The control unit 54 is configured by including a processor such as central processing units (CPUs) and micro processing units (MPUs). In one example, the control unit 54 performs its function by the processor executing various programs stored in the storage device inside the proxy device 50 using a random access memory (RAM) or the like as a work area. Moreover, the control unit 24 may be configured as an integrated circuit such as application specific integrated circuits (ASICs) and field programmable gate arrays (FPGAs). Each of CPU, MPU, ASIC, and FPGA may be regarded as a controller.

The control unit 54 includes, as illustrated in FIG. 11, an acquisition unit 541, a first transmission unit 542, and a second transmission unit 543. The respective blocks (the acquisition unit 541 to the second transmission unit 543) constituting the control unit 54 is a functional block indicating a function of the control unit 54. These functional blocks may be software blocks or hardware blocks. For example, each of the functional blocks described above may be one software module realized by software (including a microprogram), or may be one circuit block on a semiconductor chip (die). Of course, each functional block may be one processor or one integrated circuit. A configuration method of the functional block is arbitrary. Note that the control unit 54 may be configured by a functional unit different from the above-described functional block.

The respective blocks (the acquisition unit 541 to the second transmission unit 543) constituting the control unit 54 may operate as follows, for example.

For example, the first transmission unit 542 requests a grant on behalf of a subordinate communication device (for example, the base station device 20) to the communication control device 40 and transmits information regarding a usage mode of the grant. Then, the first transmission unit 542 notifies the subordinate communication device (for example, the base station device 20) of information regarding the grant given from the communication control device 40 on the basis of the request for the grant. The communication control device 40 includes an acquisition unit and a processing unit. The acquisition unit acquires information regarding the usage mode of the grant for the communication device that uses a radio wave of a frequency band used by the first wireless system to secondarily use the frequency band. The processing unit performs processing related to the grant on the basis of the information related to the usage mode of the grant.

Note that operation of the respective blocks (the acquisition unit 541 to the second transmission unit 543) constituting the control unit 54 may be the same as the operation of the respective blocks (the acquisition unit 241 to the transmission unit 243) constituting the control unit 24 of the base station device 20. For example, the acquisition unit 541 may be the same as the acquisition unit 241, and the first transmission unit 542 and the second transmission unit 543 may be the same as the transmission unit 243. Description of the acquisition unit 241 in the following description can be replaced with the acquisition unit 541, and description of the transmission unit 243 can be replaced with the first transmission unit 542 and the second transmission unit 543.

3. Interference Model

Figure 12:
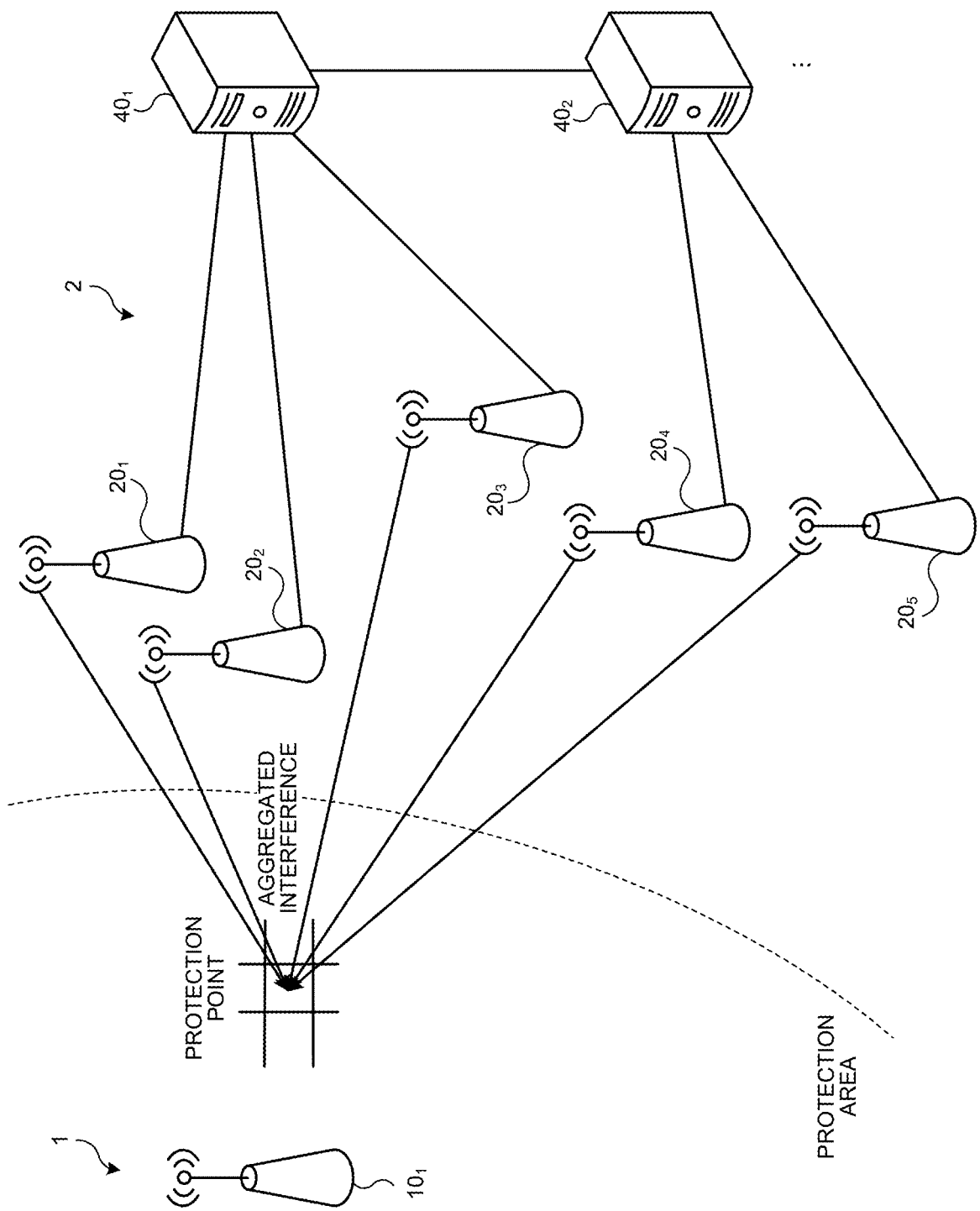
FIG. 12 is an explanatory diagram illustrating an example of an interference model assumed in the embodiment of the present disclosure.

Next, an interference model assumed in the present embodiment will be described. FIG. 12 is an explanatory diagram illustrating an example of an interference model assumed in the embodiment of the present disclosure. Note that description of the base station device 20 in the following description can be replaced with a word indicating another communication device having a wireless communication function.

The interference model illustrated in FIG. 12 is applied, for example, to a case where the primary system has a service area. In the example of FIG. 12, the communication system 1 (primary system) is a wireless communication system having a service area. This service area is, for example, a protection area of the communication system 1. A plurality of interference calculation reference points (hereinafter, referred to as protection points) is set in the protection area. The protection point is set by, for example, an operator of the communication system 1 or a public organization that manages radio waves (hereinafter, referred to as an administrator). For example, the administrator may divide the protection area into a lattice shape and may set the center of a predetermined lattice as the protection point. Any method is used to determine the protection point. The interference margin of each protection point is set by an administrator or the like. FIG. 12 illustrates interference to be given to the protection points by a plurality of base station devices 20 constituting the communication system 2 (secondary system). The communication control device 40 of the communication system 2 controls transmission power of the plurality of base station devices 20 so that the aggregated interference at each protection point does not exceed the set interference margin.

Figure 13:
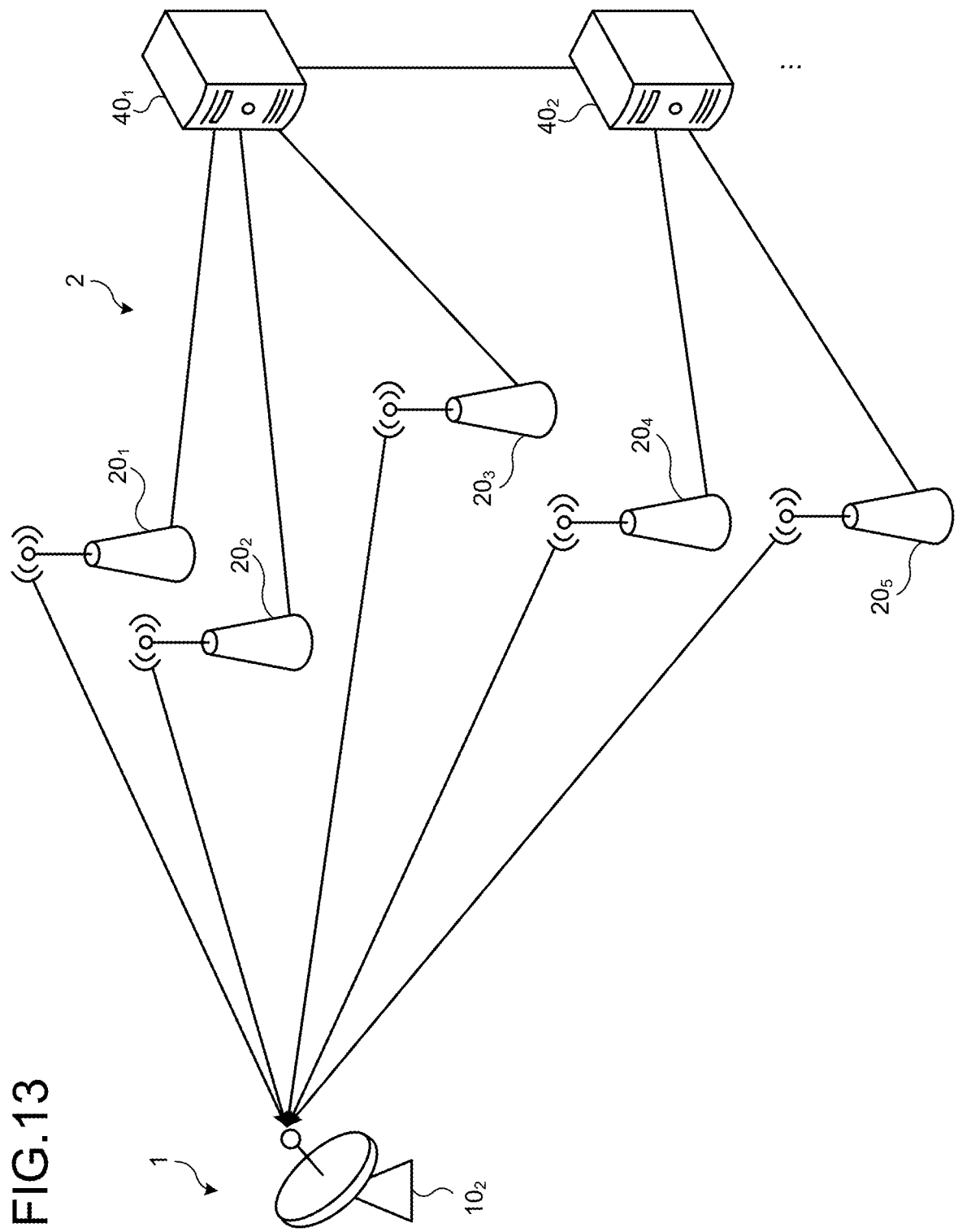
FIG. 13 is an explanatory diagram illustrating another example of the interference model assumed in the embodiment of the present disclosure.

FIG. 13 is an explanatory diagram illustrating another example of the interference model assumed in the embodiment of the present disclosure. The interference model illustrated in FIG. 13 is applied, for example, to a case where the primary system performs only reception. In the example of FIG. 13, the communication system 1 (primary system) includes a reception antenna as the wireless communication device 102. The wireless communication device 102 is, for example, a reception antenna of a satellite ground station. The communication control device 40 of the communication system 2 sets the position of the reception antenna as a protection point and controls the transmission power of the plurality of base station devices 20 so that the aggregated interference at the point does not exceed the interference margin.

4. Primary System Protection Method

Next, a primary system protection method will be described. As described above, the primary system protection method can be classified into, for example, the following two types.

(1) Interference margin simultaneous allocation type
(2) Interference margin iterative allocation type Note that examples of the interference margin simultaneous allocation type primary system protection method can include, for example, a method disclosed in Non Patent Literature 3 (for example, a calculation method of a maximum allowable EIRP). In addition, examples of the interference margin iterative allocation type primary system protection method can include, for example, an iterative allocation process (IAP) disclosed in Non Patent Literature 6.

Hereinafter, the "interference margin simultaneous allocation type" primary system protection method and the "interference margin iterative allocation type" primary system protection method will be described. Note that description of the base station device 20 in the following description can be replaced with a word indicating another communication device having a wireless communication function.

4-1. Interference Margin Simultaneous Allocation Type

Figure 14:
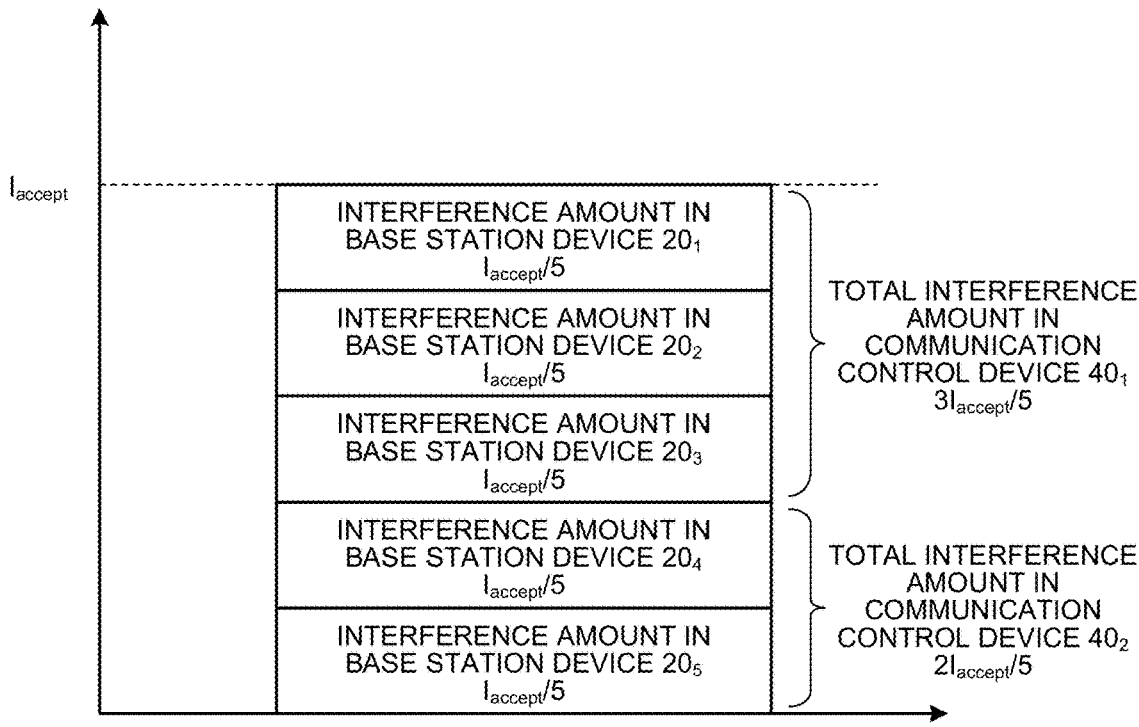
FIG. 14 is an explanatory diagram for explaining an interference margin simultaneous allocation type primary system protection method.

First, an interference margin simultaneous allocation type primary system protection method will be described. FIG. 14 is an explanatory diagram for explaining an interference margin simultaneous allocation type primary system protection method. As described above, in the interference margin simultaneous allocation type, the communication control device 40 calculates maximum allowable transmission power of the secondary system using a "value uniquely obtained by a positional relationship between a protection reference point of the primary system and the secondary system" as a reference value. In the example of FIG. 14, an allowable interference threshold of the primary system is $I_{accept}$. This threshold value may be an actual threshold value or may be a value set in consideration of a certain margin (for example, a protection ratio) from the actual threshold value in consideration of a calculation error and interference variation.

In the interference margin simultaneous allocation type primary system protection method, interference control means determining transmission power (EIRP, conductive power+an antenna gain, or the like) of the wireless device so as not to exceed an allowable interference threshold. In this event, if there are a large number of base station devices 20 and transmission power is determined so as not to exceed the allowable interference threshold, interference power received in the communication system 1 (primary system) may exceed the allowable interference threshold. Thus, the interference margin (allowable interference amount) is "allocated" on the basis of the number of base station devices 20 registered in the communication control device 40.

For example, in the example of FIG. 14, the total number of base station devices 20 is five. Thus, the allowable interference amount of $I_{accept}/5$ is allocated individually. The base station device 20 cannot recognize the allocation amount by itself, and thus, the base station device recognizes the allocation amount through the communication control device 40 or acquires transmission power determined on the basis of the allocation amount. The communication control device 40 cannot recognize the number of wireless devices managed by the other communication control devices 40, and thus, the communication control device 40 can recognize the total number by exchanging information with each other and can allocate the allowable interference amount. For example, an allowable interference amount of 3 $I_{accept}/5$ is allocated in the communication control device $40_1$.

Figure 15:
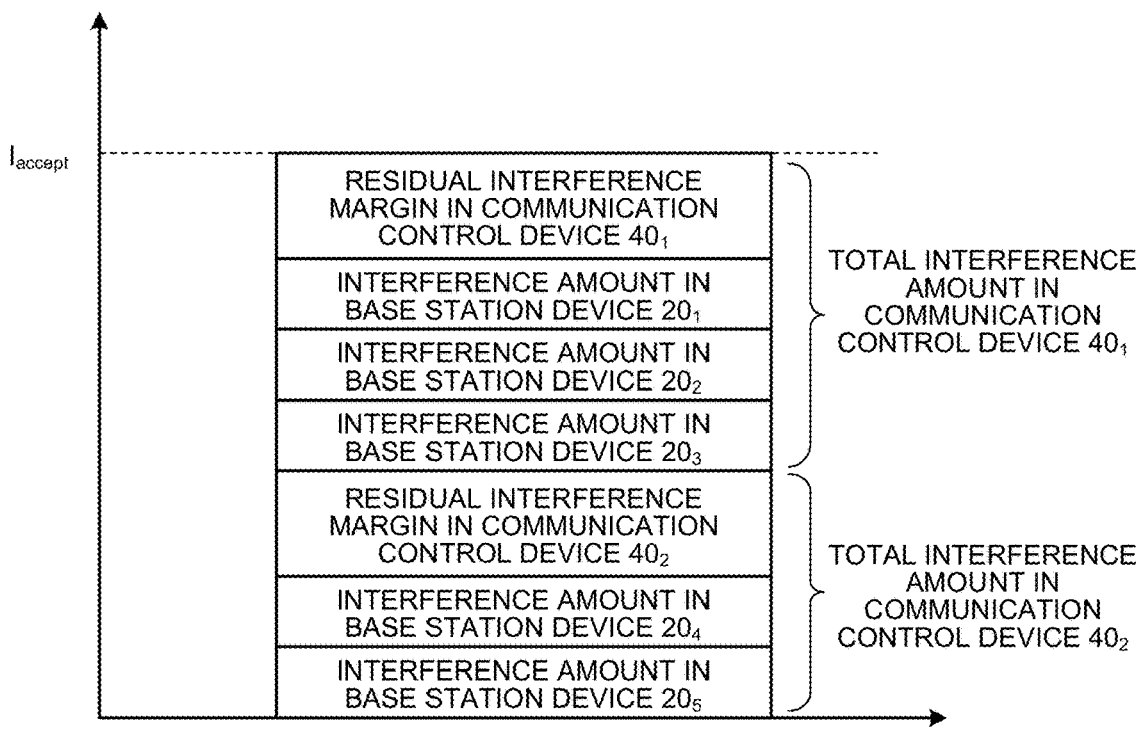
FIG. 15 is a diagram illustrating an aspect in which a residual interference margin occurs.

Note that, in this method, the interference margin not used by the base station device 20 can be a residual interference margin. FIG. 15 is a diagram illustrating an aspect in which a residual interference margin occurs. FIG. 15 illustrates a total interference amount set in each of the two communication control devices 40 (the communication control devices $40_1$, $40_2$). Further, FIG. 15 illustrates an interference amount (interference amount) given to a predetermined protection point of the communication system 1 by a plurality of base station devices 20 (base station devices $20_1$ to $20_5$) under management of the two communication control devices 40. An interference amount obtained by subtracting the interference amount of the base station device 20 from the total interference amount of the two communication control devices 40 is a residual interference margin. In the following description, an excessive interference amount is referred to as a residual interference margin. The residual interference margin can be rephrased as a residual interference amount.

4-2. Interference Margin Iterative Allocation Type

Figure 16:
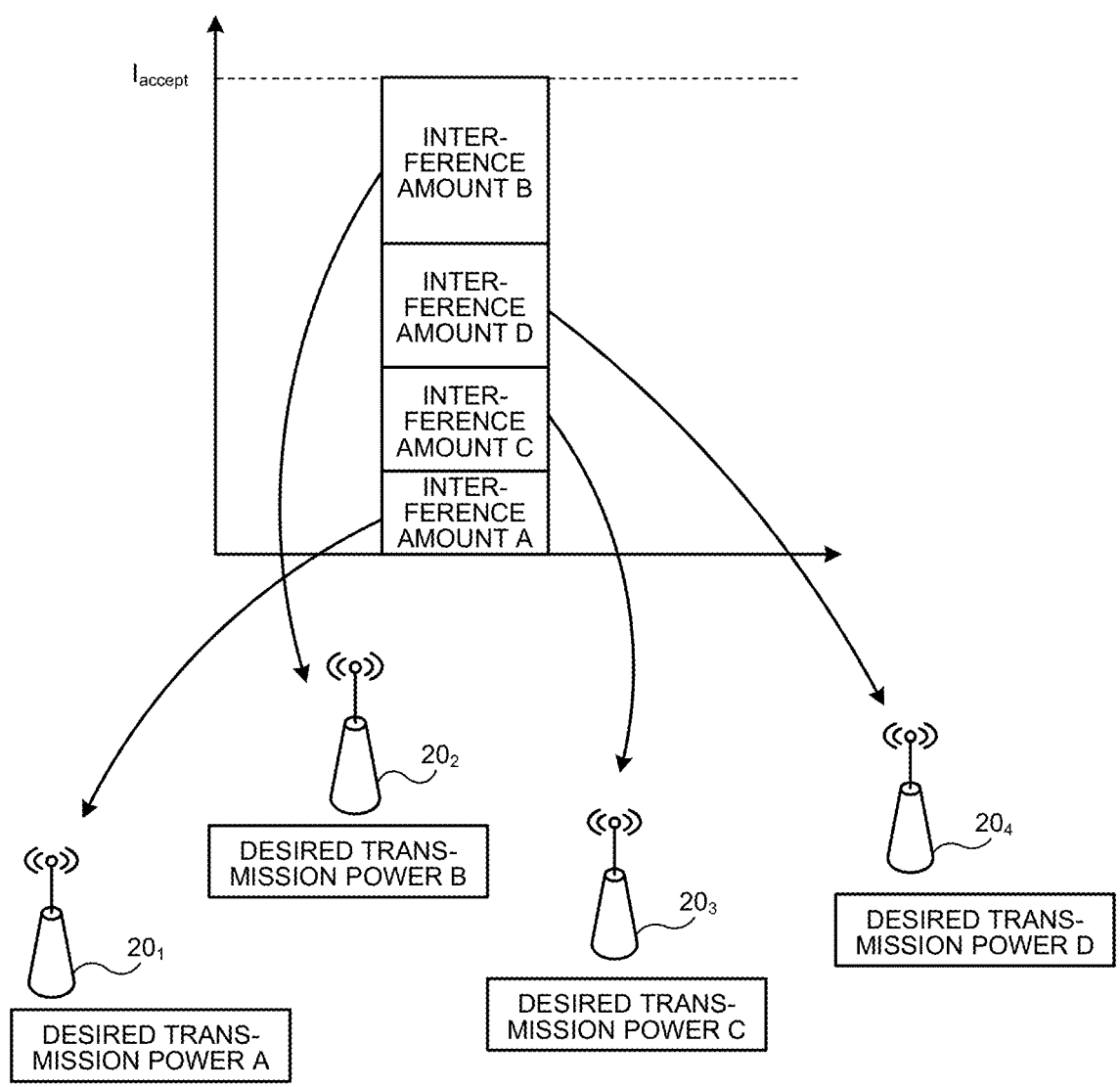
FIG. 16 is an explanatory diagram for explaining an interference margin iterative allocation type primary system protection method.

Next, an interference margin iterative allocation type primary system protection method will be described. As described above, in the interference margin iterative allocation type, the communication control device 40 calculates maximum allowable transmission power of the secondary system using the "desired transmission power of the secondary system" as a reference value. FIG. 16 is an explanatory diagram for explaining an interference margin iterative allocation type primary system protection method. In the interference margin iterative allocation type, for example, each of the plurality of base station devices 20 stores the desired transmission power information in the storage unit 22. The desired transmission power information is information on transmission power that the base station device 20 requests to the communication control device 40 as information of transmission power necessary for transmitting radio waves. In the example of FIG. 16, the base station devices 201 to 204 respectively hold the desired transmission power information A to D.

The communication control device 40 allocates the interference amounts A to D respectively to the base station devices 201 to 204 on the basis of the desired transmission power information A to D.

5. Description of Various Procedures

Next, various procedures that may occur between entities of the communication system 2 will be described. Note that description of the base station device 20 in the following description can be replaced with a word indicating another communication device having a wireless communication function.

5-1. Registration Procedure

The registration procedure is a procedure for registering device parameters related to the base station device 20 and the like, in the communication control device 40. Typically, the registration procedure is started when one or more communication systems including the base station device 20 or a plurality of base station devices 20 notify the communication control device 40 of a registration request including the device parameters. The registration request may be transmitted by a communication system (for example, a proxy system such as the proxy device 50) that substitutes (represents) one or a plurality of base station devices 20.

While in the following description, it is assumed that the communication system that substitutes (represents) the plurality of base station devices 20 is the proxy device 50, a word of the proxy device 50 in the following description can be replaced with a word indicating a communication system that substitutes (represents) another communication device such as a proxy system.

(Details of Required Parameters)

The device parameter refers to, for example, the following information.

Information specific to the communication device
Position information
Antenna information
Wireless interface information
Legal Information
Installer information At the time of implementation, information other than these may be handled as device parameters.

The information specific to the communication device is information that can specify the base station device 20, information regarding hardware of the base station device 20, and the like. For example, a serial number, a product model number, and the like, may be included.

The information that can identify the base station device 20 indicates communication device user information, a communication device serial number, and the like. For example, a user ID, a call sign, and the like, can be assumed as the communication device user information. The user ID may be uniquely generated by the communication device user or may be issued in advance by the communication control device 40.

The information regarding the hardware of the base station device 20 may include, for example, transmission power class information, manufacturer information, and the like. For example, in FCC C.F.R Part 96, two types of classes of a category A and a category B are defined as the transmission power class information, and any one of the types of information can be included. Further, in 3GPP TS 36.104 and TS 38.104, some classes of eNodeB and gNodeB are defined, and these may also be used.

The information regarding software of the base station device 20 can include, for example, version information, a build number, and the like, regarding an execution program which describes processing necessary for interaction with the communication control device 40. Further, version information, a build number, and the like, of software for operating as the base station device 20 may also be included.

The information related to the position is typically information that can specify a geographical position of the base station device 20. For example, the information related to the position is coordinate information acquired by a positioning function represented by a global positioning system (GPS), Beidou, a quasi-zenith satellite system (QZSS), Galileo, or an assisted global positioning system (A-GPS). Typically, information related to latitude, longitude, altitude, and a positioning error may be included. Alternatively, for example, the information related to the position may be position information registered in an information management device managed by a national regulatory authority (NRA) or its agency. Alternatively, for example, coordinates on an X axis, a Y axis, and a Z axis with a specific geographical position as an origin may be used. Further, an identifier indicating outdoor/indoor can be provided together with such coordinate information.

Still further, the information related to the position may be information indicating a region in which the base station device 20 is located. For example, information defined by the government such as a postal code and an address may be used. Further, for example, the region may be indicated by a set of three or more geographic coordinates. The information indicating these regions may be provided together with the coordinate information.

Further, in a case where the base station device 20 is located indoors, information indicating a floor of a building may be provided to the information related to the position. For example, a floor number, an identifier indicating ground/underground, or the like, may be provided. Further, for example, information indicating a further closed space inside the building, such as a room number and a room name in the building, may be provided.

Typically, the positioning function is preferably provided at the base station device 20. However, it is not always possible to acquire the position information satisfying required accuracy depending on performance of the positioning function or the installation position. Thus, the positioning function may be used by the installer. In such a case, it is preferable that the position information measured by the installer is written in the base station device 20.

The antenna information is typically information indicating performance, a configuration, and the like, of an antenna provided at the base station device 20. Typically, information such as an antenna installation height, a tilt angle (down tilt), a direction in a horizontal direction (azimuth), aim (boresight), an antenna peak gain, and an antenna model can be included.

The antenna information may also include information about a formable beam. For example, information such as a beam width, a beam pattern, and an analog/digital beamforming capability can be included.

The antenna information can also include information related to performance and a configuration of multiple input multiple output (MIMO) communication. For example, information such as the number of antenna elements and the maximum number of spatial streams can be included. Further, codebook information to be used, weight matrix information (a unitary matrix obtained through singular value decomposition (SVD), eigen value decomposition (EVD), block diagonalization (BD), or the like, a zero-forcing (ZF) matrix, or a minimum mean square error (MMSE) matrix), and the like, can be included. Still further, in a case of including maximum likelihood detection (MLD), or the like, that requires nonlinear calculation, information indicating the MLD, or the like, may be included.

The antenna information may include a zenith of direction/departure (ZoD). The ZoD is a type of a radio wave arrival angle. The ZoD may be estimated by another base station device 20 from the radio wave radiated from the antenna of the base station device 20. In this case, the base station device 20 may be a terminal device that operates as a base station or an access point, a device that performs D2D communication, a moving relay base station, or the like. The ZoD can be estimated by a radio wave arrival direction estimation technology such as multiple signal classification (MUSIC) or estimation of signal propagation via rotation invariance techniques (ESPRIT). The ZoD information can be used by the communication control device 40 as measurement information.

The wireless interface information typically refers to information indicating a wireless interface technology of the base station device 20. For example, the wireless interface information includes identifier information indicating a standard technology such as a technology used in GSM (registered trademark), CDMA 2000, UMTS, E-UTRA, 5G new radio (5GNR), or a further next generation cellular system, a derivative technology complying with LTE such as MulteFire or LTE-Unlicensed (LTE-U), a metropolitan area network (MAN) such as WiMAX or WiMAX2+, or an IEEE 802.11 wireless LAN. Further, a version number or a release number of technical specifications that define them can also be provided. The technologies included in the wireless interface information does not necessarily have to be standard technologies, information indicating a proprietary wireless technology may be included.

Further, the wireless interface information can also include frequency band information supported by the base station device 20. For example, the frequency band information can be expressed by one or more combinations of an upper limit frequency and a lower limit frequency, one or more combinations of a center frequency and a bandwidth, or one or more 3GPP operating band numbers.

The frequency band information supported by the base station device 20 can further include capability information of carrier aggregation (CA) or channel bonding. For example, the frequency band information can include information on bands that can be combined, or the like. Further, the carrier aggregation can also include information regarding a band that is desired to be used as a primary component carrier (PCC) or a secondary component carrier (SCC). The carrier aggregation can also include the number of CCs that can be aggregated at the same time.

The frequency band information supported by the base station device 20 may also include information indicating radio wave usage priority such as PAL and GAA.

The wireless interface information can also include modulation scheme information supported by the base station device 20. For example, as a typical example, the wireless interface information can include information indicating a primary modulation scheme such as frequency shift keying (FSK), n-value phase shift keying (PSK) (where n is 2, 4, 8, or the like), and n-value quadrature amplitude modulation (QAM) (where n is 4, 16, 64, 256, or the like), and information indicating a secondary modulation scheme such as orthogonal frequency division multiplexing (OFDM), DFT spread OFDM (DFT-s-OFDM), and filter bank multi carrier (FBMC).

The wireless interface information can also include information related to an error correction code. For example, the wireless interface information can include capabilities such as a turbo code, a low density parity check (LDPC) code, and a polar code, and code rate information to be applied.

The modulation scheme information and the information related to the error correction code can also be expressed by a modulation and coding scheme (MCS) index as another aspect.

Further, the wireless interface information can also include information indicating a function specific to each wireless technology supported by the base station device 20. For example, as a typical example, there is transmission mode (TM) information defined in LTE. In addition, those having two or more modes for a specific function can be included in the wireless interface information as in the TM described above. Further, in the technical specifications, in a case where the base station device 20 supports a function that is not essential in the specifications even if there is less than two modes, the wireless interface information can also include information indicating this case.

Further, the wireless interface information can also include radio access technology (RAT) information supported by the base station device 20. For example, the wireless interface information can include information indicating an orthogonal multiple access (OMA) scheme such as time division multiple access (TDMA), frequency division multiple access (FDMA) and orthogonal frequency division multiple access (OFDMA), a non orthogonal multiple access (NOMA) scheme such as power division multiple access (PDMA, a technique implemented by a combination of superposition coding (SPC) and successive interference canceller (SIC) is a typical example), code division multiple access (CDMA), sparse code multiple access (SCMA), interleaver division multiple access (IDMA) and spatial division multiple access (SDMA), or an opportunistic access scheme such as carrier sense multiple access/collision avoidance (CSMA/CA) and carrier sense multiple access/collision detection (CSMA/CD).

Further, the wireless interface information can also include information related to a duplex mode supported by the base station device 20. As a typical example, the wireless interface information can include, for example, frequency division duplex (FDD), time division duplex (TDD) and full duplex (FD). In a case where TDD is included as the wireless interface information, TDD frame configuration information to be used/supported by the base station device 20 may be provided. Further, information related to the duplex mode may be included for each frequency band indicated by the frequency band information.

The wireless interface information can also include information on a transmission diversity method supported by the base station device 20. For example, the wireless interface information may include space time coding (STC) or the like.

Further, the wireless interface information can also include guard band information. For example, the wireless interface information can include information related to a guard band size defined in the standard. Alternatively, for example, the wireless interface information may include information regarding a guard band size desired by the base station device 20.

The legal information is typically information related to regulations that the base station device 20 must comply with, which are defined by radio administration agencies in each country and region or equivalent organizations, authentication information acquired by the base station device 20, and the like. Typically, the information regarding the regulations can include, for example, upper limit value information of out-of-band radiation, information regarding blocking characteristics of a receiver, and the like. Typically, the authentication information can include, for example, type approval information (such as an FCC ID and a technical standard conformance certificate), legal/regulatory information (for example, an FCC regulation number, an ETSI harmonized standard number, and the like) that becomes a standard for acquisition of authentication, and the like.

Among the legal information, those defined in the specifications of the wireless interface technology may be substituted for information related to numerical values. For example, the upper limit value of the out-of-band radiation may be derived and used by using an adjacent channel leakage ratio (ACLR) instead of the upper limit value information of the out-of-band radiation. Further, the ACLR itself may be used as necessary. Still further, adjacent channel selectivity (ACS) may be used instead of blocking characteristics. Further, these may be used in combination or an adjacent channel interference ratio (ACIR) may be used.

The installer information may include information that can specify a person who installs the base station device 20 (installer), unique information associated with the installer, and the like. For example, Non Patent Literature 2 discloses certified professional installer registration ID (CPIR-ID) and CPI name as information that can specify the installer. Further, Non Patent Literature 2 discloses, for example, a contact address (mailing/contact address), an e-mail address, a telephone number, a public key identifier (PKI), and the like, as unique information associated with the installer. The information is not limited thereto and may include other information related to the installer as necessary.

[Supplement of Required Parameters]

In the registration procedure, depending on the embodiment, it is assumed that not only device parameters related to the base station device 20 but also device parameters related to the terminal device 30 are required to be registered in the communication control device 40. In such a case, a term "communication device" in the above description (details of required parameters) may be replaced with a term "terminal device" or an equivalent term. Further, parameters specific to the "terminal device" that are not described above (details of the required parameters) may also be handled as the required parameters in the registration procedure. For example, examples of the parameters can include a user equipment (UE) category specified in the 3GPP.

[Details of Registration Processing]

Figure 17:
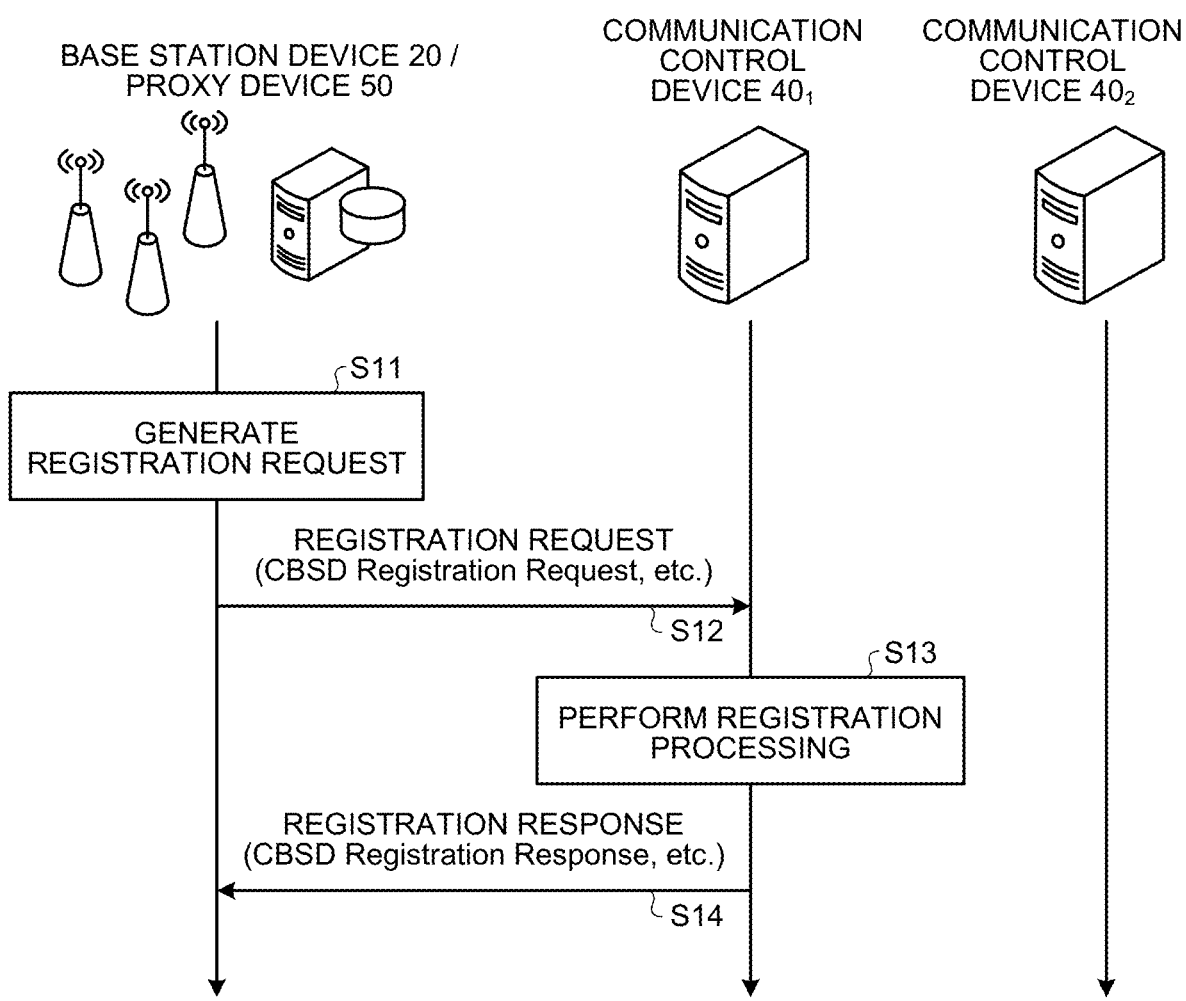
FIG. 17 is a sequence diagram for explaining a registration procedure.

FIG. 17 is a sequence diagram for explaining a registration procedure. One or more communication systems including the base station device 20 or the plurality of base station devices 20 generate a registration request message using the device parameters (step S11) and notifies the communication control device 40 of the registration request message (step S12). The proxy device 50 may generate and/or make a notification of the message.

Here, in a case where the device parameters include the installer information, falsification prevention processing, or the like, may be performed on the registration request using this information. Further, part or all of the information included in the registration request may be subjected to encryption processing. Specifically, for example, processing in which a public key specific to the installer is shared in advance between the installer and the communication control device 40, and the installer encrypts information using the secret key, can be performed. Examples of an encryption target include security sensitive information such as position information.

Further, as disclosed in Non Patent Literature 2, for example, the installer may directly write the position information into the communication control device 40.

After receiving the registration request, the communication control device 40 performs registration processing of the base station device 20 (step S13) and returns a registration response in accordance with a processing result (step S14). If there is no shortage or abnormality of information necessary for registration, the communication control device 40 records the information in the storage unit 42 and gives a notification of normal completion. Otherwise, the communication control device 40 gives a notification of a registration failure. In a case where registration is normally completed, the communication control device 40 may allocate an ID to each communication device and notify the communication device of the ID information by enclosing the ID information at the time of response. In a case where the registration fails, typically, one or more communication systems including the base station device 20 or the plurality of base station devices 20, or an operator (for example, a mobile communication carrier or an individual) or an installer thereof corrects the registration request, or the like, and tries the registration procedure until registration is normally completed.

Further, only the information specific to the communication device among the device parameters may be included in the registration request, and other information may be acquired from a wireless station specification database in which the wireless station information of the secondary system is stored. The wireless station specification database may be managed and operated by a radio administration agency, an operator of the secondary system, or other third party organizations.

Note that the registration procedure may be executed a plurality of times. Specifically, for example, the registration procedure can be re-executed in a case where the position information is changed beyond a predetermined criterion due to movement/accuracy improvement, or the like. The predetermined criterion is typically defined by a legal system. For example, in 47 C.F.R Part 15, the Mode II personal/portable white space device is required to access a database again in a case where the position information is changed by 100 meters or more.

5-2. Available Spectrum Query Procedure

The available spectrum query procedure is a procedure in which the base station device 20, the proxy device 50, or the like, inquires the communication control device 40 about information regarding an available frequency. Typically, the procedure is started by the base station device 20, the proxy device 50, or the like, notifying the communication control device 40 of an inquiry request including information capable of specifying the base station device 20 (or the base station device 20 under the proxy device 50).

(1) Example 1

Here, typically, the available spectrum information is information indicating a frequency that does not give fatal interference to the primary system at the position of the base station device 20 (or the base station device 20 under the proxy device 50) and can be safely secondarily used. For example, in a case where the base station device 20 is provided in a secondary use prohibited area such as an exclusion zone in order to protect the primary system using a frequency channel F1, the base station device 20 is notified of the frequency channel F1 as an available channel.

Further, the available spectrum information can include time at which the frequency channel becomes available calculated on the basis of the use schedule information (usage plan) of the primary wireless station acquired from the above-described wireless station specification database or wireless station use schedule database.

(2) Example 2

Further, for example, in a case where it is determined that fatal interference is given to the primary system even outside the secondary use prohibited area, there is a case where the base station device 20 is not notified of the frequency channel as an available channel.

(3) Example 3

There may also be frequency channels of which the base station device 20 is not notified as the available channel in available spectrum information depending on conditions other than the primary system protection requirements of Example 2. Specifically, for example, in order to avoid interference that can occur between the base station devices 20 in advance, the base station device 20 may be not notified of a frequency channel that is being used by another base station device 20 existing in the vicinity of the base station device 20 (or the base station device 20 under the proxy device 50) as an available channel.

(4) Example 4

Even in a case corresponding to these cases (Example 2, Example 3), the base station device 20 can be notified of the same frequency as that of the primary system or the neighboring base station device 20 as an available channel. In such a case, typically, the maximum allowable transmission power information is included in the available spectrum information. The maximum allowable transmission power is typically expressed by equivalent isotropic radiated power (EIRP). The maximum allowable transmission power is not necessarily limited to this, and may be provided by, for example, a combination of antenna power (conducted power) and an antenna gain. A feeder loss may also be included. Further, an allowable peak gain may be set for each spatial direction for the antenna gain.

[Details of Required Parameters]

As the information that can specify the base station device 20, for example, information specific to the communication device registered at the time of the registration procedure, the ID information described above (details of the registration processing), and the like, can be assumed.

Further, the inquiry request can also include inquiry requirement information. The inquiry requirement information can include, for example, information indicating a frequency band for which it is desired to know availability. Further, the inquiry request can also include, for example, transmission power information. For example, the base station device 20 or the proxy device 50 can put the transmission power information in the inquiry request in a case where it is desired to know only information on a frequency at which the desired transmission power can be used. Further, for example, the inquiry request can include information regarding time at which it is desired to know whether or not the corresponding frequency band is available. The inquiry request does not necessarily have to include the inquiry requirement information.

Further, the inquiry request can also include a measurement report. The measurement report includes a result of measurement performed by the base station device 20 and/or the terminal device 30. For example, not only raw data but also processed information may be included. For example, standardized metrics represented by reference signal received power (RSRP), reference signal strength indicator (RSSI), and reference signal received quality (RSRQ) can be used.

[Details of Available Frequency Evaluation Processing]

Figure 18:
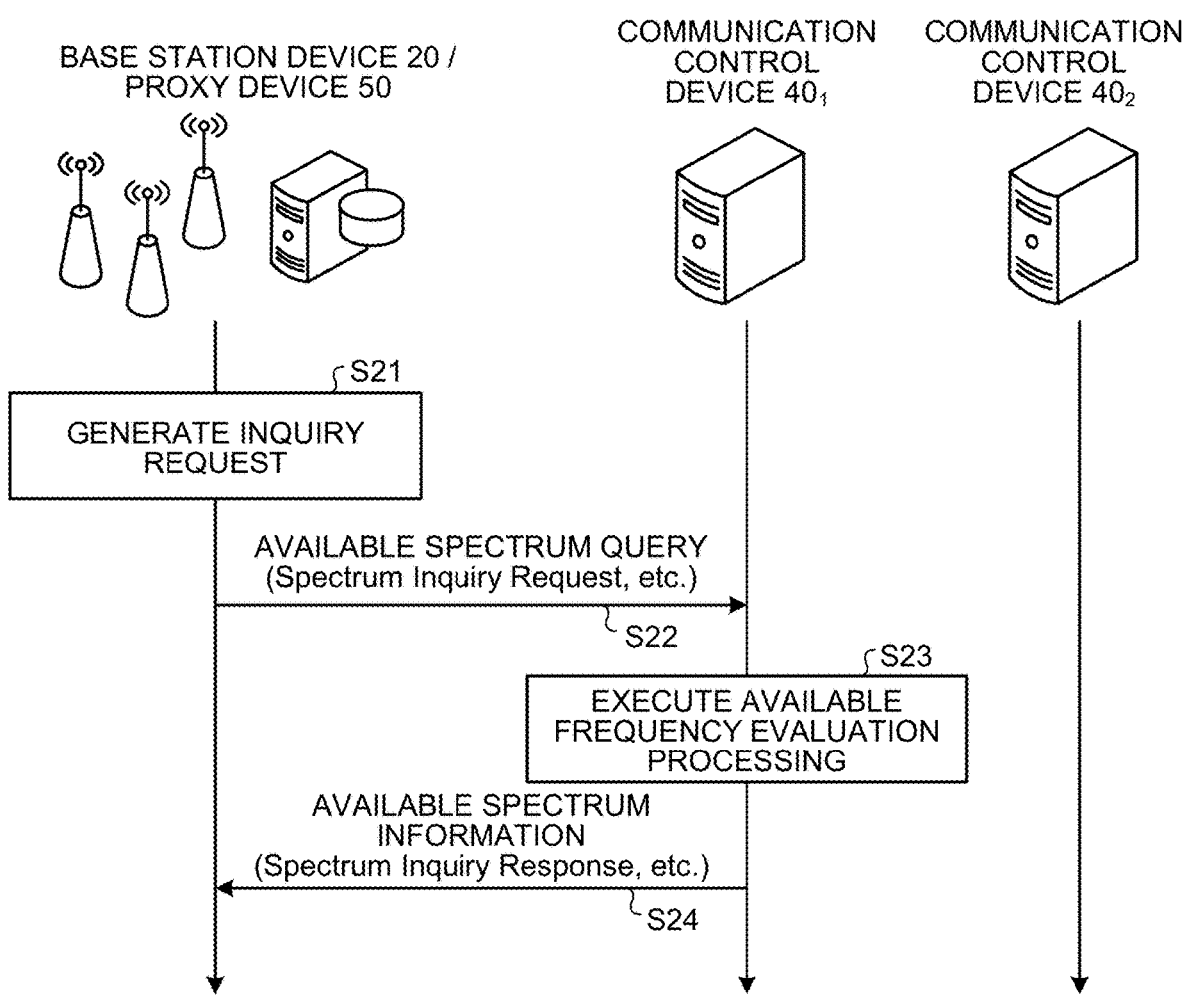
FIG. 18 is a sequence diagram for explaining an available spectrum query procedure.

FIG. 18 is a sequence diagram for explaining an available spectrum query procedure. The base station device 20 or the proxy device 50 generates an inquiry request including information capable of specifying the base station device 20 (or the base station device 20 under the proxy device 50) (step S21) and notifies the communication control device 40 of the inquiry request (step S22).

After receiving the inquiry request, the communication control device 40 evaluates the available frequency on the basis of the inquiry requirement information (step S23). For example, as described above in Examples 1 to 3, the communication control device 40 can evaluate the available frequency in consideration of existence of the primary system, the secondary use prohibited area 303 thereof, and the base station device 20 in the vicinity thereof.

As described above in Example 4, the communication control device 40 may derive the maximum allowable transmission power information. Typically, the maximum allowable transmission power is calculated using allowable interference power information in the primary system or a protection zone thereof, calculation reference point information of an interference power level of interference given to the primary system, registration information of the base station device 20, and a propagation loss estimation model. Specifically, as an example, the maximum allowable transmission power is calculated using the following mathematical expression.

$$P_{MaxTx(dBm)} = I_{Th(dBm)} + PL(d)_{(dB)} \quad (1)$$

Here, $P_{MaxTx(dBm)}$ is maximum allowable transmission power, $I_{Th(dBm)}$ is allowable interference power, d is a distance between the reference point and the base station device 20, and $PL(d)_{(dB)}$ is a propagation loss at the distance d. Although the antenna gain at the transceiver is not explicitly indicated in the present mathematical expression, the antenna gain may be included in accordance with a method of expressing the maximum allowable transmission power (EIRP, conducted power, and the like) or a reference point of reception power (antenna input point, antenna output point, and the like). Further, a safety margin, or the like, for compensating for variation due to fading may be included. Further, a feeder loss, and the like, may be considered as necessary.

Further, the above mathematical expression is described on the basis of assumption that the single base station device 20 is an interference source. For example, in a case where it is necessary to consider aggregated interference from a plurality of base station devices 20 at the same time, a correction value may be taken into account. Specifically, for example, the correction value can be determined on the basis of three types (fixed/predetermined, flexible, flexible minimized) of interference margin schemes disclosed in Non Patent Literature 3.

Note that, although the above mathematical expression is expressed using logarithms, it is a matter of course that the mathematical expression may be converted into a true number and used at the time of implementation. Further, all parameters in logarithmic notation described in the present embodiment may be converted into numbers and used as appropriate.

(1) Method 1

Further, as described in the section of (Details of required parameters) above, in a case where the transmission power information is included in the inquiry requirement information, the available frequency can be evaluated using a method different from the above-described method. Specifically, for example, in a case where it is assumed that desired transmission power indicated by the transmission power information is used, in a case where an estimated amount of interference is less than allowable interference power in the primary system or a protection zone thereof, it is determined that the frequency channel is available, and the base station device 20 (or the proxy device 50) is notified of the frequency channel.

(2) Method 2

While an example where the band use condition is calculated on the basis of the other system related information has been described, the present disclosure is not limited to such an example. For example, in a similar manner to an area of a radio environment map (REM), in a case where an area/space in which the base station device 20 can use the shared band is determined in advance, the available spectrum information may be derived on the basis of only the position-related information and the height-related information. Further, for example, even in a case where a lookup table in which a position and a height are associated with available spectrum information is prepared, the available spectrum information may be derived on the basis of only the position-related information and the height-related information.

The available frequency does not necessarily have to be evaluated after the inquiry request is received. For example, after the above-described registration procedure is normally completed, the communication control device 40 may independently evaluate the available frequency without an inquiry request. In such a case, the communication control device 40 may create an REM or a lookup table exemplified in Method 2 or an information table similar thereto.

In any method, radio wave usage priority such as PAL or GAA may also be evaluated. For example, in a case where information regarding the radio wave usage priority is included in the registered device parameter or the inquiry requirement, it may be determined whether or not the frequency can be used on the basis of the priority, and a notification of the determination result may be made. Further, for example, as disclosed in Non Patent Literature 2, in a case where information (in Non Patent Literature 2, referred to as a cluster list) regarding the base station device 20 that performs high priority use (for example, PAL) from the user is registered in the communication control device 40 in advance, evaluation may be performed on the basis of the information.

After the evaluation of the available frequency is completed, the communication control device 40 notifies the base station device 20 (or the proxy device 50) of the evaluation result (step S24). The base station device 20 may select a desired communication parameter by using the evaluation result received from the communication control device 40.

5-3. Frequency Use Permission Procedure (Spectrum Grant Procedure

The frequency use permission procedure is a procedure for the base station device 20 or the like, to receive the secondary use permission of the frequency from the communication control device 40. Typically, the procedure is started by, after the registration procedure is normally completed, one or more communication systems including the base station device 20 or the plurality of base station devices 20 notifying the communication control device 40 of a frequency use permission request including information that can specify the base station device 20. This notification may be made by the proxy device 50. Note that "after the registration procedure is normally completed" also means that the available spectrum query procedure does not necessarily have to be performed.

It is assumed in the present embodiment that at least the following two types of frequency use permission request schemes can be used.

Designation scheme
Flexible scheme

The designation scheme is a request scheme in which the base station device 20 specifies at least a frequency band and maximum transmission power to be used as desired communication parameters and requests the communication control device 40 to permit operation based on the desired communication parameters. The parameters are not necessarily limited to these parameters, and parameters specific to the wireless interface technology (such as a modulation scheme and a duplex mode) may be specified. Further, information indicating radio wave usage priority such as PAL and GAA may be included.

The flexible scheme is a request scheme in which the base station device 20 specifies only a requirement regarding communication parameters and requests the communication control device 40 to specify communication parameters that can be secondarily used while satisfying the requirement. A requirement for communication parameters may include a bandwidth or desired maximum transmission power or desired minimum transmission power. The parameters are not necessarily limited to these parameters, and parameters specific to the wireless interface technology (such as a modulation scheme and a duplex mode) may be specified. Specifically, for example, one or more TDD frame configurations may be selected in advance and notified.

In any manner, the measurement report may be included. The measurement report includes a result of measurement performed by the base station device 20 and/or the terminal device 30. For example, not only raw data but also processed information may be included. For example, standardized metrics represented by reference signal received power (RSRP), reference signal strength indicator (RSSI), and reference signal received quality (RSRQ) can be used.

[Details of Frequency Use Permission Processing]

Figure 19:
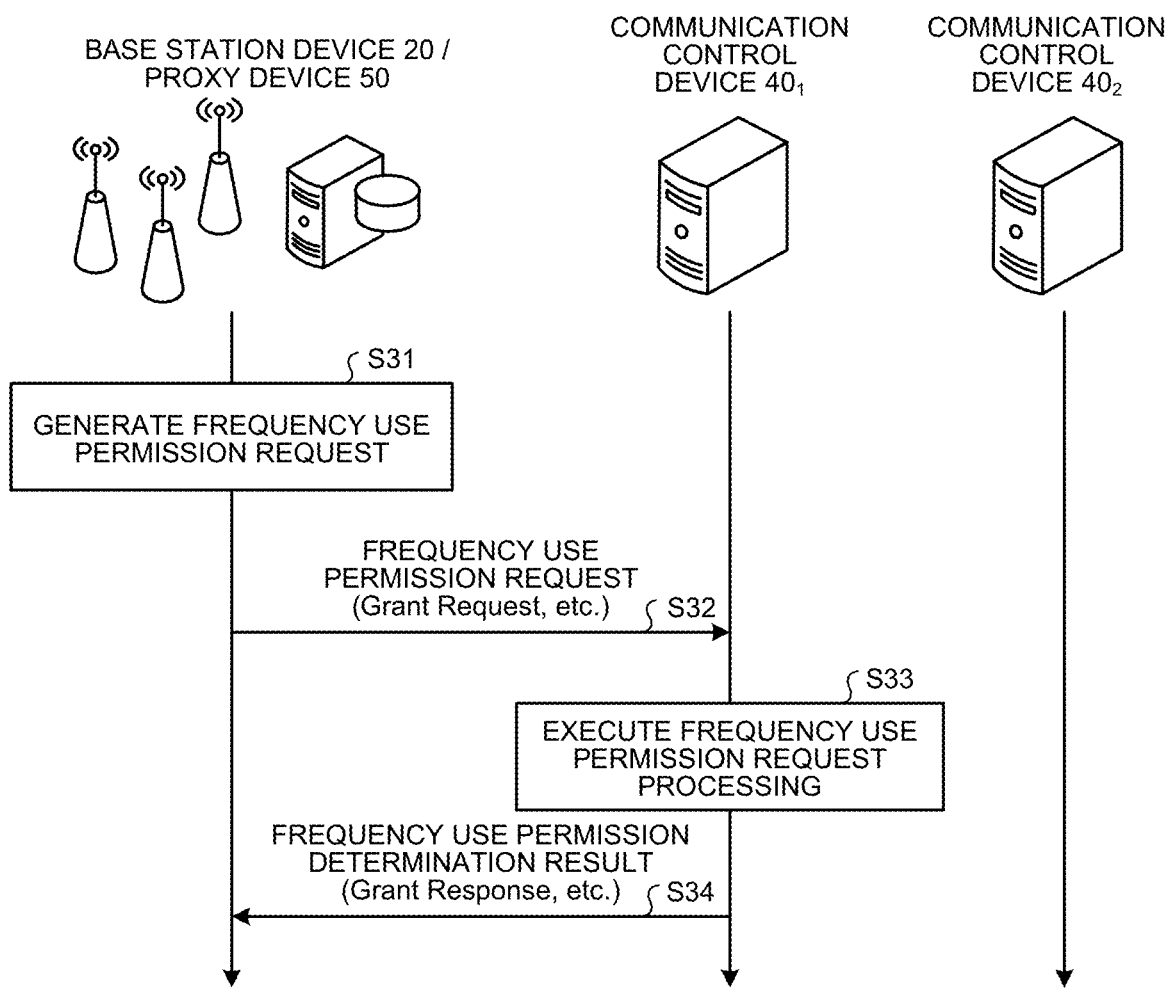
FIG. 19 is a sequence diagram for explaining a frequency use permission procedure.

FIG. 19 is a sequence diagram for explaining a frequency use permission procedure. One or more communication systems including the base station device 20 or the plurality of base station devices 20 generates a frequency use permission request including information that can specify the base station device 20 (step S31) and notifies the communication control device 40 of the frequency use permission request (step S32). The proxy device 50 may generate and/or make a notification of the request. The frequency use permission request is acquired, for example, by the acquisition unit 441 of the communication control device 40.

After acquiring the frequency use permission request, the communication control device 40 performs frequency use permission processing on the basis of the frequency use permission request scheme (step S33). For example, the communication control device 40 can perform the frequency use permission processing in consideration of existence of the primary system, the secondary use prohibited area 303 thereof, and the base station device 20 in the vicinity using the method described in Examples 1 to 3 of <5-2. Available spectrum query procedure>.

In a case where the flexible scheme is used, the communication control device 40 may derive the maximum allowable transmission power information using the method described in Example 4 of <5-2. Available spectrum query procedure>. Typically, the communication control device 40 calculates the maximum allowable transmission power using allowable interference power information in the primary system or a protection zone thereof, calculation reference point information of an interference power level of interference given to the primary system, registration information of the base station device 20, and a propagation loss estimation model. For example, the communication control device 40 calculates the maximum allowable transmission power by the following expression (2).

$$P_{MaxTx(dBm)} = I_{Th(dBm)} + \mathrm{PL}(d)_{(dB)} \tag{2}$$

Here, $P_{MaxTx(dBm)}$ is maximum allowable transmission power, $I_{Th(dBm)}$ is allowable interference power, d is a distance between the reference point and the base station device 20, and $\mathrm{PL}(d)_{(dB)}$ is a propagation loss at the distance d. Although the antenna gain at the transceiver is not explicitly indicated in the present mathematical expression, the mathematical expression may be used after being modified in accordance with a method of expressing the maximum allowable transmission power (EIRP, conducted power, and the like) or a reference point of reception power (antenna input point, antenna output point, and the like). Further, a safety margin, or the like, for compensating for variation due to fading may be included. Further, a feeder loss, and the like, may be considered as necessary.

Further, the above mathematical expression is described on the basis of assumption that the single base station device 20 is an interference source. For example, in a case where it is necessary to consider aggregated interference from a plurality of base station devices 20 at the same time, a correction value may be taken into account. Specifically, for example, the correction value can be determined on the basis of three types (fixed/predetermined, flexible, flexible minimized) of schemes disclosed in Non Patent Literature 3.

Various models may be used as the propagation loss estimation model. In a case where a model is designated for each application, the designated model is preferably used. For example, in Non Patent Literature 6, a propagation loss model such as an extended hata (eHATA) or an irregular terrain model (ITM) is employed for each application. It is of course, during implementation of the present invention, the propagation loss model does not have to be limited thereto.

In a predetermined application, in a case where a model is not designated, the model may be selectively used as necessary. As a specific example, for example, it is possible to selectively use an aggressive model such as a free space loss model when estimating the interference power to other base station devices 20 and use a conservative model when estimating coverage of the base station device 20.

Further, in a case where the designation scheme is used, the frequency use permission processing can be performed using the method described in Method 1 of <5-2. Available spectrum query procedure>. Specifically, for example, in a case where it is assumed that desired transmission power indicated by the transmission power information is allowed to be used, in a case where an estimated amount of interference is less than allowable interference power in the primary system or a protection zone thereof, it is determined that the frequency channel is available, and the base station device 20 (or the proxy device 50) is notified of the frequency channel.

In any method, radio wave usage priority such as PAL or GAA may also be evaluated. For example, in a case where information regarding the radio wave usage priority is included in the registered device parameter or the inquiry requirement, it may be determined whether or not the frequency can be used on the basis of the priority, and a notification of the determination result may be made. Further, for example, as disclosed in Non Patent Literature 2, in a case where information (in Non Patent Literature 2, referred to as a cluster list) regarding the base station device 20 that performs high priority use (for example, PAL) from the user is registered in the communication control device 40 in advance, evaluation may be performed on the basis of the information.

The frequency use permission processing does not necessarily have to be performed upon receipt of the request. For example, after the above-described registration procedure is normally completed, the communication control device 40 may independently perform the processing without the frequency use permission request. Further, for example, the frequency use permission determination processing may be performed at a certain period. In such a case, the REM or the lookup table exemplified in Method 2 of <5-2. Available spectrum query procedure> or an information table similar thereto may be created.

After the frequency use permission processing is completed, the communication control device 40 notifies the base station device 20 of the determination result (step S34).

5-4. Frequency Use Notification (Spectrum Use Notification/Heartbeat)

The frequency use notification is a procedure in which the base station device 20, the proxy device 50, or the like, notifies the communication control device 40 of the frequency use based on the communication parameters allowed to be used in the frequency use permission procedure. Typically, the procedure is started by the base station device 20 or the proxy device 50 notifying the communication control device 40 of a notification message including information that can specify the base station device 20.

This procedure is preferably performed periodically until use of the frequency is rejected from the communication control device 40. When this procedure is normally completed, the base station device 20 may start or continue radio wave transmission. For example, if a state of the grant is granted, the state of the grant transitions to authorized as a result of success of this procedure. Further, if the state of the grant is authorized, the state of the grant transitions to granted or idole as a result of failure of this procedure.

Here, the grant is permission for radio wave transmission given by the communication control device 40 (for example, SAS) to the base station device 20 (for example, CBSD), and the like. The grant can also be referred to as permission to use radio resources (frequency resources). This grant is described, for example, in Non Patent Literature 2. In Non Patent Literature 2, signaling protocol between a database (SAS) and a base station (CBSD) for frequency sharing of 3550-3700 MHz in the United States is standardized. In this standard, permission for radio wave transmission that SAS gives to the CBSD is called "grant". The operation parameters allowed in the grant are defined by a maximum allowable equivalent isotropic radiated power (EIRP) and a frequency channel. In other words, in order to perform radio wave transmission using a plurality of frequency channels, the CBSD needs to acquire a plurality of grants from SAS.

Figure 20:
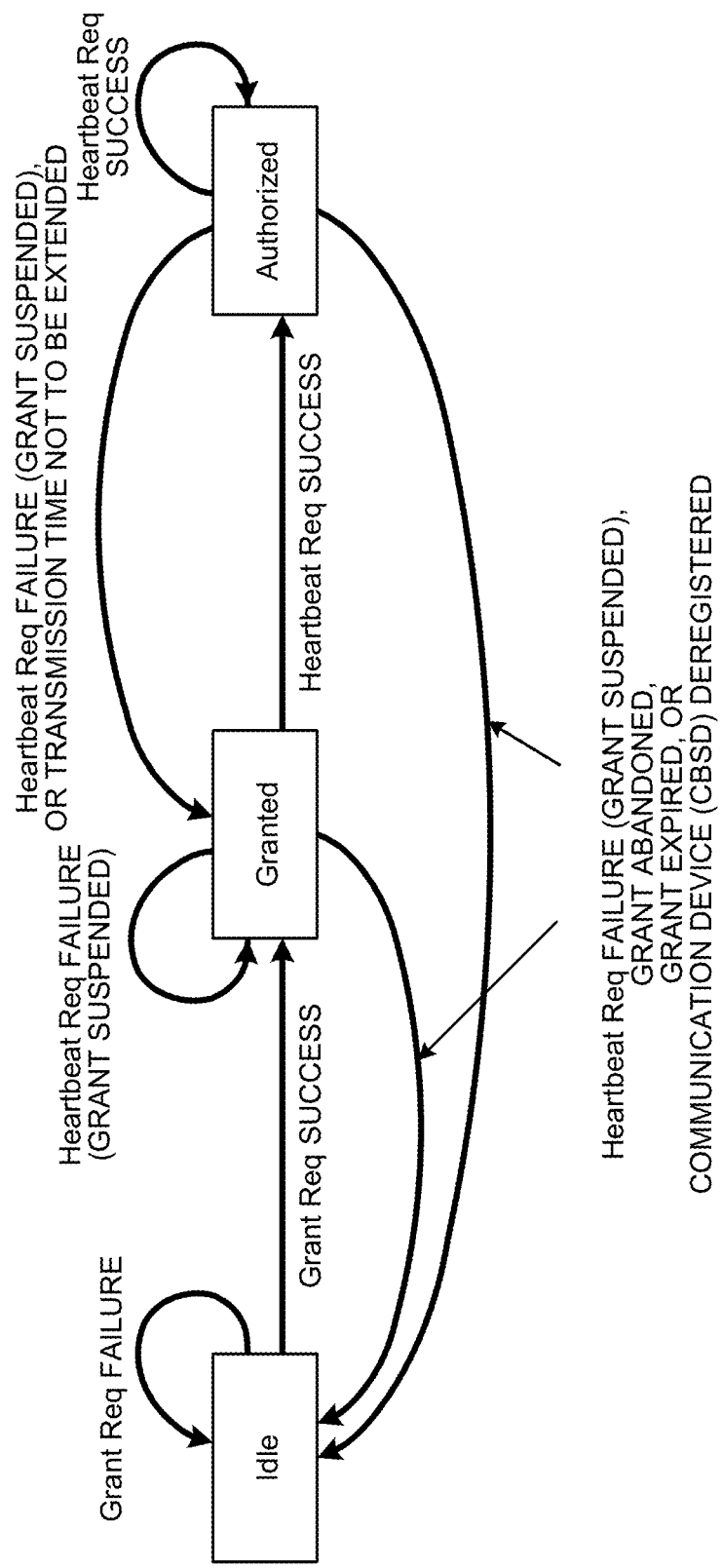
FIG. 20 is a state transition diagram illustrating a radio wave transmission permission state.

In the grant, a state indicating a state where radio wave transmission is permitted is defined. FIG. 20 is a state transition diagram illustrating a radio wave transmission permission state. In FIG. 20, a granted state indicates a state in which a grant is held but radio wave transmission is prohibited, and an authorized state indicates a state in which radio wave transmission is permitted on the basis of an operation parameter value defined in the grant. These two states transition in accordance with a result of a heartbeat procedure defined in the same standard.

In the following description, the frequency use notification may be referred to as a heartbeat request or simply a heartbeat. Further, a transmission interval of the heartbeat request may be referred to as a heartbeat interval. Note that description of the heartbeat request or the heartbeat appearing in the following description can be appropriately replaced with other description indicating "a request for starting or continuing radio wave transmission". In a similar manner, the heartbeat interval can be replaced with other description (for example, a transmission interval) indicating the transmission interval of the frequency use notification.

Figure 21:
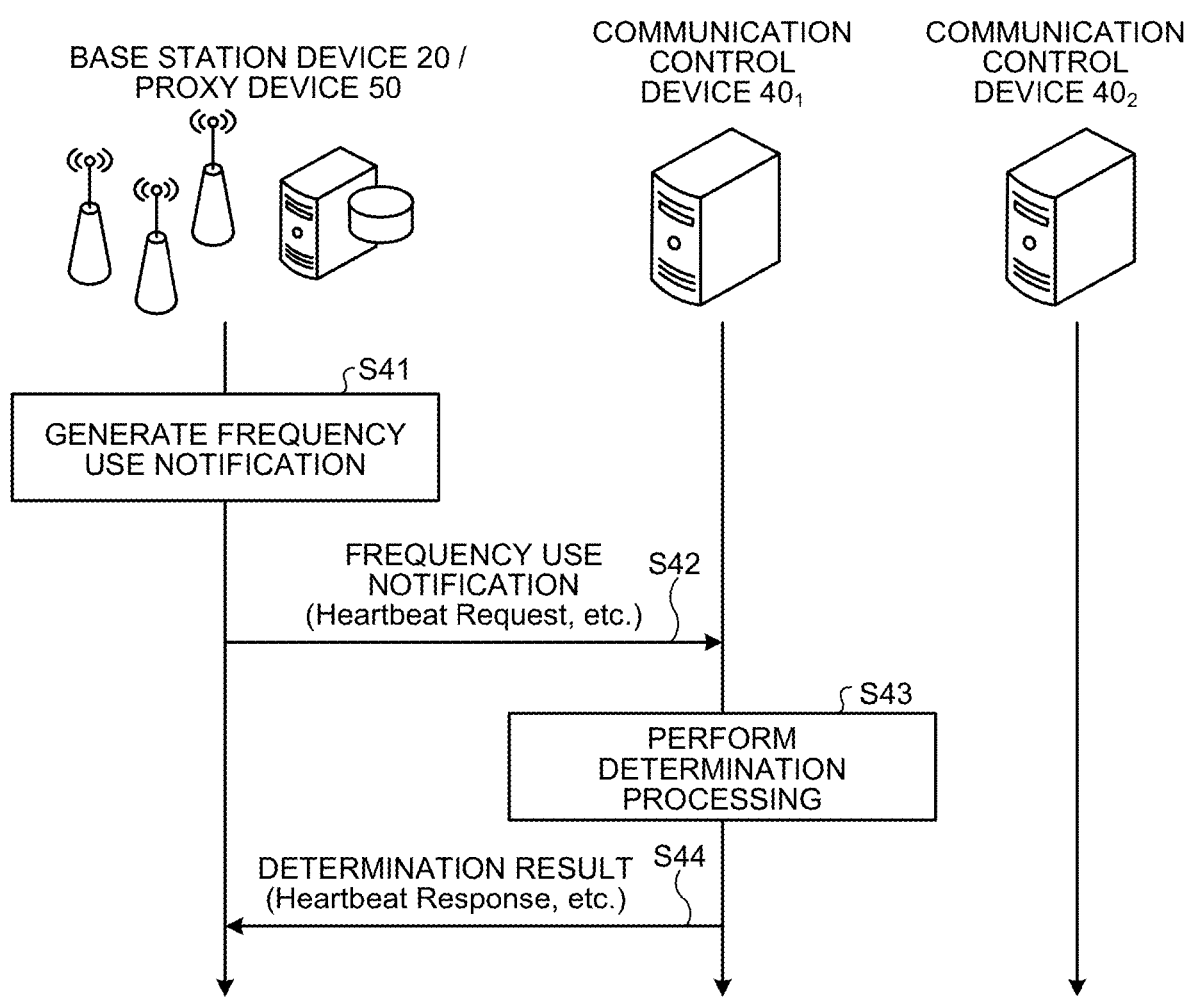
FIG. 21 is a sequence diagram for explaining a frequency use notification procedure.

FIG. 21 is a sequence diagram for explaining a frequency use notification procedure. One or more communication systems including the base station device 20 or the plurality of base station devices 20 generate a notification message including information that can specify the base station device 20 (step S41) and notifies the communication control device 40 of the notification message (step S42). The proxy device 50 may generate and/or make a notification of the message.

After receiving the frequency use notification, the communication control device 40 may determine whether start/continuation of the radio wave transmission is allowed (step S43). Examples of the determination method can include confirmation of the frequency usage information of the primary system. Specifically, start/continuation permission or rejection of radio wave transmission can be determined on the basis of change in the use frequency of the primary system, change in the frequency use status of the primary system in which the radio wave use is not steady (for example, on-board radar), or the like.

After the determination processing is completed, the communication control device 40 notifies the base station device 20 (or the proxy device 50) of the determination result (step S44).

In this procedure, a command to reconfigure (reconfiguration) the communication parameters may be given from the communication control device 40 to the base station device 20 (or the proxy device 50), or the like. Typically, the command may be given in response to the frequency use notification. For example, communication parameter information to be recommended may be provided.

5-5. Supplement to Various Procedures

Here, the various procedures do not necessarily have to be individually implemented as will be described below. For example, two different procedures may be implemented by substituting a third procedure with roles of the two different procedures. Specifically, for example, the registration request and the available spectrum query request may be integrally notified. Further, for example, the frequency use permission procedure and the frequency use notification may be integrally performed. Of course, combinations are not limited to these combinations, and three or more procedures may be combined. Further, the above procedures may be separately performed.

Still further, in a case where the present embodiment is applied for the purpose of frequency sharing with an existing system, appropriate procedures or equivalent procedures are preferably selected and used on the basis of the radio law related to the frequency band in the country or region in which the technology of the present embodiment is implemented. For example, in a case where registration of a communication device is required for use of a specific frequency band in a specific country or region, it is preferable to perform the registration procedure.

Further, expression of "acquiring information" or expression equivalent thereto in the present embodiment does not necessarily mean that the information is acquired according to the procedure described above. For example, while it is described that the position information of the base station device 20 is used in the available frequency evaluation processing, it means that it is not always necessary to use the information acquired in the registration procedure, and in a case where the position information is included in the available frequency inquiry procedure request, the position information may be used. In other words, it means that the described parameters may be included in other procedures within the scope described in the present embodiment and within the scope of technical feasibility.

Further, information that can be included in a response from the communication control device 40 to the base station device 20 (or the proxy device 50), or the like, described in the above procedure may be transmitted as a push notification. As a specific example, available spectrum information, recommended communication parameter information, a radio wave transmission continuation rejection notification, and the like, may be transmitted as push notifications.

5-6. Various Procedures for Terminal Device

Basically, each procedure described in <5-1> to <5-4> can be used for the terminal device 30. However, unlike the base station device 20, the terminal device 30 has mobility. In other words, the position information is dynamically updated. Depending on the legal system, in a case where the position information changes by equal to or more than a certain amount, there is a case where re-registration to the communication control device 40 is required. Thus, in an operation form (see Non Patent Literature 4) defined by the Office of Communication (Ofcom), the following two types of communication parameters are defined.

Specific operational parameters
Generic operational parameters

The specific operational parameters are defined as "operation parameters specific to a specific slave white space device (WSD)" in the Non Patent Literature. In other words, the specific operational parameters are communication parameters calculated using the device parameters of the slave WSD corresponding to the terminal device 30. As a feature, the specific operational parameters are calculated by a white space database (WSDB) using the position information of the slave WSD.

From such a feature, it is assumed that the specific operational parameters are suitable for the terminal device 30 that has low mobility or that is fixedly installed.

The generic operational parameters are defined as "operation parameters with which any slave WSD located within the coverage area of a given master WSD (corresponding to the base station device 20) can be used" in the Non Patent Literature. As a feature, the generic operational parameters are calculated by the WSDB without using the position information of the slave WSD.

From such a feature, it is assumed that the generic operational parameters are suitable for the terminal device 30 having high mobility.

The information for the terminal device 30 can be provided from the base station device 20 through unicast/broadcast. For example, a broadcast signal represented by contact verification signal (CVS) defined in FCC rule Part 15 Subpart H can be used. Alternatively, the generic operational parameters may be provided by a broadcast signal specific to a wireless interface. Specifically, the generic operational parameters may be provided by, for example, a physical broadcast channel (PBCH) or NR-PBCH used in LTE or 5GNR.

5-7. Procedure Occurring Between Communication Control Devices

[Information Exchange]

Figure 22:
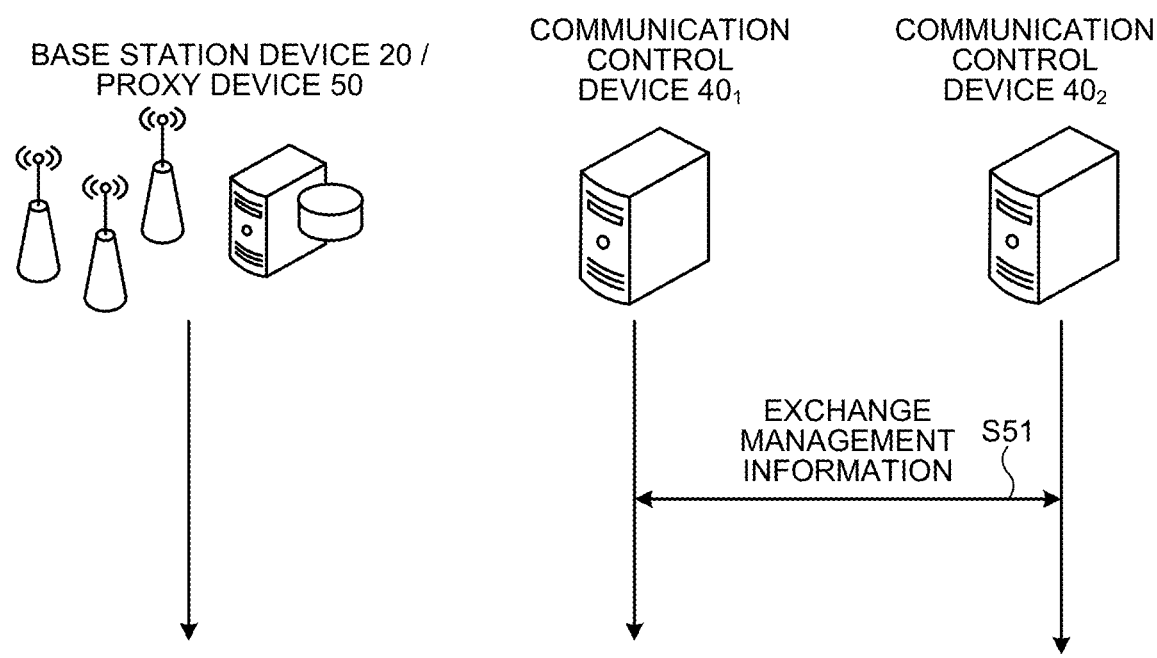
FIG. 22 is a sequence diagram for explaining a management information exchange procedure.

The communication control device 40 can exchange management information with another communication control device 40. FIG. 22 is a sequence diagram for explaining a management information exchange procedure. In the example of FIG. 22, the communication control device $40_1$ and the communication control device $40_2$ exchange management information (step S51). Of course, the communication control device that exchanges information is not limited to two of the communication control device $40_1$ and the communication control device $40_2$.

In the management information exchange procedure, at least the following information is preferably exchanged.

Communication device registration information
Communication device communication parameter information
Area information The communication device registration information is typically a device parameter of the base station device 20 registered in the communication control device 40 in the registration procedure. Not all the registered information necessarily has to be exchanged. For example, information that may correspond to personal information does not have to be exchanged. Further, when the communication device registration information is exchanged, encrypted and ambiguous information may be exchanged. For example, information converted into a binary value or information signed using an electronic signature mechanism may be exchanged.

Typically, the communication device communication parameter information is information related to a communication parameter currently used by the base station device 20. The communication device communication parameter information preferably includes at least information indicating the use frequency and the transmission power. The communication device communication parameter information may include other communication parameters.

The area information is typically information indicating a predetermined geographical area. The information may include area information of various attributes in various aspects.

For example, the information may include protection area information of the base station device 20 serving as a high priority secondary system such as PAL protection area (PPA) disclosed in Non Patent Literature 5. The area information in this case can be expressed by, for example, a set of three or more geolocation coordinates. Further, for example, in a case where a plurality of communication control devices 40 can refer to a common external database, the information can be expressed by an ID indicating the information.

Still further, for example, information indicating coverage of the base station device 20 may be included. The area information in this case can also be expressed by, for example, a set of three or more geolocation coordinates. Further, for example, the area information can be expressed by information indicating a radius size of a circle assuming the circle with a geographical position of the base station device 20 as the origin. Further, for example, in a case where a plurality of communication control devices 40 can refer to a common external database, the information can be expressed by an ID indicating the information.

Further, as another aspect, information related to an area section determined in advance by an administration or the like, can also be included. Specifically, for example, it is possible to indicate a certain region by indicating an address. Further, for example, a license area or the like, can be expressed in a similar manner.

Still further, as still another aspect, the area information does not necessarily have to express a planar area and may express a three-dimensional space. For example, the area may be expressed using a spatial coordinate system. Further, for example, information indicating a predetermined closed space such as a floor number, a floor, and a room number of a building may be used.

These pieces of information may be exchanged in various manners. An example thereof will be described below.

ID designation scheme
Period designation scheme
Region designation scheme
Dump scheme The ID designation scheme is a scheme of acquiring information corresponding to an ID given in advance to specify information to be managed by the communication control device 40. For example, it is assumed that the communication control device 40$_1$ manages a base station device 20 with ID: AAA. In this event, the communication control device 40$_2$ designates the ID: AAA and makes an information acquisition request to the communication control device 40$_1$. After receiving the request, the communication control device 40$_1$ searches for information of ID: AAA and makes a notification of the registration information and the communication parameter information of the corresponding base station device 20 as a response.

In the period designation scheme, a specific period is designated, and information satisfying a predetermined condition can be exchanged during the period.

Examples of the predetermined condition include whether or not information is updated. For example, in a case where acquisition of communication device information in a specific period is designated by a request, registration information on the base station device 20 newly registered in the period or registration information on the base station device 20 for which communication parameters have been changed and information on the communication parameters can be notified as a response.

Examples of the predetermined condition include whether or not the communication control device 40 performs recording. For example, in a case where acquisition of the communication device information in a specific period is designated by the request, the registration information of the base station device 20 and the information of the communication parameters recorded by the communication control device 40 in the specific period can be notified as a response. Further, the latest information in the period can be notified. Alternatively, update history may be notified for each piece of information.

In the region designation scheme, a specific region is designated, and information belonging to the region is exchanged. For example, in a case where acquisition of communication device information in a specific region is designated by a request, registration information of the base station device 20 installed in the region and information of communication parameters can be notified as a response.

The dump scheme is a scheme of providing all information recorded by the communication control device 40. At least information and area information related to the base station device 20 are preferably provided by the dump scheme.

The above description of the information exchange between the communication control devices 40 is all based on a pull scheme. In other words, the information exchange takes a form in which information corresponding to the parameters specified in the request is responded and can be implemented by the HTTP GET method as an example. However, the present invention is not limited to the pull scheme, and information may be actively provided to another communication control device 40 by a push scheme. The push scheme can be implemented by, for example, the HTTP POST method.

[Command/Request Procedure]

The communication control device 40 may execute a command and/or a request with each other. Specifically, as an example, communication parameters of the base station device 20 are reconfigured. For example, in a case where it is determined that the base station device 20$_1$ managed by the communication control device 40$_1$ receives a large amount of interference from the base station device 20$_4$ managed by the communication control device 40$_2$, the communication control device 40$_1$ may request the communication control device 40$_2$ to change the communication parameters of the base station device 20$_4$.

As another example, area information is reconfigured. For example, in a case where a defect is found in calculation of the coverage information and the protection area information regarding the base station device 20$_4$ managed by the communication control device 40$_2$, the communication control device 40$_1$ may request the communication control device 40$_2$ to reconfigure the area information. Besides this, reconfiguration of the area information may be requested for various reasons.

6. Primary System Protection

Subsequently, primary system protection according to an embodiment of the present disclosure will be described. Hereinafter, an FPU operated by a broadcaster in Japan will be described as an example, but the primary system protection according to the embodiment of the present disclosure is not limited to the FPU.

For example, a wireless system for public affairs in a 2.3 GHz band, a satellite mobile communication service or a broadband mobile radio access system in a 2.6 GHz band, a 5 GHz band radio access system, dedicated short range communications (DSRC), armature radio, a 5.8 GHz band image transmission system, FPU using a microwave band around 5 to 7 GHz, studio to transmitter link (STL)/transmitter to transmitter link (TTL)/transmitter to studio link (TSL) to be used for video transmission, a fixed wireless system for 6 GHz band electric communication business, mobile satellite uplink (C band), 26 GHz band fixed wireless access (FWA), an airport surface detection radar, a 25 GHz band small power data communication system, satellite uplink (Ka band), image transmission (public affairs) using a 40 GHz band, a wireless system for public affairs and general works using a 40 GHz band, and FPU using a 40 GHz band may also be subject to primary system protection.

6-1. Protection Model of Assumed Primary System

In the description of the FPU, a wireless station that transmits a video will be referred to as an FPU transmitting station, and a wireless station that receives a video will be referred to as an FPU receiving station. Note that while only the FPU receiving station needs to be protected from the secondary system in the current FPU, in an FPU advanced scheme which is now being considered for introduction, the FPU receiving station transmits a control signal to the transmitting station. Thus, the FPU transmitting station also needs to be protected from the secondary system. In the embodiments of the present disclosure, protection of the FPU transmitting station will also be described.

As a usage model of the FPU according to the embodiment, the following six operation models disclosed in Non Patent Literature 7 are assumed. Of course, the usage model of the FPU is not limited to the six models.

Model 1: Transmission from a relay vehicle to a receiving base station with a propagation distance of 50 km (fixed relay)

Model 2: Transmission from a relay vehicle to a receiving base station with a propagation distance of 10 km (moving relay) Model 3: Transmission from a relay vehicle to a receiving base station in a short distance section in an urban area with a propagation distance of about 3 km (moving relay)

Model 4: Transmission from a relay vehicle to a helicopter with a propagation distance of about 2 km (moving relay)

Model 5: Transmission up to a propagation distance of 1 km to the nearest relay vehicle while carrying equipment on the back (moving relay) Model 6: Transmission from a motorcycle to a relay vehicle up to a propagation distance of 1 km (moving relay)

In all of the above models, the FPU transmitting/receiving station may be temporarily installed during use. For this reason, the position information of the FPU transmitting/receiving station may fluctuate every use. Note that Models 1 to 3 may also include an FPU receiving station that is constantly installed in a building, on a mountain, or the like. Hereinafter, the former is referred to as a mobile station, and the latter is referred to as a fixed station.

Further, in each usage model of the FPU assumed this time, there are two usage modes of a case where the FPU is used in a planned manner at a predetermined place or time and other unplanned uses. The former corresponds to use of Models 1 to 6 in an information program, a sports relay, or the like, and a specific use place or use time of a wireless station applied in advance by a broadcaster can be used for interference calculation. On the other hand, the latter is assumed in Models 1 and 5, and a specific use place and specific use time are not known until immediately before use, so that a specific use schedule cannot be used for primary system protection.

Among the above-described usage models, Models 1 and 5 are mainly assumed to be used for unplanned use in a news program and the like. Note that the planned use is assumed in all Models 1 to 6.

Table 1 below is an example of use position information for each usage model and each use form. Further, of course, the information to be provided varies depending on the primary system and the operator thereof, and thus, is not limited to those listed in Table 1 below.

TABLE 1

| | | Use position information | |
|---|---|---|---|
| | Use form | Planned use | Unplanned use |
| Model 1 | Transmitting station | Point | Candidate area |
| | Receiving station | Point | Point |
| Model 2 | Transmitting station | Area | |
| | Receiving station | Point | |
| Model 3 | Transmitting station | Area | |
| | Receiving station | Point | |
| Model 4 | Transmitting station | Area | |
| | Receiving station | Area | |
| Model 5 | Transmitting station | Area | Candidate area |
| | Receiving station | Point* | Candidate area |
| Model 6 | Transmitting station | Area | |
| | Receiving station | Point* | |

*May be provided as area in some cases

One of differences of the FPU from the primary system assumed in the CBRS, the TVWS, and the like, in the related art is that the wireless station can move, and thus, the use position is a point or an area for each usage model. Further, there are two use forms, and the information indicated as the use position at the time of unplanned use is merely a candidate area. In the embodiment of the present disclosure, information provided from the primary system is analyzed, and a method for protecting the primary system is switched in accordance with a usage model and a use form.

Further, it is also a feature that an antenna of a wireless station to be a communication partner can move in response to movement of the wireless station. For example, in the planned use of Models 2 to 6, there is a possibility that the antenna of the receiving station rotates, or the like, following the movement of the transmitting station, so that it is necessary to protect an entire rotation range. In the unplanned use of Models 1 and 5, when the transmitting station detects that the transmitting station is used in the candidate area, there is a possibility that the antenna of the receiving station is directed in that direction, so that it is necessary to protect the antenna of the receiving station so as to face anywhere in the rotation range of the antenna.

6-2. Information Regarding Primary Wireless Station

As the detailed specifications and use schedule information of the primary wireless station necessary for protecting the primary system, information input to the wireless station specification database or the wireless station use schedule database, or information input to the communication control device 40 by an HTTP request/response, or the like, is used.

6-2-1. Detailed Specifications of Primary Wireless Station

The detailed specifications of the primary wireless station used in interference calculation can include, for example, the following information.

Information capable of specifying a wireless station
Wireless station user information
Wireless station hardware information
Antenna information
Wireless interface information
Position information
Legal Information The information capable of specifying the individual wireless station may include a serial number, a product model number, a manufacturing number, manufacturer information, and the like.

As the wireless station user information, a user ID, a call sign, or the like, of the primary system can be assumed. The user ID may be independently generated by the wireless station user or may be issued in advance by the communication control device 40. In a case of the FPU, the wireless station user is a broadcaster that operates the FPU.

The wireless station hardware information may include installation information of the primary wireless station, and the like. As the wireless station of the FPU, a fixed receiving station permanently installed in a building or on a mountain, a fixed receiving station installed only at the time of an event, a movable transmitting/receiving station mounted on a relay vehicle, a portable transmitting station that can be carried by a person, a transmitting station installed in a small vehicle such as a motorcycle, and the like, are assumed. Thus, the installation information preferably includes information that can distinguish among them. For example, possible information can include an identifier for distinguishing between the transmitting station and the receiving station, an identifier indicating whether or not the station can move, and the like.

The antenna information is typically information indicating performance, a configuration, and the like, of an antenna provided at the communication device. Typically, information such as an antenna installation height, a tilt angle (down tilt), a direction in a horizontal direction (azimuth), an elevation angle (elevation), aim (boresight), an antenna peak gain, and an antenna model can be included.

In a case of the FPU, there is a possibility that an installation height, a tilt angle (down tilt), a horizontal direction (azimuth), an elevation angle (elevation), an aim (boresight), and the like, of the antenna change at the time of use, and thus, these pieces of information may be given as ranges of values.

The wireless interface information is typically information indicating a wireless interface technology provided at the communication device. In a case of the FPU, the wireless interface information preferably includes a state of compliance of the wireless station with the ARIB standard. Examples thereof include a support state for the advanced FPU scheme, a subframe length, a modulation scheme, a spatial multiplexing scheme, an occupied frequency bandwidth (full mode, half mode), an error correction code, and antenna power.

The position information is typically information capable of specifying a geographical position of the primary wireless station. The coordinate information can include information related to latitude, longitude, altitude, and a positioning error. Alternatively, for example, coordinates on an X axis, a Y axis, and a Z axis with a specific geographical position as an origin may be used.

These pieces of position information may be input to the database or the communication control device 40 by the user of the primary wireless station. The position information to be input is preferably coordinate information acquired by the user of the primary wireless station by a positioning function. Further, information acquired by the positioning function mounted on the primary wireless station itself may be input from the primary wireless station as the position information.

Still further, in a case where there is no position information, such as a case where the primary wireless station is installed only at the time of use, the position information does not necessarily have to be included in the detailed specifications. In this case, the position information is preferably included in the use schedule information of the primary wireless station. In a case of a fixed wireless station, the position information can be included in the detailed specifications.

The legal information is typically information related to regulations that the communication device must comply with, which are defined by radio administration agencies in each country and region or equivalent organizations, authentication information acquired by the communication device, and the like. Typically, the information regarding the regulations can include, for example, upper limit value information of out-of-band radiation, information regarding blocking characteristics of a receiver, and the like. Typically, the authentication information can include, for example, type approval information (such as an FCC ID and a technical standard conformance certificate), legal/regulatory information (for example, an FCC regulation number, an ETSI harmonized standard number, and the like) that becomes a standard for acquisition of authentication, and the like.

6-2-2. Use Schedule Information

As the use schedule information to be used for primary system protection, two types of schedule information of planned use and prior information of unplanned use are assumed for the usage mode of the primary system.

The schedule information of planned use and prior information of unplanned use preferably include the following elements.
Information capable of specifying a wireless station
Wireless station user information
Identifier of a communication partner wireless station
Use schedule identification information
Use form information
Use time
Use position information
Antenna information during use The information that can specify a wireless station and the wireless station user information can include information similar to the wireless station detailed specifications.

The identifier of a communication partner is information for identifying a wireless station of a communication partner in a case where the wireless station of the communication partner is determined in advance in the use schedule. The information is mainly input by the primary system user in advance to the database or the communication control device 40 in accordance with the planned use schedule of the wireless station. A serial number, a product model number, a production number, manufacturer information, and the like, that can specify an individual wireless station can be included.

As the use schedule identification information, an ID, or the like, that can specify the use schedule can be assumed. This ID may be independently generated by the wireless station user or may be issued in advance by the communication control device 40.

The use form information can include information for distinguishing whether the use form is planned use or unplanned use.

The use time is information for specifying time at which the primary wireless station is to be used as planned use and can be included only in the planned use schedule information. The information is mainly time at which the user desires to use the wireless station as planned use, input by the primary system user to the database or the communication control device in advance. Typically, the information is constituted by a pair of use start time and use end time. The number of pairs of time included in the same use schedule is not necessarily one and may include a plurality of time slots. Further, dates of a plurality of time slots included in the same use schedule may be different from each other. Further, not only the start time and the end time but also a schedule that repeats in date, hour, minute, second, and the like, may be included.

The use position information is information for specifying a geographical position where the primary wireless station is to be used. The information is mainly information of a point and an area where the wireless station is to be arranged at the time of planned use or information of a point or an area where the wireless station is likely to be arranged at the time of unplanned use, input by the primary system user to the database or the communication control device 40 in advance.

In a case of the FPU, the position of the mobile station changes for each use schedule, so that the position information is required for each use schedule. Further, the wireless station is used while moving depending on the operation model of the FPU, and thus, the area can be input as the use position information.

Still further, a mobile station mounted on a relay vehicle, a motorcycle, a person, a helicopter, or the like, moves even during transmission, and thus, an area is preferably input as the use position information. For example, the area may be indicated by a set of three or more geographical coordinates.

Further, in a case where the primary wireless station is mounted on an object moving in the air such as a helicopter, a three-dimensional space may be designated as the use position information.

Still further, the use position information may be a set of three or more geographical coordinates representing a dynamic protection area (DPA) described in Non Patent Literature 6 or a set of geographical points representing a use candidate position.

Further, in a case where the use position information including the DPA is described in a database outside the communication control device 40, the use position information can be expressed by an ID indicating the information.

The communication control device 40 protects the primary system on the basis of information on points and areas included in the use position information.

The antenna information during use is information for specifying antenna specifications at the time of planned use and antenna specifications assumed at the time of unplanned use of the primary wireless station. The information is mainly an antenna installation height, a tilt angle (down tilt), a horizontal direction (azimuth), an elevation angle (elevation), an aim (boresight), and the like, input by the primary system user to the database or the communication control device 40 in advance.

In the FPU, or the like, the antenna installation height, the tilt angle (down tilt), the horizontal direction (azimuth), the elevation angle (elevation), the aim (boresight), and the like, are set for each use schedule, or the antenna installation height, the tilt angle (down tilt), the horizontal direction (azimuth), the elevation angle (elevation), the aim (boresight), and the like, change during use, and thus, these pieces of information may be provided as ranges of values.

Further, in a case where the antenna information is described in a database outside the communication control device 40, the use position information can be expressed by an ID indicating the information.

The communication control device 40 protects the primary system on the basis of the antenna information during use.

6-2-3. Difference Between Planned Use and Unplanned Use in Use Schedule Information As described in (6-2-2. Use schedule information), accuracy of information that can be used for the aggregated interference power evaluation is different between the use schedule information of the planned use and the use schedule information of the unplanned use.

The use schedule information of the planned use is input in advance by the primary wireless station user such as a broadcaster. As this information, in addition to the use time, a point or an area where the primary wireless station is used and the use time antenna information are accurately input. In this manner, the aggregated interference power evaluation can be performed using the accurate use schedule information registered in advance, so that it is not necessary to take a large margin for the protection target point/region, the protection antenna information, and the like, which can result in increase in opportunities of using the secondary wireless station.

On the other hand, in the use schedule information for unplanned use, the use time is not designated in advance, and accurate use position information is not provided. Only points and regions that may be used, antenna information, and the like, are indicated, and accurate use schedule information cannot be used in advance, so that it is necessary to take a margin for the protection target point/region, the protection antenna information, and the like, at the time of aggregated interference power evaluation. Thus, the opportunities of using the secondary wireless station may decrease as compared with a case of the planned use.

The use schedule information of the unplanned use is provided to reliably protect the primary wireless station through the aggregated interference power evaluation with a margin even in a case where the aggregated interference power evaluation using the accurate information cannot be completed due to a short period from when a notification of the accurate use position of the primary wireless station, or the like, is made until when the primary wireless station is actually used.

6-3. Primary System Protection

Figure 23:
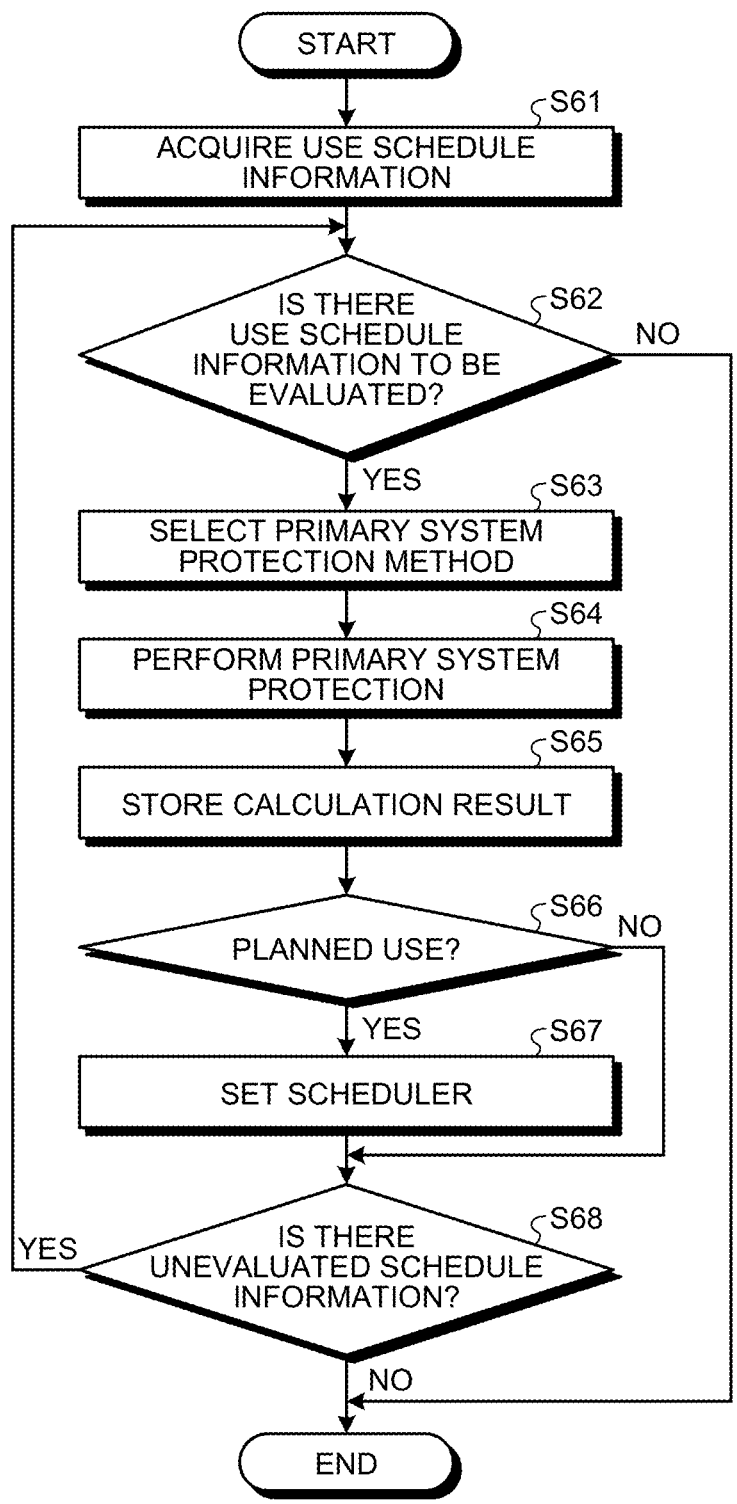
FIG. 23 is a flowchart illustrating a procedure of protecting a primary system.

The primary system protection according to the embodiment of the present disclosure is performed by the communication control device 40 according to the procedure illustrated in FIG. 23. FIG. 23 is a flowchart illustrating a procedure of protecting a primary system.

First, the communication control device 40 acquires the use schedule information input to the database and the communication control device by the operator of the primary system (step S61) and confirms whether there is use schedule information to be evaluated (step S62).

In a case where the acquired use schedule information includes a new use schedule or an existing use schedule is updated, the communication control device 40 performs processing related to primary system protection. Whether the existing use schedule is updated can be determined by, for example, comparing information with a use schedule having the same ID as that of the use schedule acquired last time.

In a case where the communication control device 40 determines that there is use schedule information to be evaluated (step S62; Yes), the primary system protection method is selected using the use schedule information (step S63). Further, an algorithm to be used for primary system protection may be selected.

The communication control device 40 performs primary system protection using the primary system protection method selected in step S63 (step S64) and stores the result in a database, or the like (step S65).

Note that when the primary system protection method is selected and implemented, various types of information included in the use schedule may be used as they are, or the use schedule information of the corresponding wireless station may be predicted using the use schedule information of other wireless stations, and the like, and then may be used.

Subsequently, the communication control device 40 determines whether the use form is the planned use (step S66).

In a case where the communication control device 40 determines that the use form is the planned use (step S66; Yes), a scheduler is set at the specified scheduled use time (step S67). As a result, the communication control device 40 can determine start of use of the primary system.

Subsequently, the communication control device 40 determines whether there is unevaluated schedule information (step S68). In a case where the communication control device 40 determines that there is unevaluated schedule information (step S68; Yes), the processing returns to the procedure of step S62. On the other hand, in a case where the communication control device 40 determines that there is no unevaluated schedule information (step S68; No), the procedure illustrated in FIG. 23 ends.

In step S62 described above, in a case where the communication control device 40 determines that there is no use schedule information to be evaluated (step S62; No), the procedure illustrated in FIG. 23 ends.

Finally, the communication control device 40 stores the result of the primary system protection in the database, or the like. These pieces of information can be read at the time of start of use of the primary system and can include information on the secondary wireless station that is required to stop a radio wave or change the parameters.

Note that the primary system protection is not necessarily performed for all wireless stations individually and may be performed while calculation is performed by regarding wireless stations between which a transmission distance is short as the same wireless station or regarding two or more adjacent wireless stations as one wireless station. Further, in a case where there are wireless stations having the same parameter, the evaluation result may be diverted.

6-3-1. Point Protection and Area Protection

Primary system protection is roughly divided into point protection and area protection depending on a protection target.

In the point protection, the position where the wireless station is installed itself becomes the protection target. In the CBRS, as disclosed in Non Patent Literature 6, a fixed satellite service (FSS) or the like, becomes a target of point protection.

As a point protection algorithm used in the CBRS, there are an iterative allocation process (IAP) in which a margin of an interference amount with respect to the primary wireless station is allocated to the secondary wireless station and a method in which a list of secondary wireless stations that need to be stopped is created by calculating aggregated interference power from the secondary wireless stations. Of course, other point protection algorithms may be used.

Note that the latter method is used to reduce the out-of-band interference of the FSS within a predetermined value, and this list is called a purge list, and the secondary wireless stations included in this list are prohibited from communicating using the corresponding channel.

A similar algorithm may also be used in a case where one or more points are given where a wireless station may be used. When use of the primary wireless station is detected or a notification of use of the primary wireless station is made by the scheduler set in advance, it is possible to request the secondary wireless station to stop the radio wave or change the parameters by the frequency use notification. In the embodiment of the present disclosure, such point protection is distinguished as dynamic point protection.

In the area protection, the entire coverage of a fixed wireless station or the entire range in which a wireless station may exist is set as the protection target. In the CBRS, as disclosed in Non Patent Literature 6, coverage under a grandfather wireless broadband license (GWBL) or a primary access license (PAL), an area where there is a possibility that an on-board radar, or the like, which is a federal incumbent moves, and the like, become targets for area protection.

A plurality of interference calculation reference points (hereinafter, the protection points) is set in the area to be protected, and the protection points need to be protected from the secondary system. Although any method may be used as a method of setting the protection point, for example, the inside of the protection region may be divided into a lattice shape, and the center of a predetermined lattice may be set as the protection point. In the CBRS, all intersections of grids for each of two angles of latitude and longitude are set as protection points.

While in the CBRS, to protect the protection point, the IAP and a stop list of the secondary wireless stations are calculated in a similar manner to the point protection, the area protection algorithm used in the present invention is not limited thereto.

Further, an area in which the federal incumbent may move is defined as a dynamic protection area (DPA) in the CBRS. The DPA is obtained by dividing a region assumed to be used by the federal incumbent into a plurality of areas. A plurality of protection points is set in each DPA in a similar manner to a normal protection target area, and a list (move List) of wireless stations that need to be stopped is created by calculating aggregated interference from the secondary wireless station to all protection points in each DPA. When an environmental sensing capability (ESC) sensor detects use of the primary wireless station in the DPA or the scheduler set in advance makes a notification of use of the primary wireless station, the secondary wireless station included in the move list is requested to stop the radio wave by the frequency use notification.

Further, in the DPA of the CBRS, use of the primary system requires anonymity of the sensor position information.

While the DPA in the CBRS is used only when the move list is created, the IAP may be implemented using the DPA to instruct the secondary wireless station to change the parameters.

In the present invention, area protection using the DPA is distinguished as dynamic area protection.

Further, as another primary system protection, simple inside-outside determination such as an exclusion zone in CBRS may be performed.

These kinds of primary system protection are periodically executed at arbitrary intervals using the use schedule information. These results are stored in the database or the like, and when use of the primary wireless station is actually detected by a scheduler, a sensor, a database, or the like, the secondary wireless station is notified of these kinds of information by the frequency use permission processing or the frequency use notification.

Note that the interval at which the primary system is protected can be determined independently by the communication control device or can be determined by a user of the primary system, a radio administration agency in each country or region, or an organization equivalent thereto.

Further, in a case where it is determined that the calculation will not be in time by the scheduled use time input to the use schedule information of the planned use when the primary system is protected, interference calculation does not necessarily have to be performed, and the primary wireless station may be protected using the result of the primary system protection processing performed using the use schedule information of the unplanned use.

6-3-2. Primary System Protection Method Selection Procedure

In primary system protection in the CBRS, protection methods are determined by standards and laws for each primary system, such as point protection for the FSS, area protection for the GWBL and the PAL, and area protection using the DPA for military equipment such as an on-board radar.

On the other hand, in a primary system with mobility of a wireless station as assumed in Japan, it is necessary for the communication control device 40 itself to switch and use two methods of a method in which point/area protection such as the FSS, the GWBL, and the PAL of the CBRS is performed by a scheduler and a method in which a corresponding point or area is protected when a sensor, or the like, detects use by a dynamic protection point area such as the DPA being set.

In the CBRS, such a primary system is not assumed, so that the communication control device 40 cannot autonomously determine, switch and use the primary system protection method.

In the embodiment of the present disclosure, the communication control device 40 autonomously determines the primary system protection method by acquiring the use schedule information of the wireless station from the primary system side and determining the information included in the use schedule information.

Specifically, the communication control device 40 (the control unit 44) selects the primary system protection method from the use form, the use position information, and the like, of the wireless station provided from the primary system. Note that other use schedule information may be used.

Even in a case where there is a plurality of use applications of wireless stations in the same primary system and a plurality of use schedules of the same wireless station, it is possible to perform primary system protection such as aggregated interference power evaluation.

Figure 24:
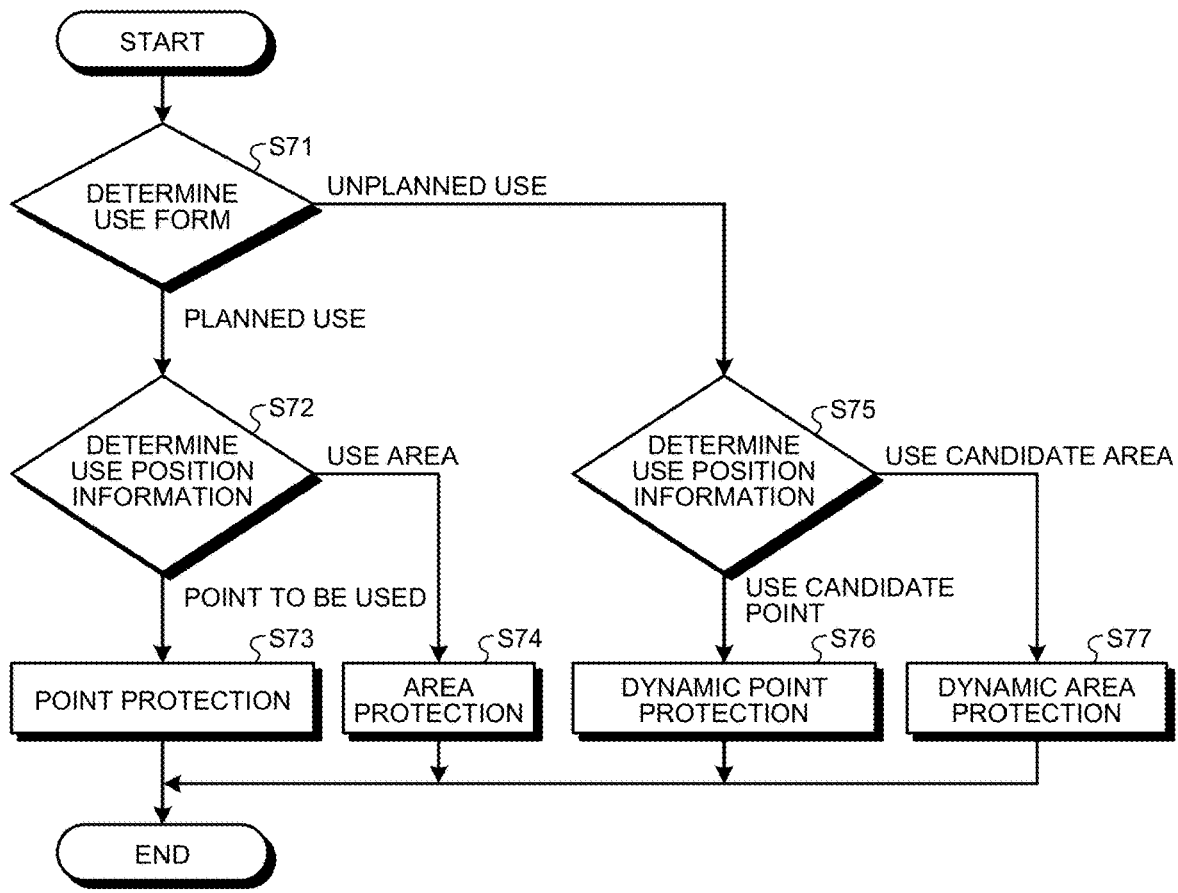
FIG. 24 is a flowchart illustrating an example of a switching (selection) procedure of a primary system protection method.

FIG. 24 illustrates an example of switching (selection) of flow of the primary system protection method by the communication control device 40. FIG. 24 is a flowchart illustrating an example of a switching (selection) procedure of a primary system protection method. The flow illustrated in FIG. 24 is executed by the control unit 44 of the communication control device 40.

In the example illustrated in FIG. 24, the control unit 44 selects one protection method from a plurality of primary system protection methods including a dynamic or static protection method on the basis of a use form and use position information of a primary wireless station and protects the primary wireless station on the basis of the selected protection method.

Further, in the example illustrated in FIG. 24, the control unit 44 selects one static protection method and performs the static protection method in a case where the wireless station is used for planned use and selects one dynamic protection method and performs the dynamic protection method in a case where the wireless station is used for unplanned use.

Further, in the example illustrated in FIG. 24, the control unit 44 selects point protection and performs point protection on the basis of a protection target point of the wireless station determined on the basis of the use position information of the wireless station, and selects area protection and performs area protection on the basis of a protection target area of the wireless station determined on the basis of the use position information of the wireless station.

First, the communication control device 40 determines whether the use form is planned use or unplanned use (step S71).

In a case where the communication control device 40 determines that the use form is the planned use (step S71; planned use), the communication control device 40 determines whether the point information or the area information to be used is included in the use position information (step S72).

In a case where the communication control device 40 determines that the point information to be used is included in the use position information (step S72; point to be used), the point protection is performed on this point (step S73), and the procedure illustrated in FIG. 24 ends.

On the other hand, in a case where the communication control device 40 determines that the use position information includes information on the area information to be used (step S72; use areas), the communication control device 40 performs area protection on the areas (step 74), and the procedure illustrated in FIG. 24 ends.

In a case of the FPU, examples of the wireless station as the point protection target can include the FPU transmitting/receiving station of Model 1, and the receiving stations of Models 2, 3, 4, and 6, and the like. On the other hand, the wireless stations which are area protection targets can include an FPU transmitting/receiving station of Models 2 to 6, a receiving station of Model 4, and the like.

At the time of this selection, the use position information of the corresponding wireless station may be predicted using the use position information of other wireless stations, and the point protection or the area protection may be performed after the primary system protection method is selected using the information.

Further, in a case where the communication control device 40 determines that the use form is unplanned use (step S71; unplanned use), the communication control device 40 determines whether the use position information includes either the information on the use candidate point or the information on the use candidate area (step S75). The use candidate point is given as a point that may be used in the use position information. The use candidate area is given as an area that may be used such as the DPA in the use position information.

In a case where the communication control device 40 determines that the information on the use candidate point is included in the use position information (step S75; use candidate point), the dynamic point protection is performed on this point (step S76), and the procedure illustrated in FIG. 24 ends.

On the other hand, in a case where the communication control device 40 determines that the use position information includes information on a plurality of use candidate areas such as the DPAs (step S75; use candidate areas), the communication control device 40 performs dynamic area protection on the areas (step 77), and the procedure illustrated in FIG. 24 ends.

Note that, at the time of this selection, the communication control device may predict a point at which the corresponding wireless station is likely to be used or a use candidate area such as the DPA using the use position information, or the like, of other wireless stations and may perform dynamic point protection or dynamic area protection after selecting a primary system protection method using the information.

6-3-3. Supplement of Use Form and Use Position Information

The communication control device 40 may perform both static protection and dynamic protection on the basis of the use form. For example, in a case of a usage mode in which planned use and unplanned use are switched during use of the primary wireless station, the communication control device 40 may perform calculation with both static protection and dynamic protection in advance and switch between static protection and dynamic protection during use of the primary wireless station. In this event, in a case where the use form is switched between the planned use and the unplanned use, the control unit 44 of the communication control device 40 functions as a processing unit that performs switching between the static protection method and the dynamic protection method.

Further, the communication control device 40 may perform both point protection and area protection on the basis of the use position information. For example, in a case of use position information in which fixed use and moving use are switched during use of the primary wireless station, the communication control device 40 may perform calculation in advance for both area protection and point protection and switch between area protection and point protection during use of the primary wireless station. In this event, in a case where the use position information is switched between the fixed use and the moving use, the control unit 44 of the communication control device 40 functions as a processing unit that performs switching between the point protection and the area protection.

Further, the communication control device 40 does not necessarily have to perform switching between point protection and area protection or switching between dynamic point protection and dynamic area protection on the basis of only whether the use position information of the primary wireless station is a point or an area. For example, in a case where accuracy of the use position information itself of the primary wireless station or accuracy of the interference power from the secondary wireless station predicted from the use position information is low, the protection target point of the primary wireless station may be extended to the protection target area and switched from the point protection to the area protection to more reliably protect the primary wireless station. In this event, the control unit 44 of the communication control device 40 functions as a processing unit that performs switching between point protection and area protection on the basis of the accuracy of the use position information or the accuracy of the interference power from the secondary wireless station predicted from the use position information.

The accuracy of the use position information of the primary wireless station can be included in, for example, detailed specifications of the primary wireless station or use schedule information. In addition, the accuracy of the interference power may be given in advance as prior information or may be predicted from environmental data such as topography near the use position. For example, in a case where it is predicted from the map data that the surrounding environment lowers the prediction accuracy of the propagation loss, the communication control device 40 may switch from the point protection to the area protection. Further, at the applied use position, when the protection target antenna direction which will be described later is predicted, in a case where a very narrow range is calculated as a rotation range of the antenna or the range cannot be calculated, the communication control device 40 may determine that there is a possibility that accuracy of the calculation result is low and may switch the point protection to the area protection. Note that a switching criterion is not limited to these, and parameters related to the use form and the use position information or values calculated using the parameters may be used as the switching criterion.

Note that the extended protection target area may be set, for example, within a certain distance from the actual use position. This distance may be given in advance by laws and regulations or may be provided by an operator of the primary system, an administrative agency, or a third party organization. Further, different values may be designated in accordance with the surrounding environment.

Further, in a case where there is an abnormality in the result after performing calculation through the point protection once, the communication control device 40 may switch the point protection to the area protection and perform calculation again in a similar manner. For example, a case is assumed where the number of primary wireless stations permitted to be used, the ratio thereof to the total number, or the transmission power of the primary wireless station is greater than or equal to a specified value.

Figure 25:
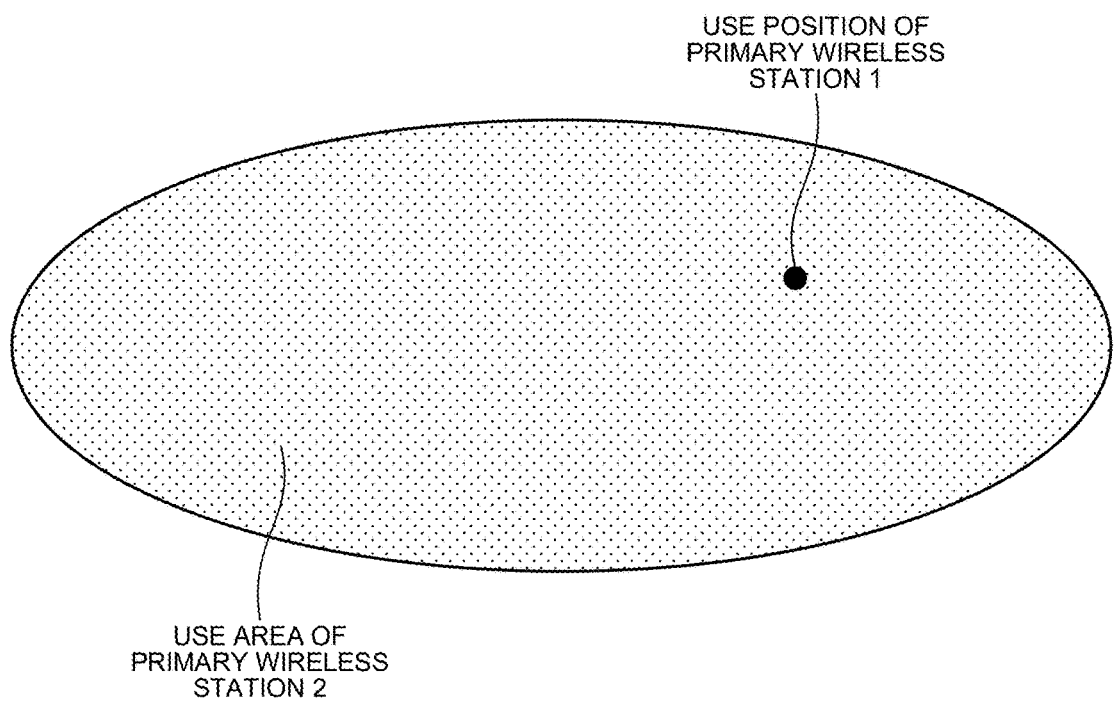
FIG. 25 is a diagram illustrating an example of a positional relationship between a use position of a primary wireless station and a use area of another wireless station.

Further, the communication control device 40 may perform area protection using use areas of other primary wireless stations. FIG. 25 is a diagram illustrating an example of a positional relationship between a use position of a primary wireless station and a use area of another wireless station. As illustrated in FIG. 25, in a case where the use position of the primary wireless station 1 used at a certain point is included in a use area of another primary wireless station 2, and there is overlap between use time of the two primary wireless stations, the primary wireless station 1 may also perform area protection using the use area of the primary wireless station 2. In this event, in a case where a calculation result for the primary wireless station 2 has been calculated, the result may be used to protect the primary wireless station 1. Conversely, in a case where the calculation result of the primary wireless station 2 has not been calculated, the result of the primary wireless station 1 may be used to protect the primary wireless station 2. In this event, in a case where the use position of the first wireless station (for example, the primary wireless station 1) is included in the use area of the second wireless station (for example, the primary wireless station 2), and there is overlap between the use time of the first wireless station and the second wireless station, the control unit 44 of the communication control device 40 functions as a processing unit that performs area protection using the use area of the second wireless station for the first wireless station.

Figure 26:
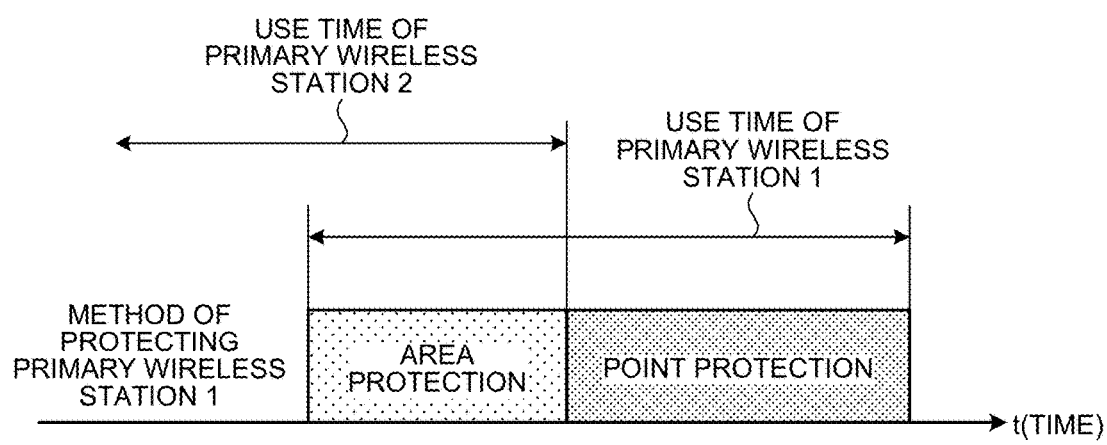
FIG. 26 is a diagram illustrating an example of a relationship between a method of protecting a primary wireless station and use time thereof and a method of protecting another wireless station and use time thereof.

Further, the communication control device 40 may switch the protection method on the basis of the use time of the primary wireless station. FIG. 26 is a diagram illustrating an example of a relationship between a method of protecting a primary wireless station and use time thereof and a method of protecting another wireless station and use time thereof. As illustrated in FIG. 26, in a case where the use time of the primary wireless station 1 is not completely included in the use time of the primary wireless station 2, the communication control device 40 may perform both point protection and area protection for the primary wireless station 1. For example, the communication control device 40 may perform area protection during a period while the primary wireless station 1 is used and the primary wireless station 2 is used and may switch the area protection to the point protection in a case where the primary wireless station 1 is still used after use of the primary wireless station 2 ends. Of course, the opposite operation is also permitted. In this event, the control unit 44 of the communication control device 40 functions as a processing unit that switches the point protection of the first wireless station to the area protection using the use area of the second wireless station while the use time of the first wireless station (for example, the primary wireless station 1) overlaps with the use time of the second wireless station (for example, the primary wireless station 2).

Figure 27:
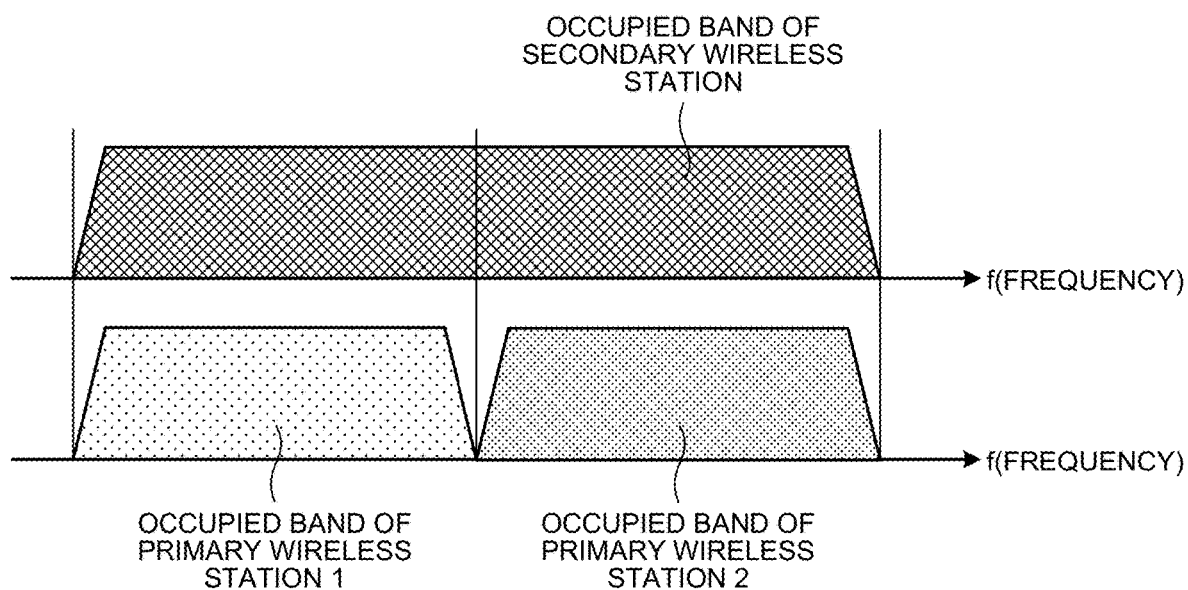
FIG. 27 is a diagram illustrating an example of an occupied band of a primary wireless station and an occupied band of another wireless station.

Further, even in a case where occupied bands of the primary wireless station 1 and the primary wireless station 2 do not match, area protection using the use area of the primary wireless station 2 may be performed. FIG. 27 is a diagram illustrating an example of an occupied band of a primary wireless station and an occupied band of another wireless station. As illustrated in FIG. 27, in a case where the primary wireless station 1 and the primary wireless station 2 use adjacent frequency channels and the secondary wireless station secondarily uses combination of the two channels, the communication control device 40 may replace the point protection of the primary wireless station 1 with the area protection of the primary wireless station 2. In this event, the control unit 44 of the communication control device 40 functions as a processing unit that switches the point protection of the first wireless station to the area protection of the second wireless station in a case where the first wireless station (for example, the primary wireless station 1) and the second wireless station (for example, the primary wireless station 2) use different frequency channels and there is a secondary wireless station that uses the frequency channel that partially overlaps with the two frequency channels.

Figure 28:
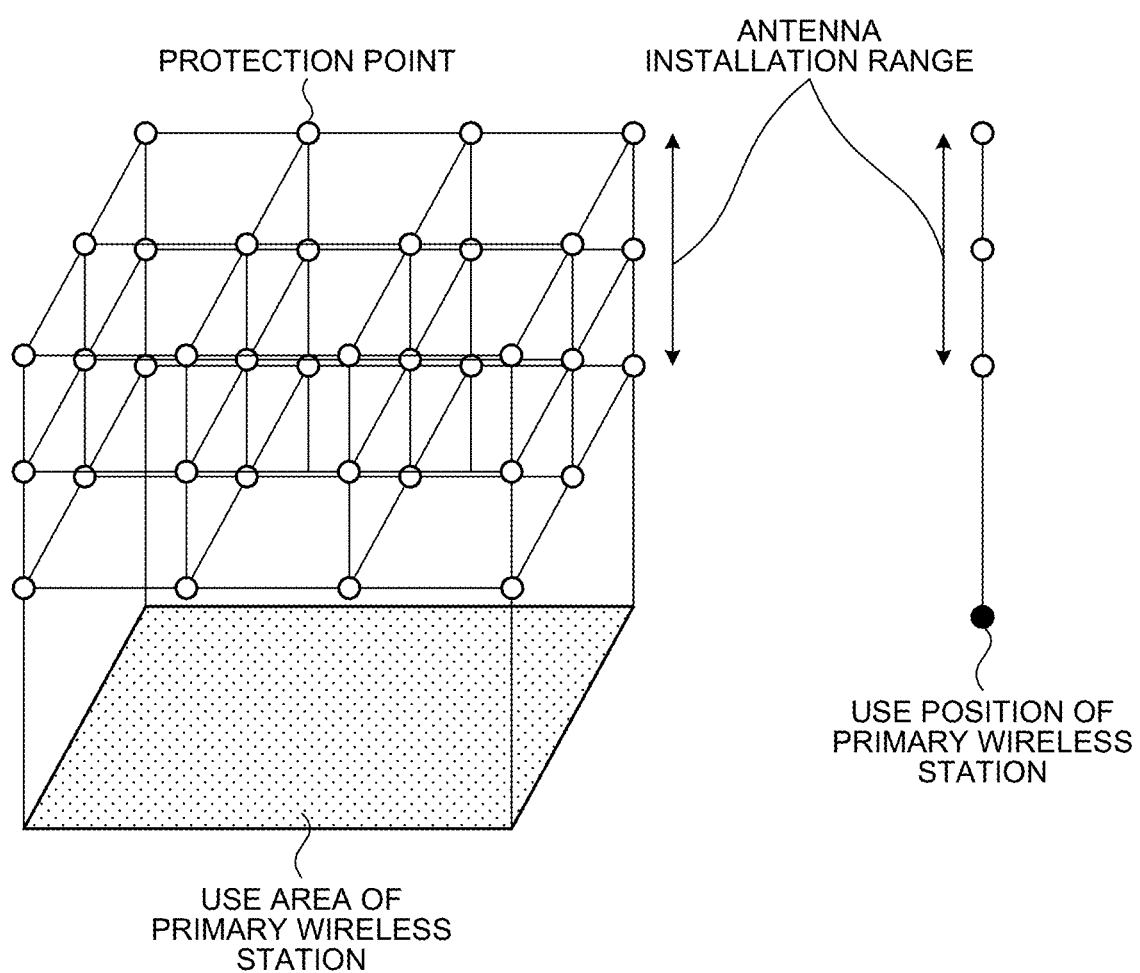
FIG. 28 is a diagram illustrating an example of an antenna installation range.

Further, the use position information may include the installation position of the antenna. In other words, the use position information may include a position in a height direction. In a case where it is known that the primary wireless station moves or the installation position of the antenna is adjusted at the time of installation, this antenna installation position may be given as a range instead of a fixed value. FIG. 28 is a diagram illustrating an example of an antenna installation range. In a case where the installation position of the antenna is given as a range, that is, the use position information in the height direction is given as a range, the communication control device 40 may set protection points at regular intervals in the altitude direction as well as in the horizontal direction and may perform interference calculation for primary protection for each protection point, as illustrated in FIG. 28. In this event, in a case where the use position information is provided in a range in the horizontal direction and in the height direction, the control unit 44 of the communication control device 40 functions as a processing unit that performs interference calculation for primary protection for each protection point set in the horizontal direction and in the height direction. Such primary protection may also be included in the area protection. On the other hand, primary protection in a case where the use position information is given with a fixed value in both the horizontal direction and the altitude direction is point protection. Also in this case, the point protection and the area protection may be switched according to the criterion as described above.

While the static point/area protection has been described above, these methods are also applicable to the dynamic point/area protection.

6-3-4. Supplement Regarding Point Protection and Area Protection for Planned Use In a case where the use position information is not included in the use schedule or in a case where the communication control device itself desires to newly set a point or an area to be protected, the communication control device 40 may predict the point or the area to be protected using the use position information or the use antenna information of other wireless stations to be communicated and may select and implement the primary system protection method. In this event, in a case where the protection target point and the protection target area are not included in the use schedule of the wireless station and in a case the protection target point and the protection target area are newly set, the control unit 44 of the communication control device 40 functions as a processing unit that predicts the protection target point and the protection target area.

The case where the point or the area is not included in the use position information may include a case where the operator of the primary system cannot provide the use position information because the operator of the primary system does not desire to provide the use position of the wireless station in advance or the use position is not known until immediately before as in unplanned use, or the like.

For example, an area within a certain distance from a point where a wireless station which is a communication target of a certain wireless station A is arranged may be set as the protection target area of the wireless station A. In this event, the control unit 44 of the communication control device 40 functions as a processing unit that predicts the protection target point and the protection target area on the basis of the use position information of the second wireless station different from the first wireless station that is a wireless station of the primary system.

Figure 29:
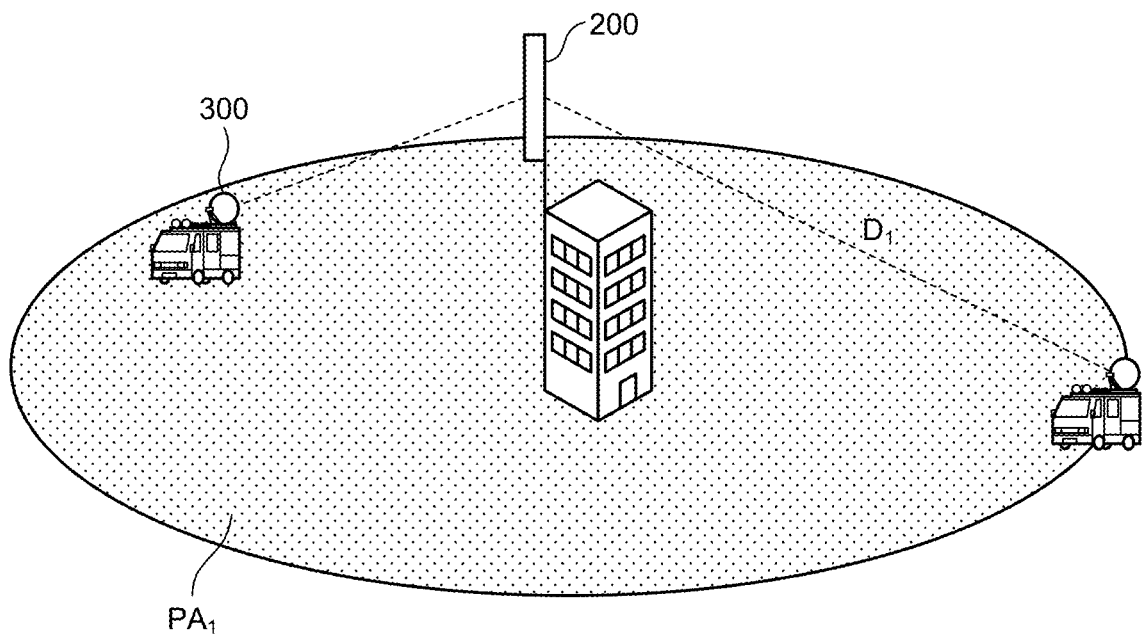
FIG. 29 is a diagram illustrating an example of a protection target area of a mobile station.

Further, for example, as illustrated in FIG. 29, an area satisfying a required value of a carrier to interference and noise ratio (CINR) when a fixed station 200 receives a signal from a mobile station 300 at an arbitrary point is calculated using the position information of the fixed station 200, and the area satisfying the required value may be set as a protection target area $PA_1$ of the mobile station 300. For example, an area satisfying a maximum distance D1 satisfying the required CINR may be set as the protection target area. Specifically, as an example, a range of coordinates (x, y) satisfying the following expression (1) is set as the protection target area. In the example illustrated in FIG. 29, the control unit 44 of the communication control device 40 functions as a processing unit that calculates communication quality (for example, the CINR) when the signal of the first wireless station (for example, the fixed station 200) is received by the second wireless station on the basis of the use position information of the second wireless station (for example, the mobile station 300) and predicts the protection target point and the protection target area on the basis of the calculated communication quality. Note that FIG. 29 is a diagram illustrating an example of the protection target area of the mobile station.

$$P_{Tx(dBm)} - L(x,y)_{(dB)} - I_{mean(dBm)} > I_{Th(dB)} \quad (1)$$

Further, the protection target area may be a range in which reception power from a certain mobile station satisfies a predetermined value at the fixed station. Specifically, as an example, a range of coordinates (x, y) satisfying the following expression (2) is set as the protection target area.

$$P_{Tx(dBm)} - L(x,y)_{(dB)} > P_{Rx,Th(dB)} \quad (2)$$

Further, a range in which a signal from the fixed station satisfies a desired CINR or reception power may be set as the protection target area of the mobile station.

The coordinates (x, y) in this event does not have to be a continuous range and may be a set of the protection points. Further, the coordinates may be three-dimensional coordinates in consideration of the antenna height.

Figure 30:
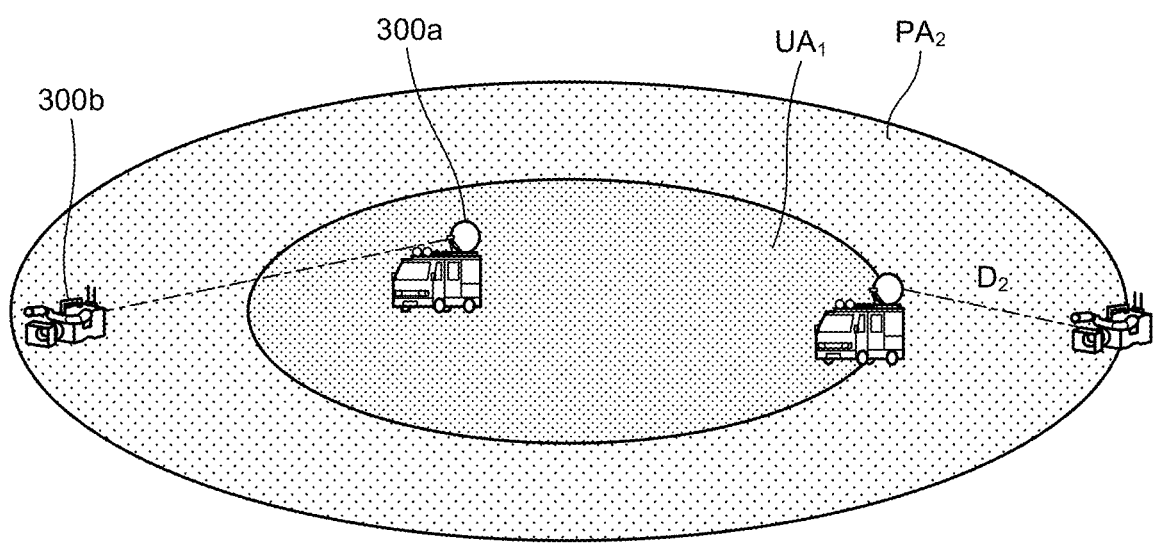
FIG. 30 is a diagram illustrating an example of a protection target area of a mobile station.

Still further, the protection target area may be predicted using an area where the mobile station used in this event is used as the position information. For example, the entire position of the mobile station 300b where a signal from the mobile station 300b always satisfies required communication quality at the mobile station 300a moving in a certain use area (for example, a use area UA$_1$) may be set as the protection target area of the mobile station 300b. As illustrated in FIG. 30, a maximum distance D2 that satisfies the required CINR and the required reception power may be set as the protection target. As illustrated in FIG. 30, a range in which a signal from a mobile station 300a moving in a certain use area (for example, the use area UA$_1$) necessarily satisfies the required communication quality at a mobile station 300b may be set as a protection target area PA$_2$ of the mobile station 300b. In the example illustrated in FIG. 30, the control unit 44 of the communication control device 40 functions as a processing unit that calculates communication quality (for example, the CINR or reception power) when the signal of the first wireless station (for example, the mobile station 300a) is received by the second wireless station on the basis of the use position information of the second wireless station (for example, the mobile station 300b) and predicts the protection target point and the protection target area on the basis of the calculated communication quality. Note that FIG. 30 is a diagram illustrating an example of a protection target area of a mobile station.

Figure 31:
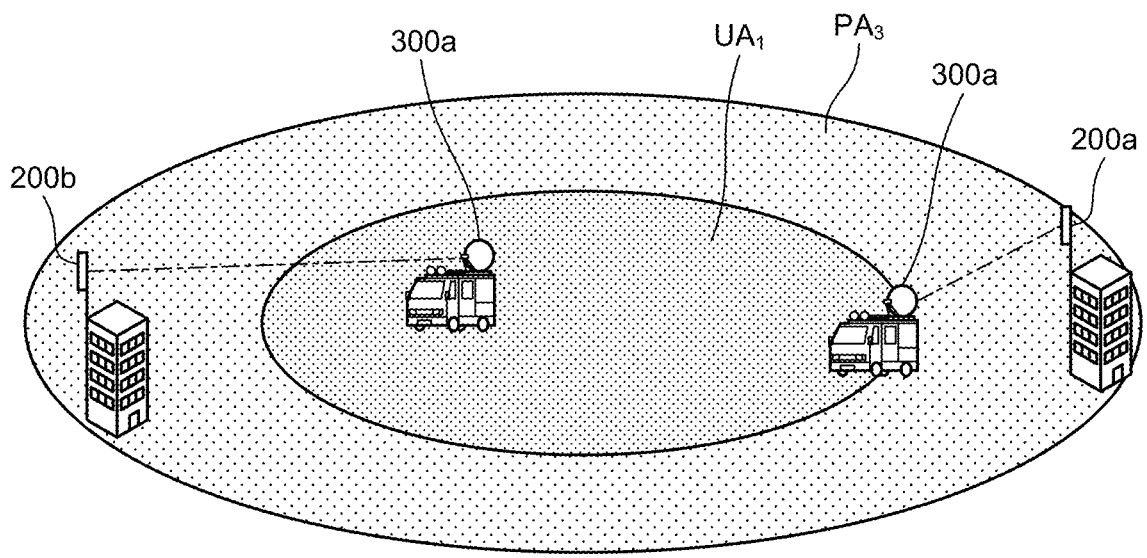
FIG. 31 is a diagram illustrating an example of a protection target area of a fixed station.

In a case where the area where the mobile station 300a is to be used can be specified but the position of the fixed station (200a or 200b) is unknown, a protection target area PA$_3$ of the fixed station (200a or 200b) may be predicted from the area where the mobile station 300a is to be used (for example, the use area UA$_1$) as illustrated in FIG. 31. For example, a range in which a signal from the mobile station 300a satisfies a desired CINR or reception power may be set as the protection target area of the fixed station (200a or 200b). Note that FIG. 31 is a diagram illustrating an example of a protection target area of a fixed station.

Note that a certain margin may be provided to these protection target areas (see FIG. 29 to FIG. 31).

Further, the protection target area may be predicted according to a reference of creation of the PPA as described in Non Patent Literature 6.

Figure 32:
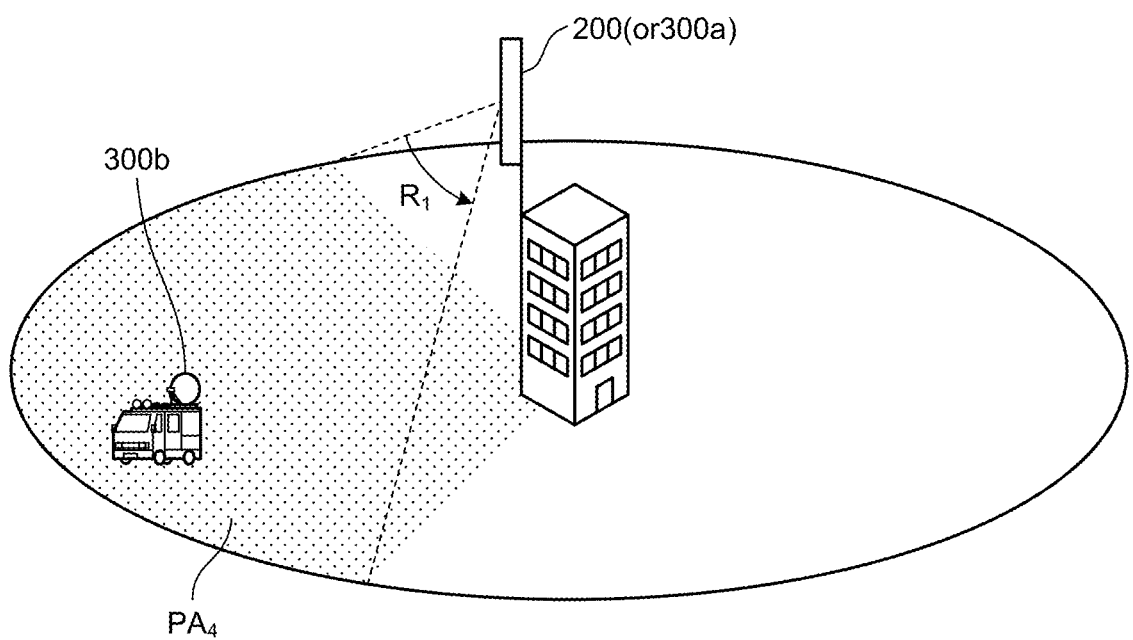
FIG. 32 is a diagram illustrating an example of a protection target area of a mobile station.

Further, in a case where the information on a range R$_1$ in which the antenna of the fixed station 200 or the mobile station 300a rotates is given, a protection target area PA$_4$ of the mobile station 300b may be limited as illustrated in FIG. 32. In this event, the antenna rotation range may have three dimensions considering not only the azimuth and the boresight but also the antenna installation height and the down tilt. In addition, an antenna rotation range provided with a certain margin may be set as the protection target area. In the example illustrated in FIG. 32, the control unit 44 of the communication control device 40 functions as a processing unit that predicts a protection target point and a protection target area of the primary system (for example, the mobile station 300b) on the basis of antenna information of the antenna to be used at the second wireless station (for example, the fixed station 200 or the mobile station 300a). Note that FIG. 32 is a diagram illustrating an example of a protection target area of a mobile station.

Further, the protection target point/area of the primary wireless station may be estimated using information on wireless stations of different wireless systems.

For example, a range within a certain distance from the use position of the fixed station of a certain wireless system EX1 may be set as a movement range of the mobile station of the system EX1, and this movement range may be set as a protection target area of the mobile station of a wireless system EX2 provided side by side with the mobile station of the system EX1. In this event, the control unit 44 of the communication control device 40 functions as a processing unit that predicts the protection target point and the protection target area of the primary system (for example, the mobile station of the wireless system EX2) on the basis of the use position information of the third wireless station (for example, the fixed station of the wireless system EX1) of the wireless system different from the primary system.

Figure 33:
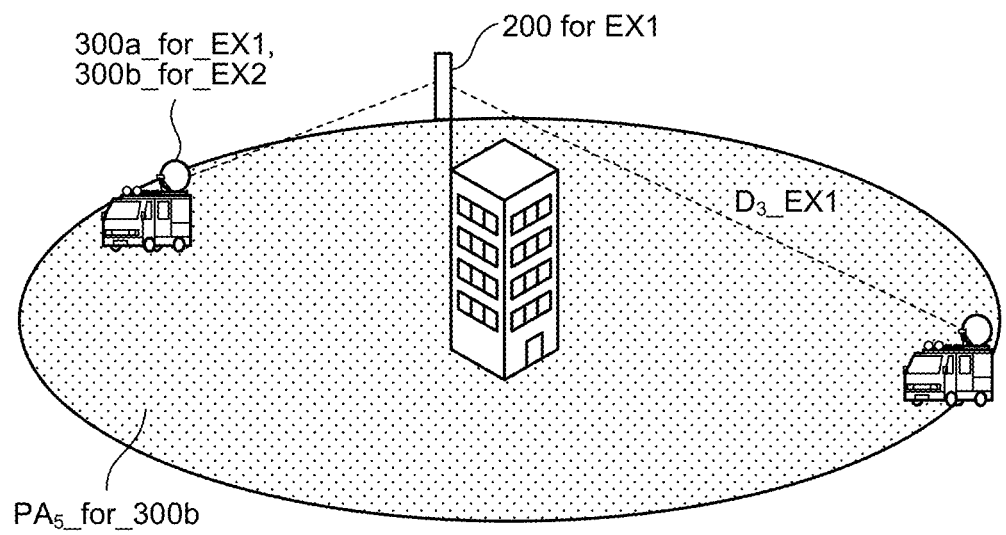
FIG. 33 is a diagram illustrating an example of predicted protection target point and protection target area.

For example, the movement range of a mobile station 300a_for_EX1 of a system EX1 may be predicted by calculating the required CINR at the fixed station 200 of the wireless system EX1 as illustrated in FIG. 33, and the movement range may be set as a protection target area PA$_5$_for_300b of a mobile station 300b_for_EX2 of a wireless system EX2 provided side by side with the mobile station 300a_for_EX1 of the system EX1. Note that FIG. 33 is a diagram illustrating an example of the protection target area of the mobile station. In the example illustrated in FIG. 33, the control unit 44 of the communication control device 40 functions as a processing unit that calculates the communication quality when the signal of the third wireless station (for example, the mobile station 300a) is received by the first wireless station (for example, the fixed station 200) that is the wireless station of the primary system on the basis of the use position information of the third wireless station, predicts the use position information of the third wireless station on the basis of the calculated communication quality and uses the predicted position information as the protection target point or the protection target area of the wireless station (for example, the mobile station 300b of the wireless system EX2) of the primary system. Note that FIG. 33 is a diagram illustrating an example of a predicted protection target point and protection target area.

For example, the wireless system EX1 may be a TSL to be used for video transmission from the FPU receiving station to a studio of a broadcasting station or a microwave FPU using a 5.7 GHz band, and the wireless system EX2 may be a 2.3 GHz FPU receiving station.

Further, the use position of the wireless station that is the communication target may be predicted using the antenna information at the time of using the wireless station of another wireless system, and the use position may be set as the protection target point/area of the primary wireless station. In this event, the control unit 44 of the communication control device 40 functions as a processing unit that predicts the use position information of the wireless station of the primary system on the basis of the antenna information of the antenna to be used at the third wireless station.

Further, the point to be used/area, and the antenna information during use of the primary wireless station may be predicted using the position information and the antenna information at the time of use of another system, and the protection target point/area of the primary wireless station that is the communication target may be estimated through the prediction.

Figure 34:
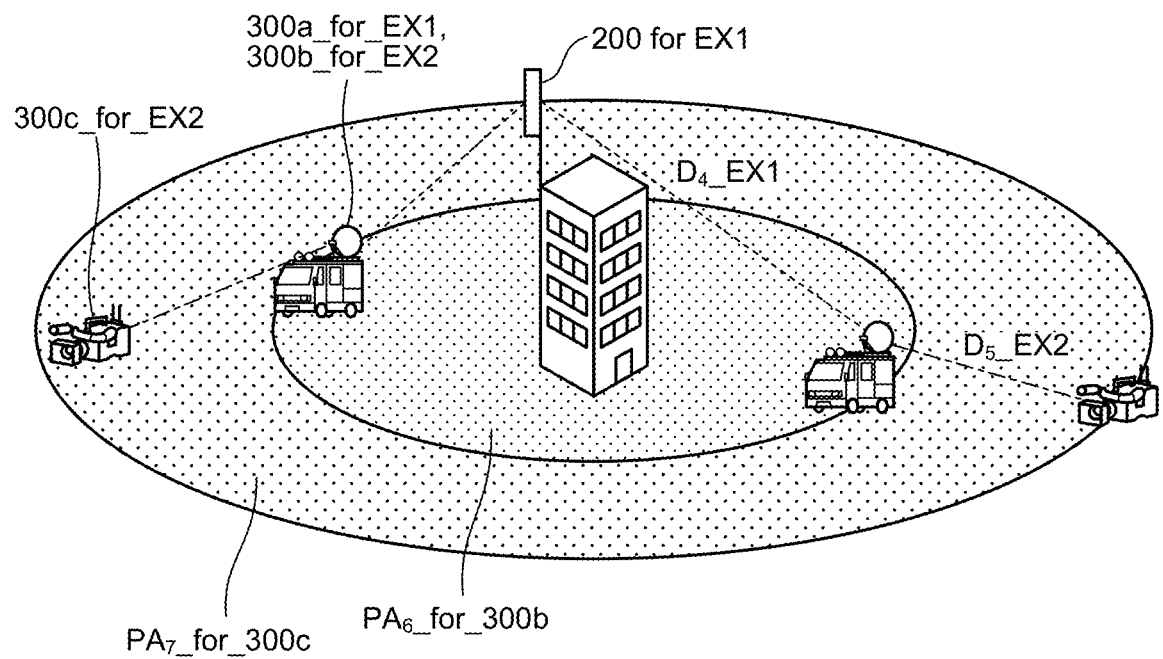
FIG. 34 is a diagram illustrating an example of predicted protection target point and protection target area.

Further, for example, the movement range of the mobile station 300a of the wireless system EX1 may be predicted by calculating the required CINR at the fixed station 200 of the wireless system EX1 as illustrated in FIG. 34, this may be set as the protection target area $PA_6\_for\_300b$ of the mobile station 300b of the wireless system EX2, and the protection target point/area $PA_7\_for\_300c$ of the mobile station 300c of the wireless system EX2 may be predicted by calculating the required CINR at the mobile station 300b of the wireless system EX2. In the example illustrated in FIG. 34, the control unit 44 of the communication control device 40 functions as a processing unit that calculates the communication quality in which the signal of the fifth wireless station (mobile station 300c) that is the wireless station of the primary system is received by the fourth wireless station using the use position information of the third wireless station (for example, the mobile station 300a) as the use position information of the fourth wireless station (mobile station 300b) that is the wireless station of the primary system and predicts the protection target point and the protection target area of the fifth wireless station on the basis of the calculated communication quality. Note that FIG. 34 is a diagram illustrating an example of a predicted protection target point and protection target area.

Further, this prediction method may be used in combination even in a case where a point or an area is already included in the use position information. For example, for the purpose of increasing communication opportunities of a secondary system, a more accurate protection target point/area may be used when the communication control device 40 performs prediction.

6-3-5. Supplement Regarding Point Protection/Area Protection for Unplanned Use In the FPU receiving station of Model 1 of the FPU, a point that may be used can be included in the use position information, and thus, the dynamic point protection is performed on this point. Further, at the FPU transmitting station of Model 1, the transmitting/receiving station of Model 5, and the like, information on an area that is likely to be used such as the DPA can be given, and thus, dynamic area protection can be implemented on this area.

Further, the communication control device 40 may independently generate the DPA by dividing the protection target area into a plurality of areas in accordance with a certain criterion for the purpose of increasing opportunities of using the secondary system, reliably protecting the primary system, and the like.

A case where the communication control device 40 independently generates the DPA does not have to be limited to only a case where the DPA is not given by the use schedule information, or the like. For example, the case corresponds to a case where the use position information is predicted by a method similar to the above-described <6-3-4.>. Further, even in a case where the use schedule information includes the DPA itself, the communication control device 40 may independently make a determination to newly create a DPA in order to increase opportunities of using the secondary system and reliably protect the primary system.

Parameters required for the communication control device to generate the DPA such as an area division size can be set in advance by an administrative agency, a third party organization, or the like, in addition to an operator of the primary system, a public service agency, or the like, and can be acquired from the use schedule information in an external database, the primary system, or the like.

Further, regardless of whether or not these parameters are provided, the communication control device 40 may independently set the parameters such as the area division size by using information such as hardware performance and arrangement statuses of respective communication devices of the primary system and the secondary system and a sensor, or the like, that detects use of the primary system, the surrounding environment, and the requirement criteria for protection.

For example, for the purpose of more reliably protecting the primary system, parameters such as the area division size necessary for the communication control device 40 to generate a DPA may be determined in accordance with detection accuracy of use of the primary system. In this event, the control unit 44 of the communication control device 40 functions as a processing unit that determines a DPA obtained by dividing the protection target area into a plurality of areas by using parameters set on the basis of the detection accuracy of use of the wireless station.

For example, the division size of the DPA may be determined on the basis of the position information accuracy of the sensor or the primary wireless station. For example, in a case where accuracy of a positioning function of the GPS, or the like, mounted on the primary wireless station is not sufficient, the DPA may be set so as to be reliably protected even if the position of the sensor or the primary wireless station is shifted by increasing the division size of the DPA or providing a margin by allowing overlap of the DPAs. In this event, the control unit 44 of the communication control device 40 functions as a processing unit that determines a DPA obtained by dividing the protection target area into a plurality of areas using parameters set on the basis of detection accuracy of the primary system and position information accuracy of the primary system.

Further, for example, the division size of the DPA may be determined by reflecting variation in the detection accuracy of the primary system due to topography and a surrounding environment such as a building. In this event, the control unit 44 of the communication control device 40 functions as a processing unit that determines a DPA obtained by dividing the protection target area into a plurality of areas using parameters set on the basis of variation in position information accuracy due to the surrounding environment.

Further, for example, DPAs of different sizes may be set in different areas on the basis of an arrangement status of a sensor (an example of a detection unit) for detecting use of the primary system. In the area where the sensors are densely arranged, DPAs having a small size may be set, and in a case where the sensors are sparsely arranged, DPAs having a large size may be set. In this event, the control unit 44 of the communication control device 40 functions as a processing unit that determines a DPA obtained by dividing the protection target area into a plurality of areas using parameters set on the basis of arrangement information of the detection unit that detects the primary system.

Further, for example, in a case where it can be ensured that use detection accuracy of the primary system is high, such as a case where the primary wireless station has a high-precision positioning function and the position information is included in the use notification of the primary system, a lattice including only one protection point may be set as one DPA.

For example, the division size of the DPA may be set as small as possible within a range that satisfies the protection criterion for the purpose of reducing secondary wireless stations that are required to stop radio waves or change parameters as a result of detection of use of the primary system and for the purpose of increasing opportunities of using the secondary system.

Further, two or more DPAs having different sizes may be set in the same area, and a DPA most suitable for detecting use of the primary system may be selected to control the secondary system. For example, in a case where it is simultaneously notified that the accuracy of the position information of the primary system is not sufficient, a DPA having a size as large as possible is selected from the plurality of DPAs so that the primary system can be sufficiently protected even with the obtained accuracy. In this event, the control unit 44 of the communication control device 40 functions as a processing unit that determines DPAs of different sizes in the same area.

Further, the division size of the DPA may be determined on the basis of the information on the secondary wireless station. For example, in a case where the accuracy of the positioning function of the GPS, or the like, mounted on the secondary wireless station is not sufficient, the DPA may be set so as to be reliably protected even if the position of the secondary wireless station is shifted by increasing the division size of the DPA or providing a margin by allowing overlap between the DPAs. The accuracy may be determined not only by hardware performance such as a sensor and a positioning function but also by topography and a surrounding environment such as a building. In this event, the control unit 44 of the communication control device 40 functions as a processing unit that determines a DPA obtained by dividing a protection target area into a plurality of areas by using parameters set on the basis of accuracy of a positioning function of a wireless station of a wireless system different from the primary system.

Figure 35:
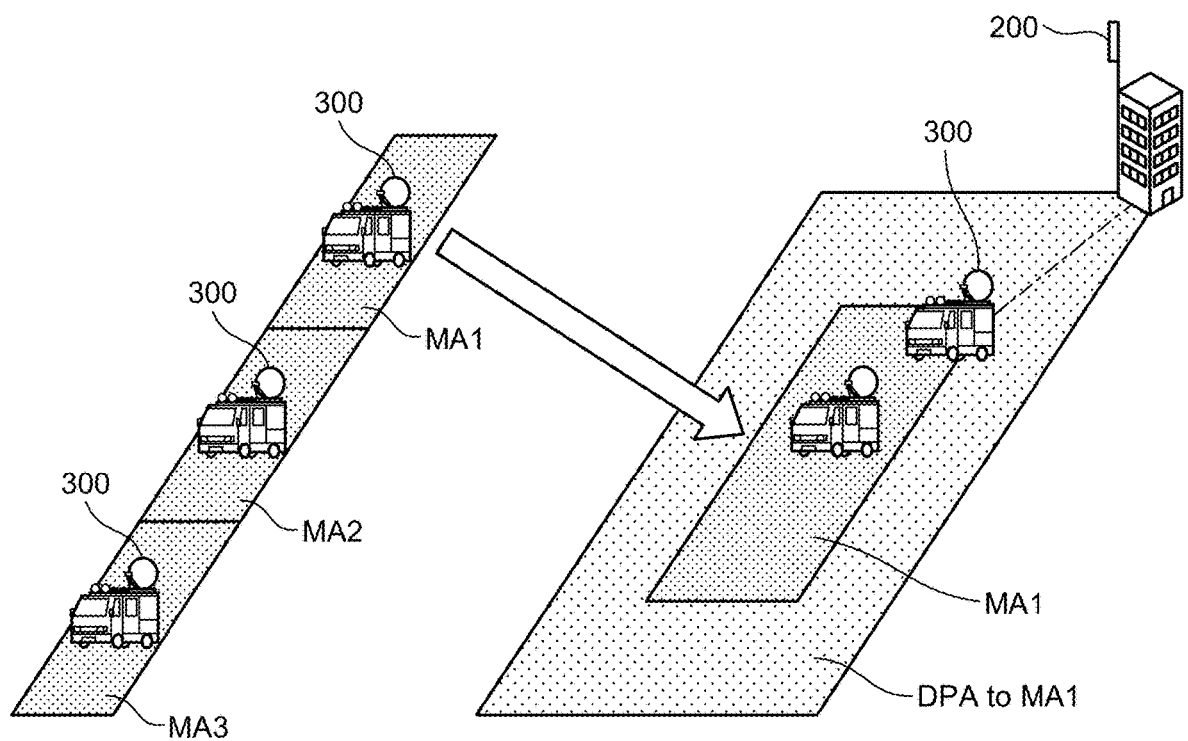
FIG. 35 is a diagram illustrating an example of dynamic protection target areas for each of regions obtained by dividing an entire movement area.

Further, as illustrated in FIG. 35, the entire movement area of the mobile station 300 may be divided into a plurality of regions (for example, regions $MA_1$ to $MA_3$), a range in which a signal from the mobile station 300 to the fixed station 200 satisfies a required value may be calculated in each of the movement areas, and these ranges may be used as the DPA corresponding to the fixed station. In other words, the DPAs for the respective movement areas can overlap. In division of the movement area, the size and the like may be changed in accordance with the position of the mobile station 300 and the detection accuracy of the signal.

In the example illustrated in FIG. 35, the control unit 44 of the communication control device 40 functions as a processing unit that divides the entire movement area of the wireless station (for example, the mobile station 300) into a plurality of regions and determines, as a DPA, a protection target area set for the wireless station (for example, the fixed station 200) that is the communication target in each of the divided regions. Note that FIG. 35 is a diagram illustrating an example of dynamic protection target areas for each of regions obtained by dividing an entire movement area.

6-4. Point/Area Protection in Consideration of Antenna Rotation Range

In the point/area protection of the CBRS, a case is assumed where parameters (such as the down tilt, the elevation and the azimuth) related to the antenna rotation range of the wireless station that is the protection target are given as values as in an earth station of a fixed-satellite service or a case is assumed where there is no problem even if the antenna is directed in any direction as in the federal incumbent.

On the other hand, at the primary system such as the FPU, a case is assumed where parameters such as the down tilt, the elevation and the azimuth of the antenna change every time the wireless station is used, or a case is assumed where the antenna rotates during use, and the parameters such as the down tilt, the elevation and the azimuth fluctuate.

In the embodiment of the present disclosure, dynamic point/area protection is performed by using point/area protection assuming change of parameters such as the down tilt, the elevation and the azimuth as a result of rotation of the antenna of the wireless station during planned use and parameters such as an antenna direction notified upon unplanned use of the primary wireless station.

6-4-1. Point/Area Protection Considering Antenna Rotation During Planned Use

A plurality of protection target antenna directions is set within the rotation range of the antenna that is being used, to be acquired from the antenna information during use, in accordance with the designated criterion. Then, by performing point protection or area protection when it is assumed that the antennas of the primary wireless station face the respective protection target antenna directions and instructing the secondary wireless station to achieve primary system protection in all the protection target antenna directions, it is possible to reliably protect the primary system even for rotation while the antennas are used.

Figure 36:
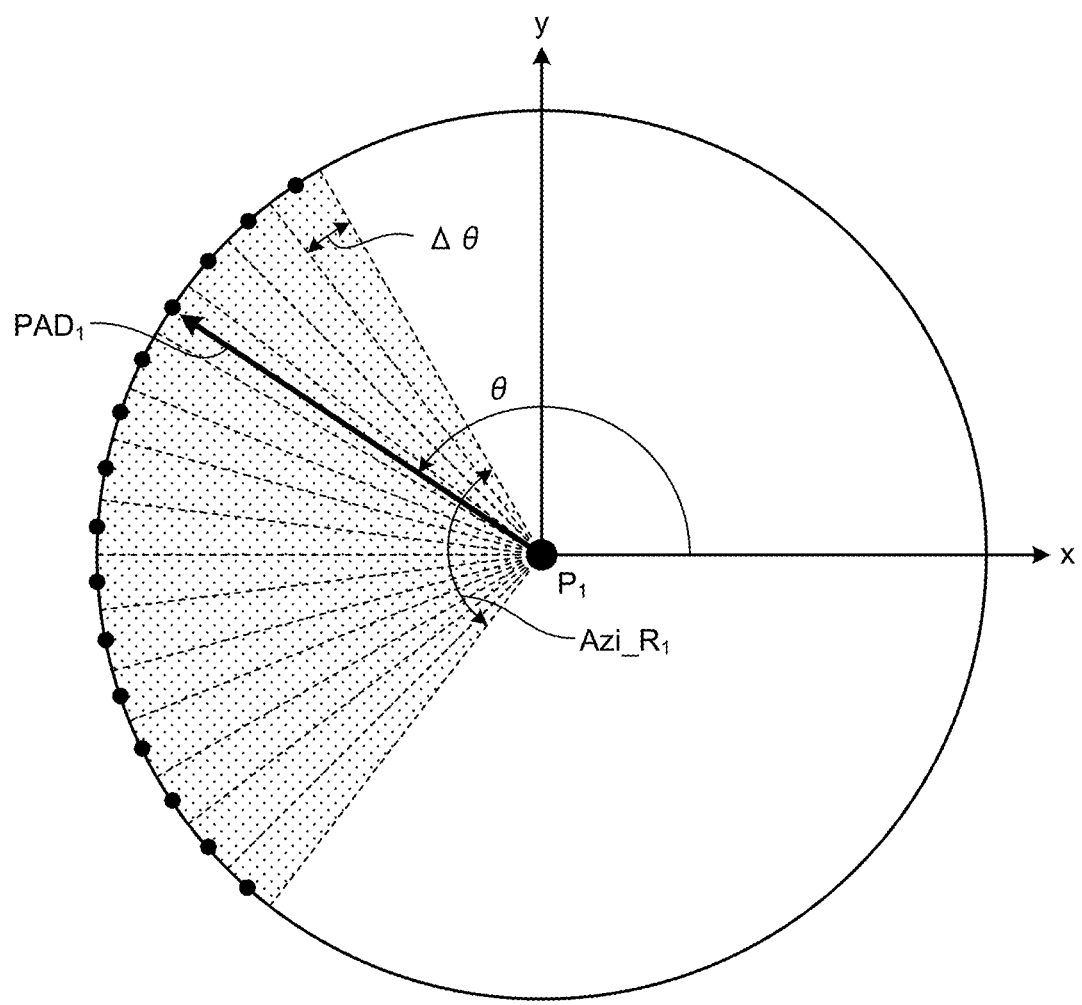
FIG. 36 is a diagram illustrating a setting example of a two-dimensional protection target antenna direction.

For example, in a case where a range $Azi\_R_1$ of the azimuth in which the antenna rotates during use is given as the antenna information during use as illustrated in FIG. 36, the circumference on the horizontal plane centered on a position $P_1$ of the antenna is divided for each constant angle $\Delta\theta$ in the range of the azimuth. Then, the direction from the center of the circle, that is, the antenna position $P_1$ to the center of each range of the divided circumference is set as the protection target antenna direction $PAD_1$. The point protection or the area protection is performed in each set protection target antenna direction. In the example illustrated in FIG. 36, the control unit 44 of the communication control device 40 functions as a processing unit that determines the protection target point or the protection target area by setting the protection target antenna direction at regular intervals within the rotation range of the antenna that is being used at the wireless station. Further, the control unit 44 functions as a processing unit that sets a two-dimensional protection target antenna direction by dividing the range of the azimuth in which the antenna rotates during use by a certain angle. Note that FIG. 36 is a diagram illustrating a setting example of a two-dimensional protection target antenna direction.

Figure 37:
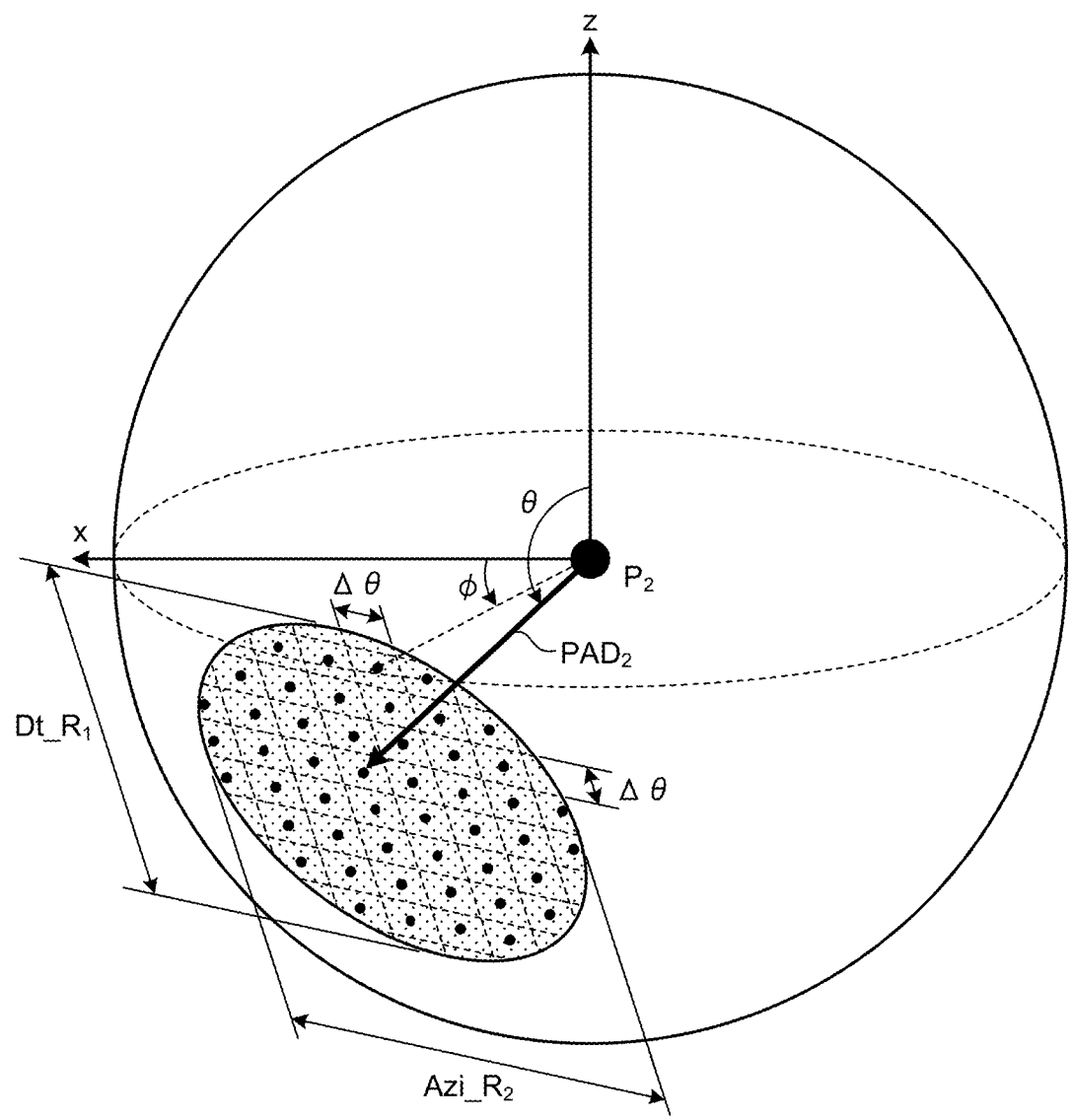
FIG. 37 is a diagram illustrating a setting example of a three-dimensional protection target antenna direction.

Further, when the antenna information during use is given as the range $Dt\_R_1$ and $Azi\_R_2$ of the down tilt and the azimuth, as illustrated in FIG. 37, the range of the given down tilt and azimuth of a spherical surface centered on a position $P_2$ of the antenna is divided for each constant angle $\Delta\phi$ and $\Delta\theta$ to create a three-dimensional lattice. Then, the direction from the center of the sphere, that is, the position $P_2$ of the antenna to the center of each lattice is set as the protection target antenna direction $PAD_2$. In the example illustrated in FIG. 37, the control unit 44 of the communication control device 40 functions as a processing unit that sets a three-dimensional protection target antenna direction by dividing the range of the azimuth in which the antenna rotates during use and the range of the down tilt at a certain angle. Note that FIG. 37 is a diagram illustrating a setting example of a three-dimensional protection target antenna direction.

As an example where the antenna information during use is given in a range of a value, a case where Model 2 to Model 6 of the FPU are used as planned use is assumed.

Further, a range of the antenna parameter such as the down tilt, the azimuth and the boresight during use may be predicted using the protection target point and area of the wireless station that becomes the communication partner, the antenna information during use, and the like, and the protection target antenna direction may be set in the range. In this event, the control unit 44 of the communication control device 40 functions as a processing unit that predicts the rotation range of the antenna that is being used by using the protection target area or the protection target point of the wireless station that becomes the communication partner.

Figure 38:
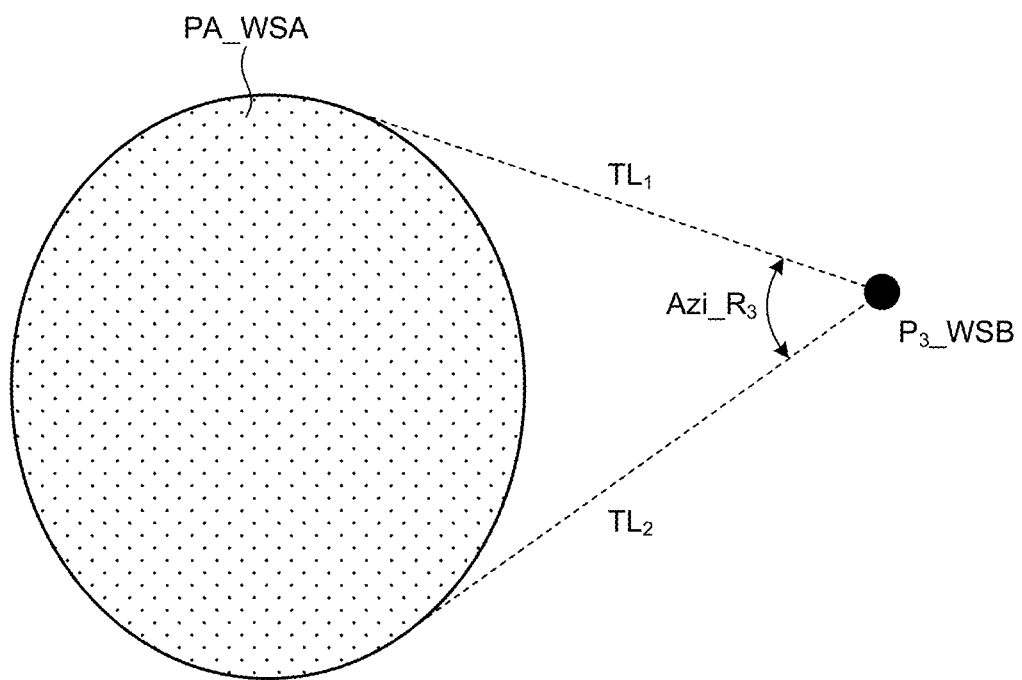
FIG. 38 is a diagram illustrating a setting example of a two-dimensional protection target antenna direction.

For example, as illustrated in FIG. 38, two tangents are drawn from the antenna position P3_WSB of the wireless station B with respect to the protection target area PA_WSA of the wireless station A expressed in a two dimensional manner, and an angle at which the two straight lines intersect at the position of the wireless station B is set as the range $Azi\_R_3$ of the azimuth during use. The protection target antenna direction as described above may be set in the range $Azi\_R_3$ of the azimuth. In the example illustrated in FIG. 38, the control unit 44 of the communication control device 40 functions as a processing unit that sets an angle formed by two tangents drawn from the wireless station to the protection target area of the wireless station that becomes the communication partner as a range of the azimuth in which the antenna that is being used rotates. Note that FIG. 38 is a diagram illustrating a setting example of a two-dimensional protection target antenna direction.

Figure 39:
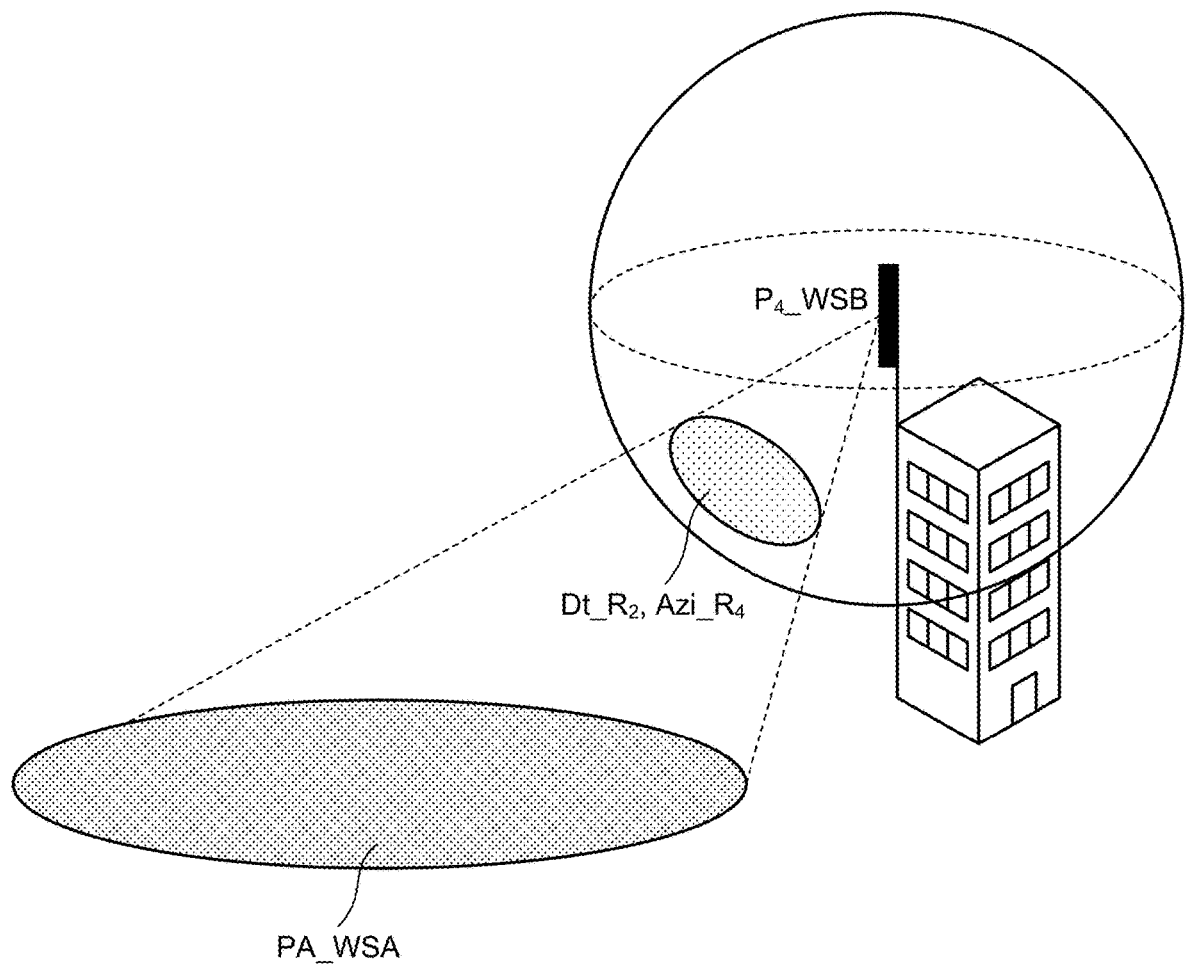
FIG. 39 is a diagram illustrating a setting example of a three-dimensional protection target antenna direction.

Further, the ranges of the down tilt and the azimuth that can be taken by the antenna during use may be estimated in three dimensions. For example, the ranges of the down tilt and the azimuth that can be taken by the antenna may be estimated from the protection target area of the communication target. As illustrated in FIG. 39, the protection target area PA_WSA of the wireless station A is projected onto a sphere centered on the antenna position P4_WSB of the wireless station B. The protection target antenna direction may be set by setting the projected area on the spherical surface as ranges $Dt\_R_2$ and $Azi\_R_4$ of the down tilt and the azimuth that can be taken by the antenna of the wireless station B during use. In the example illustrated in FIG. 39, the control unit 44 of the communication control device 40 functions as a processing unit that projects a protection target area of a wireless station that becomes the communication partner onto a sphere centered on the wireless station of the primary system and sets a projected area on the spherical surface as ranges of the azimuth and the down tilt that can be taken by the antenna during use. Note that FIG. 39 is a diagram illustrating a setting example of a three-dimensional protection target antenna direction.

Further, prediction of the protection target antenna direction may be performed in combination even in a case where the antenna information during use is provided. For example, in a case where a wireless station that is used in a complicated region is the communication partner, and the like, by predicting a more accurate value than a range of antenna parameter provided in advance, it is possible to protect the primary system with higher accuracy and increase communication opportunities of the secondary system.

Further, each parameter of the antenna does not necessarily have to be independent. For example, the range of the value of the azimuth may be given by a function using the value of the down tilt as an argument.

Further, the protection target of the wireless station may be an area instead of a point, in which case, the primary system protection is performed after the protection target antenna direction is set for each protection point set in the protection target area.

Figure 40:
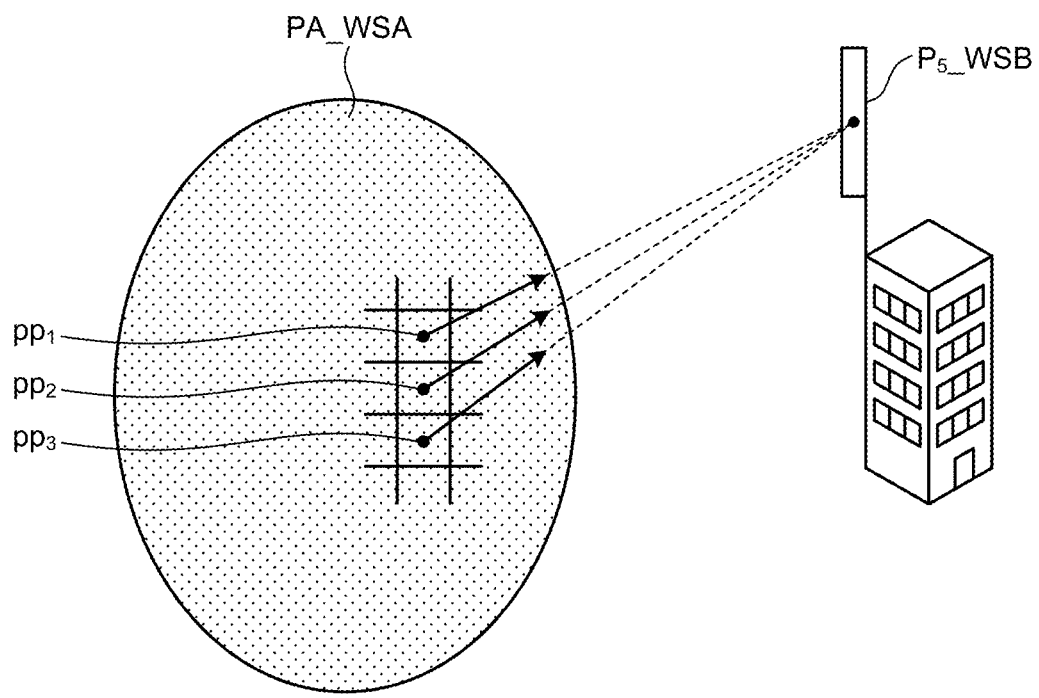
FIG. 40 is a diagram illustrating a setting example of a protection target antenna direction different for each protection point.

It is not necessary that all the protection points in the same protection target area have the same protection target antenna information, and different protection target antenna directions may be set for each protection point. For example, as illustrated in FIG. 40, at protection points ($pp_1$ to $pp_3$) in the protection target area PA_WSA of the wireless station A, protection target antenna directions may be set in directions in which the wireless station B exists (for example, the directions of straight lines connecting the protection points and the antenna position P5_WSA). Further, the protection target antenna direction can have a parameter other than the azimuth. The wireless station B does not necessarily have to be a fixed station. Note that FIG. 40 is a diagram illustrating a setting example of a protection target antenna direction different for each protection point.

The angle at the time of setting the protection target antenna direction may be determined in advance by a law, or the like, in accordance with the required accuracy of primary system protection, or the like, or may be provided by an operator of the primary system, a public service organization, or the like, an administrative agency, a third party organization, or the like.

Further, the angle at the time of setting the protection target antenna direction may be changed depending on calculation capability of the communication control device 40. For example, in a case where the calculation capability of the communication control device 40 is high, the protection target antenna direction may be set at an angle smaller than an angle set in advance. In this event, the control unit 44 of the communication control device 40 functions as a processing unit that changes an interval at the time of setting the protection target antenna direction in accordance with the calculation capability of the own device.

6-4-2. Dynamic Point/Area Protection Considering Antenna Direction Notified During Unplanned Use The communication control device 40 instantaneously protects the antenna direction notified at the time of unplanned use by performing the dynamic point/area protection using a dynamic antenna rotation range (hereinafter, the dynamic antenna rotation range is expressed as a "DARR" as appropriate) obtained by dividing the antenna rotation range that may be used by the antenna of the wireless station to be protected on the basis of a certain criterion. In this event, the control unit 44 of the communication control device 40 functions as a processing unit that selects dynamic point protection or dynamic area protection using the DARR obtained by dividing the rotation range of the antenna that can be taken by the antenna of the wireless station on the basis of a certain criterion.

For each DARR, a list of secondary wireless stations that are required to stop radio waves or change parameters when unplanned use is detected is created, and when use is actually detected, the communication control device 40 instructs the secondary wireless station in accordance with the instruction list corresponding to the DARR including the notified antenna direction.

Further, when the list of secondary wireless stations is created, the communication control device 40 may set a plurality of protection target antenna directions in the DARR and then perform dynamic point/area protection in a similar manner to the planned use. In this event, the control unit 44 of the communication control device 40 functions as a processing unit that sets a plurality of protection target antenna directions inside the DARR.

Further, when the DARR is used for dynamic area protection, the DARR is set for each DPA, and thus, a list of secondary wireless stations is created for each combination of the DPA and the DARR. Note that a common DARR may be used for all the DPAs, or different DARRs may be used.

Further, the DARR may be provided as the antenna information during use of the use schedule information, or the DARR set in advance by an administrative agency, a third party organization, or the like, as well as an operator of the primary system, a public service agency, or the like, may be acquired from an external database, or the like.

Note that, in a case where the DARR is not provided and the antenna rotation range that may be used is included in the antenna information during use, the communication control device 40 itself may generate the DARR from the given antenna rotation range.

Figure 41:
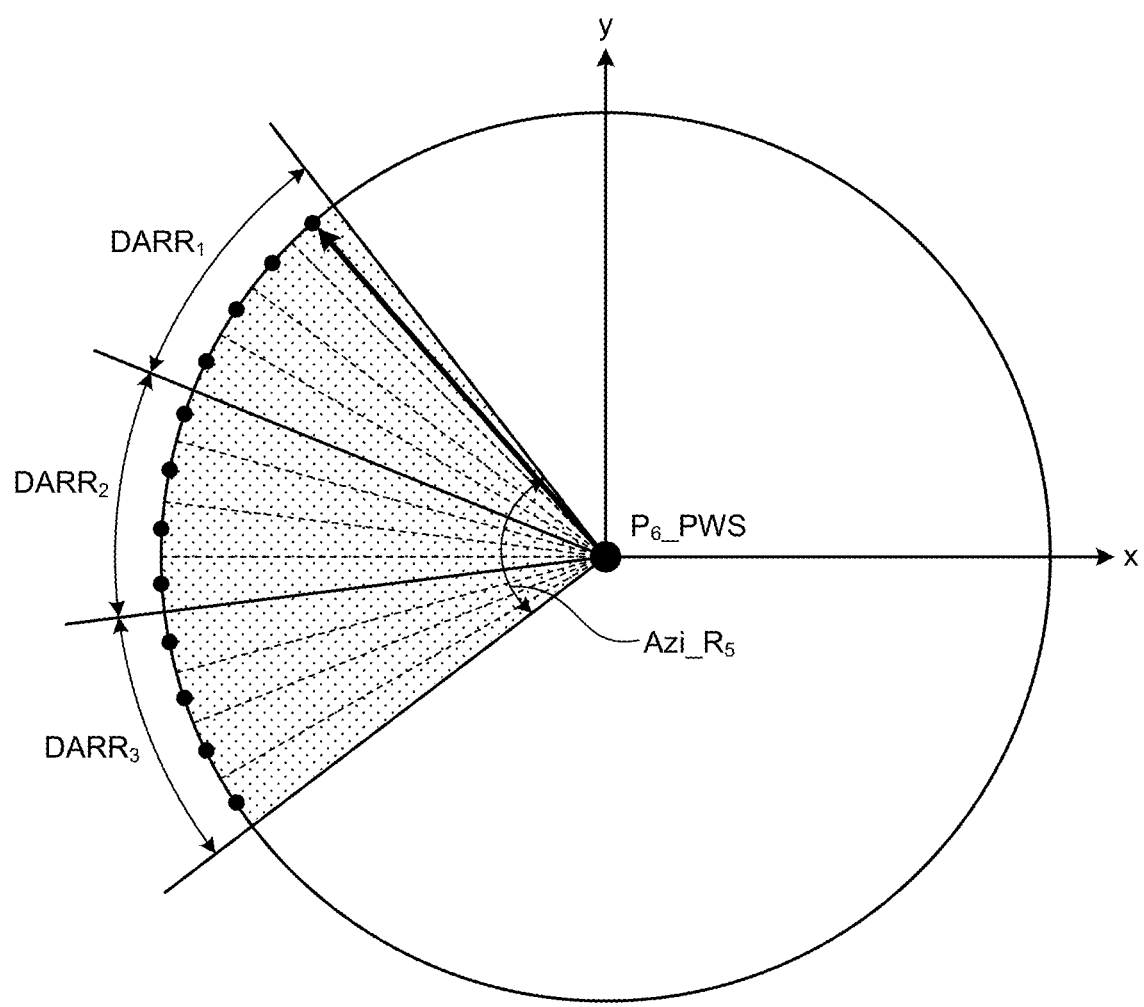
FIG. 41 is a diagram illustrating a setting example of a two-dimensional dynamic antenna rotation range.

For example, the communication control device 40 may assume a circle on a horizontal plane centered on the antenna (position $P_6\_PWS$) of the wireless station of the primary system as illustrated in FIG. 41, may divide the range $Azi\_R_5$ of the azimuth that may be used by the wireless station at the time of unplanned use into a plurality of ranges and may set the ranges as the DARRs (for example, $DARR_1$ to $DARR_3$). In the DARR, the protection target antenna direction described above may be set, and an instruction list to the secondary wireless station may be created so that primary system protection is achieved for all protection target antenna directions in the DARR. In the example illustrated in FIG. 41, the control unit 44 of the communication control device 40 functions as a processing unit that sets a two-dimensional DARR by dividing the range of the azimuth of the antenna that may be used at a certain angle. Note that FIG. 41 is a diagram illustrating a setting example of a two-dimensional dynamic antenna rotation range.

Figure 42:
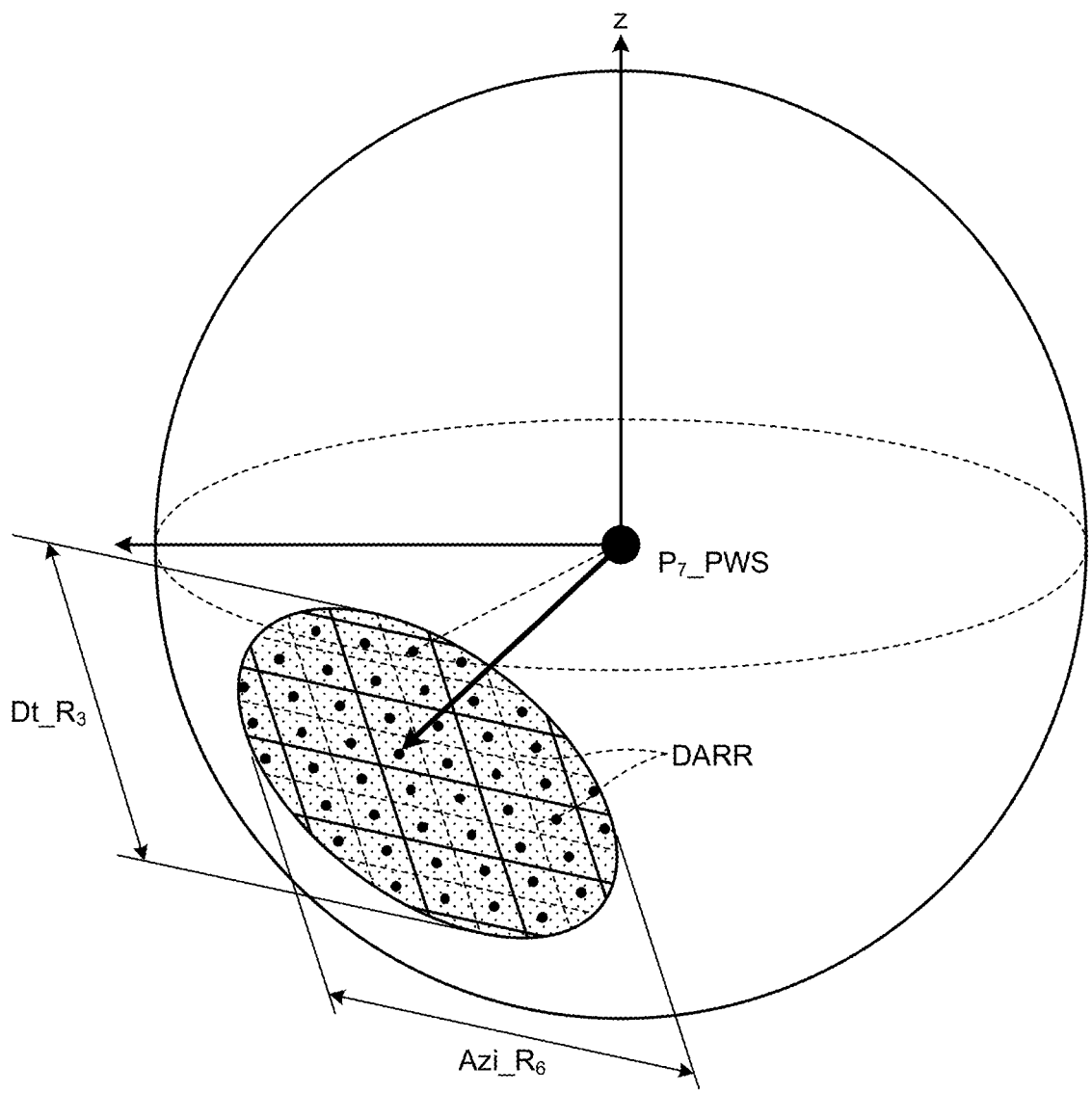
FIG. 42 is a diagram illustrating a setting example of a three-dimensional dynamic antenna rotation range.

Further, for example, as illustrated in FIG. 42, the communication control device 40 may assume a sphere centered on the antenna (position $P_7\_PWS$) of the wireless station of the primary system and may set the DARRs by dividing the ranges $Dt\_R_3$ and $Azi\_R_6$ of the azimuth and the down tilt that may be taken by the primary wireless station at the time of unplanned use by some three-dimensional regions on the spherical surface. In each of the DARRs, the protection target antenna direction described above may be set, and an instruction list to the secondary wireless station may be created so that primary system protection is achieved for all protection target antenna directions in the DARR. In the example illustrated in FIG. 42, the control unit 44 of the communication control device 40 functions as a processing unit that sets three-dimensional DARRs by dividing the range of the azimuth and the range of the down tilt that can be taken by the antenna of the wireless station of the primary system at a certain angle. Note that FIG. 42 is a diagram illustrating a setting example of a three-dimensional dynamic antenna rotation range.

Further, in a case where the antenna rotation range that may be used as the antenna information during use is not included, the antenna rotation range that may be used may be predicted from the use position information or the like, of other wireless stations that can become the communication target and then may be used to set the DARRs, in a similar manner to a case of the planned use. In this event, the control unit 44 of the communication control device 40 functions as a processing unit that sets the DARRs by using the antenna rotation range which is predicted from the information of other wireless stations that can become communication partners and which may be used.

Further, the communication control device 40 may independently generate the DARRs also in a case other than a case where the DARRs or the antenna rotation range that may be used cannot be acquired. For example, in order to increase opportunities of using the secondary system and reliably protect the primary system, the communication control device 40 may independently determine and newly set the DARRs.

Parameters required for setting the DARRs such as the division size of the DARRs can be set in advance by an administrative agency, a third party organization, or the like, in addition to an operator of the primary system, a public service agency, or the like, and can be acquired from the use schedule information in an external database, the primary system, or the like.

Further, regardless of whether or not these parameters are provided, the communication control device 40 may independently set the parameters such as the division size of the DARRs by using information such as hardware performance and arrangement statuses of respective communication devices of the primary system and the secondary system and a sensor, or the like, that detects use of the primary system, the surrounding environment, and the requirement criteria for protection.

For example, for the purpose of more reliably protecting the primary system, parameters such as a division size necessary for the communication control device 40 to generate the DARRs may be determined in accordance with the detection accuracy of the antenna direction at the time of use of the primary wireless station. In this event, the control unit 44 of the communication control device 40 functions as a processing unit that sets the DARRs by using parameters set on the basis of the detection accuracy of the antenna direction at the time of use of the wireless station.

For example, the division size of the DARRs may be determined on the basis of the detection accuracy of the antenna direction by the sensor. For example, in a case where the antenna direction estimation accuracy of the primary wireless station by the sensor is low, a margin may be provided by increasing the division size of the DARRs or causing the DARRs to overlap with other, and setting may be performed so that the primary system is reliably protected even if the detected antenna direction is shifted. In this event, the control unit 44 of the communication control device 40 functions as a processing unit that sets the DARRs by using parameters set on the basis of the detection accuracy of the antenna direction by the sensor that detects the antenna direction.

Further, in a case where it can be ensured that the detection accuracy of the antenna direction of the primary wireless station is high, for example, in a case where a notification of an accurate antenna direction when the primary wireless station is used is made from an operator, or the like, of the primary system, the communication control device 40 may set the DARR including only one protection target antenna direction.

Further, the communication control device 40 may set the division size of the DARRs to be as small as possible within a range that satisfies a predetermined protection criterion for the purpose of increasing opportunities of using the secondary system.

Further, the communication control device 40 may set two or more DARRs having different division sizes in the antenna rotation range that may be used, may select the DARR most suitable at the time of detecting use of the primary system and may control the secondary system. For example, in a case where it is simultaneously notified that the detection accuracy of the antenna direction of the primary system is not sufficient, a DARR having a division size as large as possible is selected from a plurality of DARRs, and the secondary wireless station is instructed so that the primary system can be sufficiently protected with the accuracy. In this event, the control unit 44 of the communication control device 40 functions as a processing unit that sets two or more DARRs having different division sizes in the antenna rotation range that may be used.

Further, in a case where the antenna direction notified in the use detection of the primary system is given as a range, the communication control device 40 may issue an instruction to the secondary wireless station using a list of two or more DARRs that can cover this range. Further, in a case where the notified antenna direction includes a plurality of values, an instruction may be issued to the secondary wireless station in accordance with a list of two or more DARRs including the plurality of values.

Further, in a case where the antenna direction is not notified in detection of use of the primary system, the communication control device 40 may predict the antenna directions of the primary wireless stations that perform communication using the positional relationship between the primary wireless stations. In this event, in a case where it is assumed that an error occurs in the prediction result, influence of the error may be minimized by providing an appropriate margin.

6-4-3. Prediction of Range of Antenna Parameter

A method of predicting a range of the antenna parameter varies depending on whether the position information of the wireless station given in the use schedule is a point or an area. An example of the method of predicting the range of the antenna parameter will be described below. Note that, in the following description, an example will be described where the communication control device 40 predicts the range of the antenna parameter of a certain wireless station X using the protection target point or area of the wireless station Y that is the communication partner. The communication control device 40 may predict the protection target point or area of the wireless station Y on the basis of reception quality of the signal transmitted from the wireless station Y at the wireless station X and reception quality of the signal transmitted from the wireless station Y at the wireless station X, and then may predict the range of the antenna parameter of the wireless station X using the obtained protection target point or area of the wireless station Y. Note that FIG. 43 is a diagram illustrating outline (No. 1) of prediction of a range of an antenna parameter.

Figure 43:
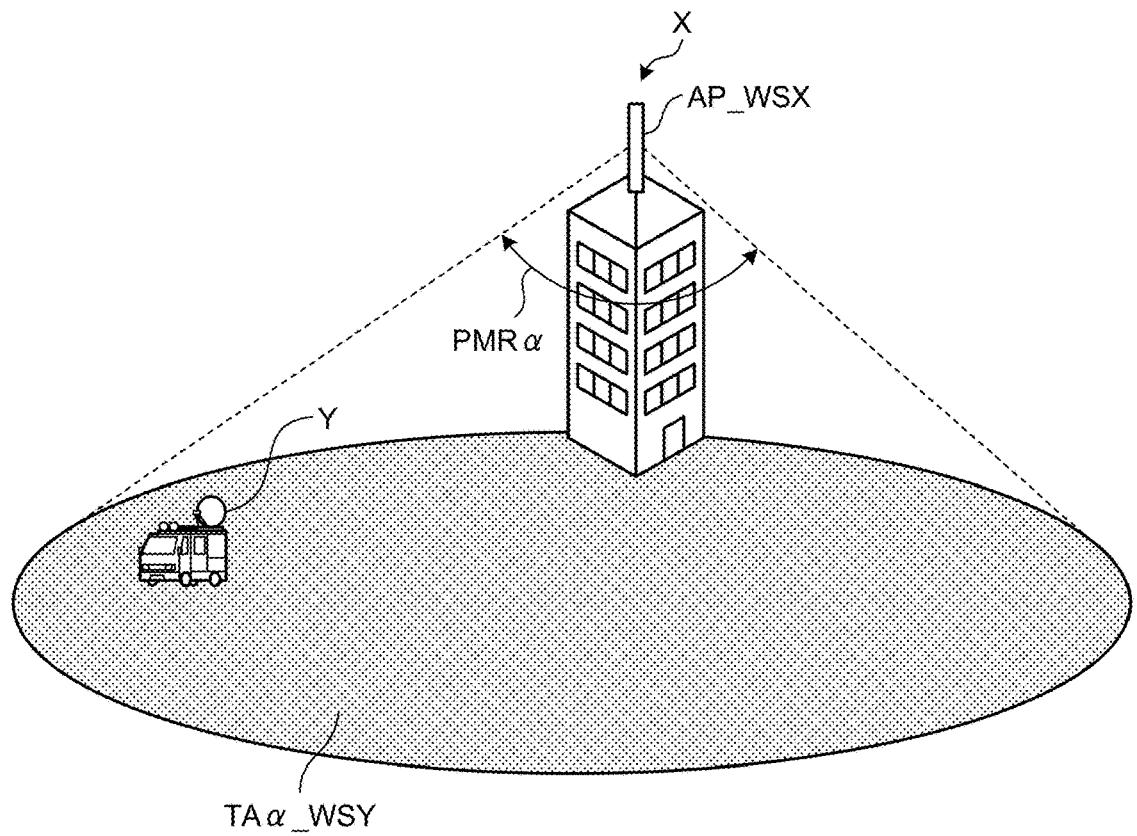
FIG. 43 is a diagram illustrating outline (No. 1) of prediction of a range of an antenna parameter.

For example, as illustrated in FIG. 43, the communication control device 40 may calculate a movement range TAα_WSY of the wireless station Y in which a reception CINR when the wireless station X, which is a fixed station, receives a signal from the wireless station Y, which is a mobile station, satisfies a required value, and may set the movement range TAα_WSY as a protection target area of the wireless station Y. In addition, assuming that the antenna of the wireless station X can face the direction of the wireless station Y existing in any of the protection target areas, the communication control device 40 may predict that the antenna parameter varies within this range (for example, the range PMRα illustrated in FIG. 43). In this event, the control unit 44 of the communication control device 40 functions as a processing unit that calculates the movement range of the first wireless station on the basis of the communication quality when the second wireless station (for example, the wireless station X), which is a fixed station, receives a signal from the first wireless station (for example, the wireless station Y), which is a mobile station, sets the calculated movement range as a protection target area of the first wireless station and predicts the range of the antenna parameter of the second wireless station on the basis of the protection target area. Note that the maximum value of a gain of the antenna of the wireless station X necessary for calculating the reception CINR may be used on the assumption that the antenna of the wireless station X always faces the direction of the wireless station Y.

Figure 44:
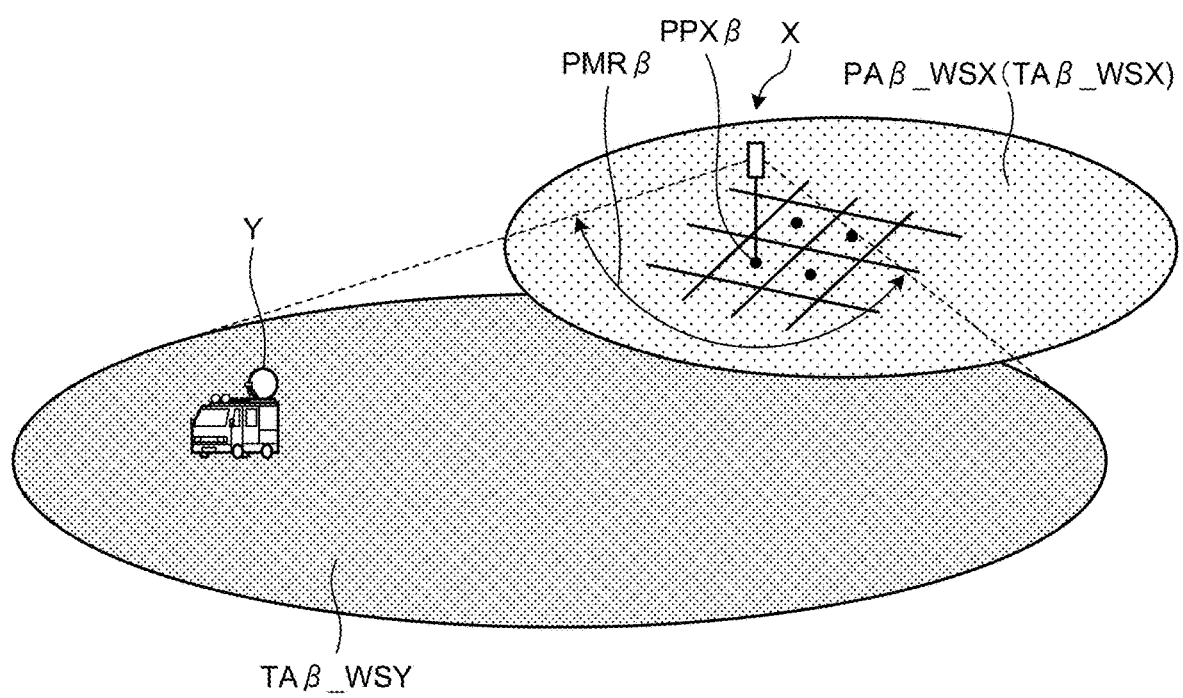
FIG. 44 is a diagram illustrating outline (No. 2) of prediction of a range of an antenna parameter.

Further, the wireless station X that is the prediction target at this time does not necessarily have to be a fixed station and may be a mobile station to which the use position is given within a certain range or a fixed station to which position information is given as an area. FIG. 44 is a diagram illustrating outline (No. 2) of prediction of a range of an antenna parameter. In this case, assuming that the wireless station X is arranged at the protection point PPXβ set within the protection target area PAβ_WSX (or the movement range TAβ_WSX) of the wireless station X as illustrated in FIG. 44, the communication control device 40 may predict the movement range TAβ_WSY of the wireless station Y on the basis of the reception quality (communication quality) when the wireless station X receives a signal from the wireless station Y and may predict the range PMRβ of the antenna parameter of the wireless station X on the basis of the movement range TAβ_WSY. In this event, assuming that the first wireless station is arranged at the protection point set within the protection target area of the first wireless station (for example, the wireless station X), the control unit 44 of the communication control device 40 functions as a processing unit that predicts the movement range of the second wireless station (for example, the wireless station Y) on the basis of the communication quality when the first wireless station receives the signal from the second wireless station and predicts the range of the antenna parameter of the first wireless station on the basis of the predicted movement range. This operation may be performed independently for each protection point set within the movement range of the wireless station X, and the range of the antenna parameter of the wireless station X is different for each protection point. The range of the antenna parameter of the wireless station X based on the moving range of the wireless station Y can be predicted by a procedure similar to the method of predicting the range of the antenna parameter of the wireless station A from the protection target point or area of the wireless station B described in <6-4-1.>.

Note that, even in a case where the movement range and the protection target area of the wireless station Y are given in advance from an external entity as a use schedule, the communication control device 40 may newly predict the movement range of the wireless station Y by calculating, for each protection point, a range in which the reception quality is equal to or higher than a certain level inside and outside the movement range and the protection target area, and may predict the range of the antenna parameter of the wireless station X for each protection point on the basis of the newly predicted movement range.

Figure 45:
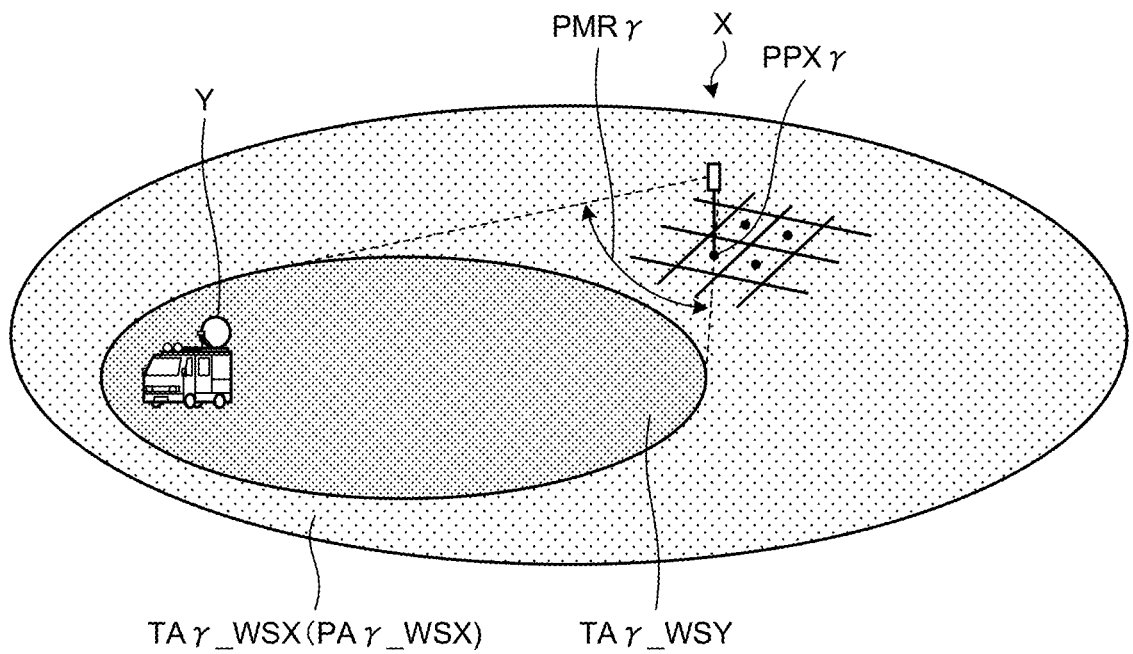
FIG. 45 is a diagram illustrating outline (No. 3) of prediction of a range of an antenna parameter.
Figure 46:
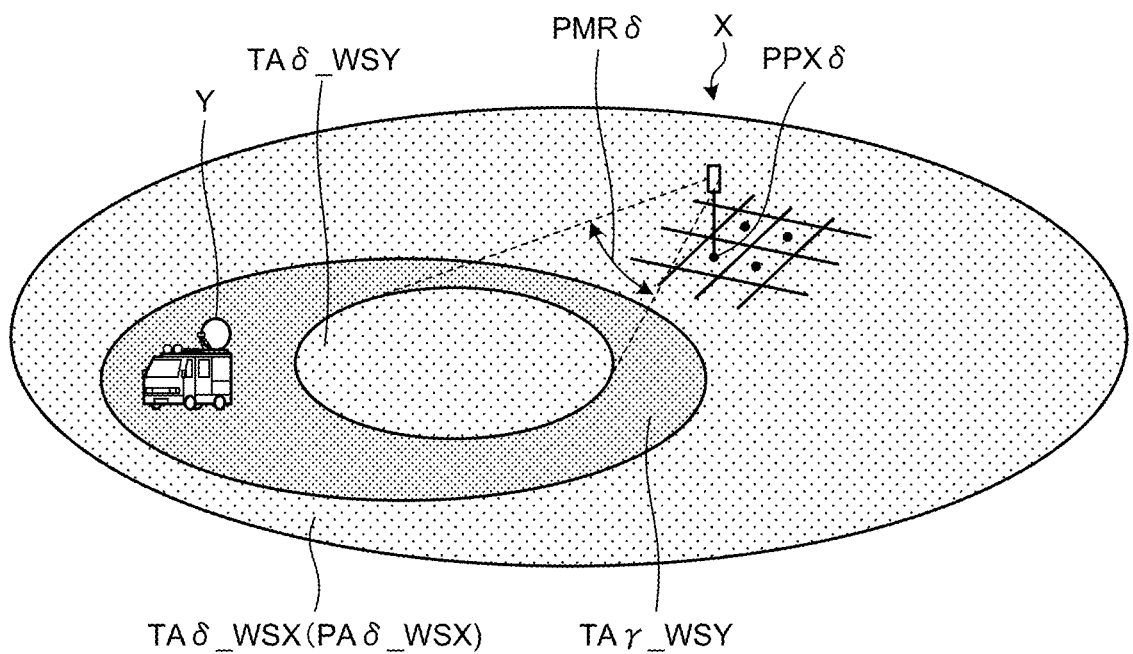
FIG. 46 is a diagram illustrating outline (No. 4) of prediction of a range of an antenna parameter.

Further, in a case where the protection target area or the point of the wireless station X is not given in the use schedule or the like, the communication control device 40 can predict the range of the antenna parameter using the method which will be described below. Note that FIG. 45 is a diagram illustrating outline (No. 3) of prediction of a range of an antenna parameter. Note that FIG. 46 is a diagram illustrating outline (No. 4) of prediction of a range of an antenna parameter. In a case where the protection target area or point of the wireless station X is not given in the use schedule or the like, the communication control device 40 may predict the movement range TAγ_WSX of the wireless station X using the method described in <6-3-4.> from the movement range TAγ_WSY of the wireless station Y, the protection target area, or the protection target point as illustrated in FIG. 45, may set the protection point PPXγ therein, and then may predict the range PMRγ of the antenna parameter of the wireless station X using the movement range of the wireless station Y, the protection target area, or the protection target point for each protection point. In this event, the control unit 44 of the communication control device 40 functions as a processing unit that predicts the movement range of the second wireless station (the wireless station X as an example) on the basis of the movement range of the first wireless station (the wireless station Y as an example), the protection target area, or the protection target point, sets the protection point in the predicted movement range, and then predicts the range of the antenna parameter of the second wireless station on the basis of the movement range of the first wireless station, the protection target area, or the protection target point for each protection point. Further, as illustrated in FIG. 46, the communication control device 40 may predict the range PMRδ of the antenna parameter of the wireless station X after newly calculating the movement range TAδ_WSY of the wireless station Y for each protection point. In this event, the control unit 44 of the communication control device 40 functions as a processing unit that newly calculates the movement range of the first wireless station for each protection point and then predicts the range of the antenna parameter.

Figure 47:
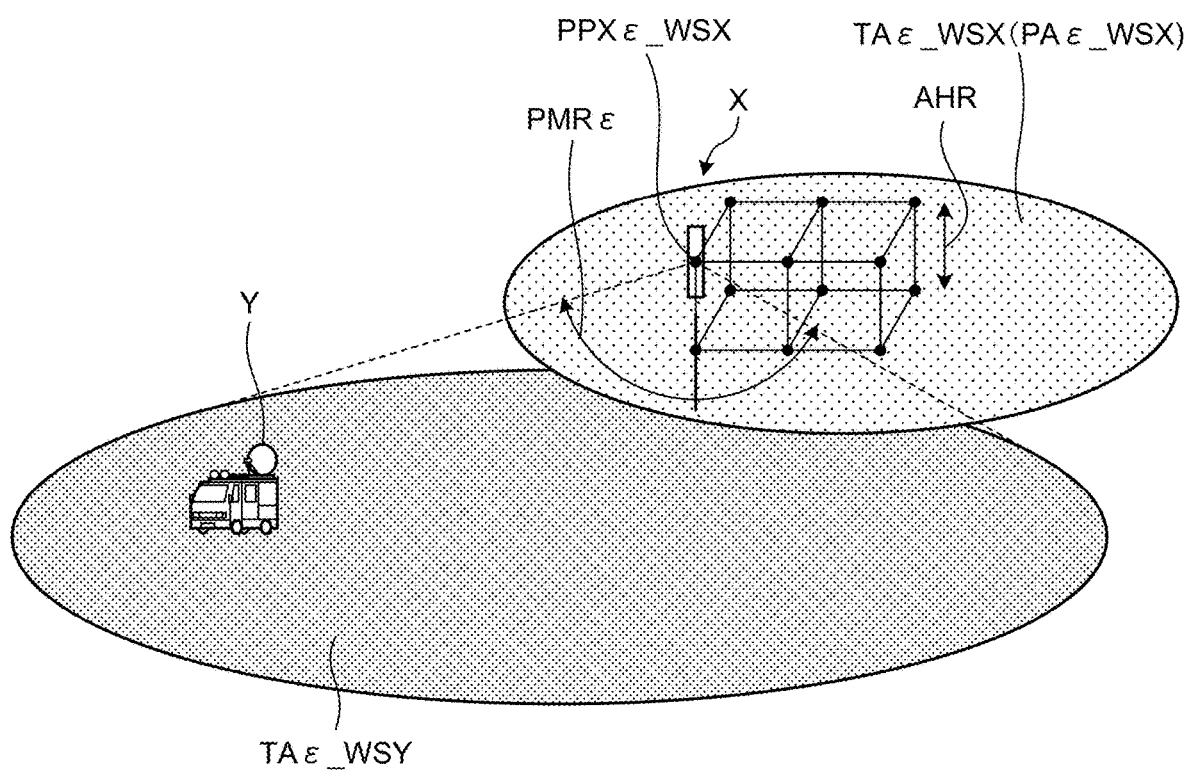
FIG. 47 is a diagram illustrating outline (No. 5) of prediction of a range of an antenna parameter.

In a case where the value of the antenna height of the wireless station X given as the use schedule is within the range, the communication control device 40 can predict the range of the antenna parameter using the method which will be described below. Note that FIG. 47 is a diagram illustrating outline (No. 5) of prediction of a range of an antenna parameter. In a case where the value of the antenna height of the wireless station X given as the user schedule is within the range (for example, the range AHR illustrated in FIG. 47), the communication control device 40 may set the protection point (for example, the protection point PPXε_WSX illustrated in FIG. 47) not only in the horizontal direction but also in the altitude direction regardless of whether the protection target of the wireless station X is the point or the area as illustrated in FIG. 47 and may predict the range of the antenna parameter for each protection point in a similar manner to a case where the value of the antenna height is not within the range. In this event, in a case where the value of the antenna height of the first wireless station (for example, the wireless station X) given as the use schedule is within the range, the control unit 44 of the communication control device 40 functions as a processing unit that sets protection points not only in the horizontal direction but also in the altitude direction regardless of whether the protection target of the first wireless station is the protection target point or the protection target area and predicts the range of the antenna parameter for each of the set protection points. In a similar manner to a case where the value of the antenna height is not within the range, the movement range (for example, the movement range TAE WSX illustrated in FIG. 47) and the protection target area (for example, the movement range PAε_WSX illustrated in FIG. 47) of the wireless station X, and the movement range (for example, the movement range TAE WSY illustrated in FIG. 47) of the wireless station Y may be arbitrarily predicted. In a case where the movement range is predicted, the protection point may be set in the altitude direction after setting the protection point in the horizontal direction in the predicted area. Note that, in a case where the antenna height is not given as the use schedule, a common value or range of the antenna height may be determined for each primary wireless station by a rule, a law, a primary business operator, or the like, and may be used.

Further, while prediction of the antenna rotation range in a case of static point/area protection has been described in the above description, these methods are also applicable to a case of dynamic point/area protection.

7. Modifications

The above-described embodiment is an example, and various modifications and applications are possible.

7-1. Modification Regarding System Configuration

The communication control device 40 of the present embodiment is not limited to the device described in the above-described embodiment. For example, the communication control device 40 may be a device having a function other than controlling the base station device 20 that secondarily uses the frequency band in which frequency sharing is performed. For example, the network manager may have the function of the communication control device 40 of the present embodiment. At this time, the network manager may be, for example, a centralized base band unit (C-BBU) having a network configuration called a centralized radio access network (C-RAN) or a device including the C-BBU. Further, a base station (including an access point) may have the function of the network manager. These devices (such as a network manager) can also be regarded as the communication control device 40.

In the above embodiment, the communication system 1 is the first wireless system, and the base station device 20 is the second wireless system. However, the first wireless system and the second wireless system are not limited to this example. For example, the first wireless system may be a communication device (for example, the wireless communication device 10), and the second wireless system may be a communication system (communication system 2). Note that the wireless system appearing in the present embodiment is not limited to a system including a plurality of devices, and can be appropriately replaced with a "device", a "terminal", or the like.

Furthermore, in the above-described embodiment, the communication control device 40 is a device belonging to the communication system 2, but may not necessarily be a device belonging to the communication system 2. The communication control device 40 may be a device outside the communication system 2. The communication control device 40 may indirectly control the base station device 20 via a device constituting the communication system 2 without directly controlling the base station device 20. In addition, there may be a plurality of secondary systems (communication systems 2). At this time, the communication control device 40 may manage a plurality of secondary systems. In this case, each secondary system can be regarded as the second wireless system.

Further, in general, in frequency sharing, an existing system using a target band is referred to as a primary system, and a secondary user is referred to as a secondary system, however, the primary system and the secondary system may be replaced with another term. A macro cell in heterogeneous network (HetNET) may be a primary system, and a small cell or a relay station may be a secondary system. In addition, the base station may be a primary system, and relay UE or vehicle UE that implements D2D or vehicle-to-everything (V2X) existing in its coverage may be a secondary system. The base station is not limited to a fixed type and may be a portable/mobile type.

Further, an interface between the entities may be wired or wireless. For example, the interface between the entities (communication devices, communication control devices, or terminal devices) appearing in the present embodiment may be a wireless interface that does not depend on frequency sharing. Examples of the wireless interface that does not depend on frequency sharing include a wireless interface provided by a mobile communication carrier via a licensed band, wireless LAN communication using an existing license-exempt band, and the like.

7-2. Other Modifications

The control device for controlling the wireless communication device 10, the base station device 20, the terminal device 30, the communication control device 40, or the proxy device 50 of the present embodiment may be configured as a dedicated computer system or a general-purpose computer system.

For example, a program for executing the above-described operation is stored in a computer-readable recording medium such as an optical disk, a semiconductor memory, a magnetic tape and a flexible disk and distributed. Then, for example, a control device is constituted by installing the program on a computer and executing the above-described processing. In this event, the control device may be an external device (for example, a personal computer) of the wireless communication device 10, the base station device 20, the terminal device 30, the communication control device 40, or the proxy device 50. Further, the control device may be an internal device (for example, the control unit 24, the control unit 34, the control unit 44, or the control unit 54) of the wireless communication device 10, the base station device 20, the terminal device 30, the communication control device 40, or the proxy device 50.

Further, the above-mentioned communication program may be stored in a disk device provided in a server device on a network such as the Internet in such a way to be downloaded to a computer. Further, the above-mentioned functions may be implemented by cooperation between an operating system (OS) and application software. In this case, other parts than OS may be stored in a medium for delivery, or other parts than OS may be stored in the server device and downloaded to a computer.

Further, among the processing described in the above-described embodiments, the entirety or a part of the processing described as being performed automatically may be manually performed, or the entirety or a part of the processing described as manually performed may be automatically performed by a known method. In addition, the processing procedures, specific terms, information including various data and parameters disclosed in the specification and drawings may be optionally changed unless otherwise specified. In one example, the various types of information illustrated in each drawing are not limited to the illustrated information.

Further, each component of each device illustrated in the drawings is functionally conceptual and is not necessarily configured physically as illustrated. In other words, the specific forms of distribution or integration of each device are not limited to the illustrated examples, and the entirety or a part of them may be functionally or physically distributed or integrated on an optional unit basis depending on various loads and usage conditions.

Further, an appropriate combination between the above-described embodiments is possible within the range that the details of the processing do not contradict. In addition, the order of the steps illustrated in the sequence diagrams or flow charts of the present embodiment may be changed appropriately.

8. Conclusion

As described above, according to an embodiment of the present disclosure, the communication control device 40 selects one protection method from a plurality of primary system protection methods including a dynamic or static protection method on the basis of a use form and use position information of a wireless station of a primary system. Then, the communication control device 40 protects a wireless station of the primary system on the basis of the selected protection.

As a result, for example, in the FPU operated by the broadcaster in Japan, the primary system can be appropriately protected from the secondary system.

For example, one of differences of the FPU from the primary system assumed in the CBRS, the TVWS, and the like, in the related art is that the wireless station can move, and thus, the use position is a point or an area for each usage model. Further, there are two use forms, and the information indicated as the use position at the time of unplanned use is merely a candidate area. In the embodiment of the present disclosure, the communication control device 40 can analyze information provided from the primary system, and switch a method for protecting the primary system in accordance with a usage model and a use form. As a result, the primary system can be appropriately protected from the secondary system.

Further, in FPU, it is also a feature that an antenna of a wireless station to be a communication partner can move in response to movement of the wireless station. For example, in the planned use of Models 2 to 6 described above, there is a possibility that the antenna of the receiving station rotates, or the like, following the movement of the transmitting station, so that it is necessary to protect an entire rotation range. In the unplanned use of Models 1 and 5 described above, when the transmitting station detects that the transmitting station is used in the candidate area, there is a possibility that the antenna of the receiving station is directed in that direction, so that it is necessary to protect the antenna of the receiving station so as to face anywhere in the rotation range of the antenna. In the embodiments of the present disclosure, the communication control device 40 can realize point/area protection in consideration of antenna rotation during planned use and dynamic point/area protection in consideration of an antenna direction notified at the time of unplanned use. As a result, the primary system can be appropriately protected from the secondary system.

Although the above description is given of the respective embodiments of the present disclosure, the technical scope of the present disclosure is not limited to the above-described respective embodiments as they are, and various modifications may be made without departing from the scope of the present disclosure. In addition, the components in different embodiments and modifications may be combined suitably.

Further, the effects in each embodiment described in the present specification are merely examples and are not restrictive of the disclosure herein, and other effects not described herein also may be achieved.

Moreover, the present technology can have the configuration described below.

(1)

A communication control device comprising:

a control unit configured to select one protection method from a plurality of primary system protection methods including a dynamic or static protection method on a basis of a use form and use position information of a wireless station of a primary system and protect the wireless station of the primary system on a basis of the selected protection method.

(2)

The communication control device according to (1), wherein the control unit selects one static protection method and performs the static protection method in a case where the wireless station is used for planned use and selects one dynamic protection method and performs the dynamic protection method in a case where the wireless station is used for unplanned use.

(3)

The communication control device according to (2), wherein the control unit selects point protection and performs the point protection on a basis of a protection target point of the wireless station determined on a basis of the use position information of the wireless station, and selects area protection and performs the area protection on a basis of a protection target area of the wireless station determined on a basis of the use position information of the wireless station.

(4)

The communication control device according to (3), wherein, in a case where the protection target point and the protection target area are not included in a use schedule of the wireless station, and in a case where the protection target point and the protection target area are newly set, the control unit predicts the protection target point and the protection target area.

(5)

The communication control device according to (4), wherein the control unit predicts the protection target point and the protection target area on a basis of use position information of a second wireless station different from a first wireless station that is the wireless station of the primary system.

(6)

The communication control device according to (5), wherein the control unit calculates communication quality when the second wireless station receives a signal of the first wireless station on a basis of the use position information of the second wireless station and predicts the protection target point and the protection target area on a basis of the calculated communication quality.

(7)

The communication control device according to (5), wherein the control unit predicts the protection target point and the protection target area on a basis of antenna information of an antenna to be used at the second wireless station.

(8)

The communication control device according to (4), wherein the control unit predicts the protection target point and the protection target area on a basis of use position information of a third wireless station of a wireless system different from the primary system.

(9)

The communication control device according to (8), wherein the control unit calculates communication quality when a first wireless station that is the wireless station of the primary system receives a signal of the third wireless station on a basis of the use position information of the third wireless station, predicts the use position information of the third wireless station on a basis of the calculated communication quality, and uses the predicted position information as the protection target point or the protection target area.

(10)

The communication control device according to (9), wherein the control unit calculates communication quality in which a fourth wireless station receives a signal of a fifth wireless station that is the wireless station of the primary system using the use position information of the third wireless station as use position information of the fourth wireless station that is the wireless station of the primary system and predicts the protection target point and the protection target area of the fifth wireless station on a basis of the calculated communication quality.

(11)

The communication control device according to (3), wherein the control unit determines a plurality of areas obtained by dividing the protection target area in accordance with a certain criterion as dynamic protection target areas.

(12)

The communication control device according to (11), wherein the control unit determines the dynamic protection target areas obtained by dividing the protection target area into a plurality of areas using a parameter set on a basis of detection accuracy of use of the wireless station.

(13)

The communication control device according to (12), wherein the control unit determines the dynamic protection target areas obtained by dividing the protection target area into a plurality of areas using a parameter set on a basis of detection accuracy of the primary system and accuracy of position information of the primary system.

(14)

The communication control device according to (13), wherein the control unit determines the dynamic protection target areas obtained by dividing the protection target area into a plurality of areas using a parameter set on a basis of variation of the accuracy of the position information due to a surrounding environment.

(15)

The communication control device according to (11), wherein the control unit determines the dynamic protection target areas having different sizes in the same area.

(16)

The communication control device according to (11), wherein the control unit determines the dynamic protection target areas obtained by dividing the protection target area into a plurality of areas using a parameter set on a basis of accuracy of a positioning function of a wireless station of a wireless system different from the primary system.

(17)

The communication control device according to (11), wherein the control unit divides an entire movement area of the wireless station into a plurality of regions and determines protection target areas set for wireless stations that are communication targets in each of the divided regions as the dynamic protection target areas.

(18)

The communication control device according to (3), wherein the control unit performs point protection or area protection by setting a protection target antenna direction at regular intervals within a rotation range of an antenna that is being used at the wireless station.

(19)

The communication control device according to (3), wherein the control unit performs dynamic point protection or dynamic area protection using dynamic antenna rotation ranges obtained by dividing a rotation range of an antenna that can be taken by the antenna of the wireless station in accordance with a certain criterion.

(20)

A communication control method comprising:

selecting one protection method from a plurality of primary system protection methods including a dynamic or static protection method on a basis of a use form and use position information of a wireless station of a primary system and protecting the wireless station of the primary system on a basis of the selected protection method.

REFERENCE SIGNS LIST 1, 2 COMMUNICATION SYSTEM
10 WIRELESS COMMUNICATION DEVICE
20 BASE STATION DEVICE
30 TERMINAL DEVICE
40 COMMUNICATION CONTROL DEVICE
50 PROXY DEVICE
60 FILE SERVER
21, 31, 41, 51 WIRELESS COMMUNICATION UNIT
22, 32, 42, 52 STORAGE UNIT
23, 43, 53 NETWORK COMMUNICATION UNIT
24, 34, 44, 54 CONTROL UNIT
33 INPUT/OUTPUT UNIT
211, 311 RECEPTION PROCESSING UNIT
211a WIRELESS RECEIVER
211b DEMULTIPLEXER
211c DEMODULATOR
211d DECODER
212, 312 TRANSMISSION PROCESSING UNIT
212a ENCODER
212b MODULATOR
212c MULTIPLEXER
212d WIRELESS TRANSMISSION UNIT
213, 313 ANTENNA
241, 441, 541 ACQUISITION UNIT
242 SETTING UNIT
243 TRANSMISSION UNIT
244 WIRELESS COMMUNICATION CONTROL UNIT
442 DETERMINATION UNIT
443 NOTIFICATION UNIT
444 COMMUNICATION CONTROL UNIT
542 FIRST TRANSMISSION UNIT
543 SECOND TRANSMISSION UNIT

The invention claimed is:

1. A communication control device comprising:

control circuitry configured to select one protection method from a plurality of primary system protection methods including a dynamic or static protection method on a basis of a use form and use position information of a wireless station of a primary system and protect the wireless station of the primary system on a basis of the selected protection method, wherein the control circuitry;

selects one static protection method and performs the static protection method in a case where the wireless station is used for planned use and selects one dynamic protection method and performs the dynamic protection method in a case where the wireless station is used for unplanned use, selects point protection and performs the point protection on a basis of a protection target point of the wireless station determined on a basis of the use position information of the wireless station, and selects area protection and performs the area protection on a basis of a protection target area of the wireless station determined on a basis of the use position information of the wireless station.

2. The communication control device according to claim 1, wherein, in a case where the protection target point and the protection target area are not included in a use schedule of the wireless station, and in a case where the protection target point and the protection target area are newly set, the control circuitry predicts the protection target point and the protection target area.

3. The communication control device according to claim 2,
wherein the control circuitry
predicts the protection target point and the protection target area on a basis of use position information of a second wireless station different from a first wireless station that is the wireless station of the primary system.

4. The communication control device according to claim 3,
wherein the control circuitry
calculates communication quality when the second wireless station receives a signal of the first wireless station on a basis of the use position information of the second wireless station and predicts the protection target point and the protection target area on a basis of the calculated communication quality.

5. The communication control device according to claim 3,
wherein the control circuitry
predicts the protection target point and the protection target area on a basis of antenna information of an antenna to be used at the second wireless station.

6. The communication control device according to claim 2,
wherein the control circuitry
predicts the protection target point and the protection target area on a basis of use position information of a third wireless station of a wireless system different from the primary system.

7. The communication control device according to claim 6,
wherein the control circuitry
calculates communication quality when a first wireless station that is the wireless station of the primary system receives a signal of the third wireless station on a basis of the use position information of the third wireless station, predicts the use position information of the third wireless station on a basis of the calculated communication quality, and uses the predicted use position information as the protection target point or the protection target area.

8. The communication control device according to claim 7,
wherein the control circuitry
calculates communication quality in which a fourth wireless station receives a signal of a fifth wireless station that uses the use position information of the third wireless station as use position information of the fourth wireless station, and
predicts a protection target point and a protection target area of the fifth wireless station on a basis of the calculated communication quality.

9. The communication control device according to claim 1,
wherein the control circuitry
determines a plurality of areas obtained by dividing the protection target area in accordance with a certain criterion as dynamic protection target areas.

10. The communication control device according to claim 9,
wherein the control circuitry
determines the dynamic protection target areas obtained by dividing the protection target area into a plurality of areas using a parameter set on a basis of detection accuracy of use of the wireless station.

11. The communication control device according to claim 10,
wherein the control circuitry
determines the dynamic protection target areas obtained by dividing the protection target area into a plurality of areas using a parameter set on a basis of detection accuracy of the primary system and accuracy of position information of the primary system.

12. The communication control device according to claim 11,
wherein the control circuitry
determines the dynamic protection target areas obtained by dividing the protection target area into a plurality of areas using a parameter set on a basis of variation of the accuracy of the position information due to a surrounding environment.

13. The communication control device according to claim 9,
wherein the control circuitry
determines the dynamic protection target areas having different sizes in the same area.

14. The communication control device according to claim 9,
wherein the control circuitry
determines the dynamic protection target areas obtained by dividing the protection target area into a plurality of areas using a parameter set on a basis of accuracy of a positioning function of a wireless station of a wireless system different from the primary system.

15. The communication control device according to claim 9,
wherein the control circuitry
divides an entire movement area of the wireless station into a plurality of regions and determines protection target areas set for wireless stations that are communication targets in each of the divided regions as the dynamic protection target areas.

16. The communication control device according to claim 1,
wherein the control circuitry
performs point protection or area protection by setting a protection target antenna direction at regular intervals within a rotation range of an antenna that is being used at the wireless station.

17. The communication control device according to claim 1,
wherein the control circuitry
performs dynamic point protection or dynamic area protection using dynamic antenna rotation ranges obtained by dividing an antenna rotation range that can be taken by an antenna of the wireless station in accordance with a certain criterion.

18. A communication control method performed by a communication control device, the communication control method comprising:
selecting one protection method from a plurality of primary system protection methods including a dynamic or static protection method on a basis of a use form and use position information of a wireless station of a primary system and protecting the wireless station of the primary system on a basis of the selected protection method;
selecting one static protection method and performs the static protection method in a case where the wireless station is used for planned use and selects one dynamic protection method and performs the dynamic protection method in a case where the wireless station is used for unplanned use;

selecting point protection and performs the point protection on a basis of a protection target point of the wireless station determined on a basis of the use position information of the wireless station; and selecting area protection and performs the area protection on a basis of a protection target area of the wireless station determined on a basis of the use position information of the wireless station.

19. A non-transitory computer product containing instructions that cause a processor to perform a communication control method, the communication control method comprising:

selecting one protection method from a plurality of primary system protection methods including a dynamic or static protection method on a basis of a use form and use position information of a wireless station of a primary system and protecting the wireless station of the primary system on a basis of the selected protection method;

selecting one static protection method and performs the static protection method in a case where the wireless station is used for planned use and selects one dynamic protection method and performs the dynamic protection method in a case where the wireless station is used for unplanned use;

selecting point protection and performs the point protection on a basis of a protection target point of the wireless station determined on a basis of the use position information of the wireless station; and selecting area protection and performs the area protection on a basis of a protection target area of the wireless station determined on a basis of the use position information of the wireless station.

\* \* \* \* \*